(12) United States Patent
Homma et al.

(10) Patent No.: US 12,117,313 B2
(45) Date of Patent: Oct. 15, 2024

(54) PHOTODETECTION DEVICE AND PHOTODETECTION SYSTEM

(71) Applicant: Sony Semiconductor Solutions Corporation, Kanagawa (JP)

(72) Inventors: Ryutaro Homma, Tokyo (JP); Yasuhiro Shinozuka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/260,198

(22) PCT Filed: Jan. 11, 2022

(86) PCT No.: PCT/JP2022/000580
§ 371 (c)(1),
(2) Date: Jun. 30, 2023

(87) PCT Pub. No.: WO2022/181081
PCT Pub. Date: Sep. 1, 2022

(65) Prior Publication Data
US 2024/0085177 A1     Mar. 14, 2024

(30) Foreign Application Priority Data
Feb. 25, 2021   (JP) ................................ 2021-029082

(51) Int. Cl.
*G01C 3/08*    (2006.01)
*G01J 1/02*    (2006.01)
(Continued)

(52) U.S. Cl.
CPC .............. *G01C 3/08* (2013.01); *G01J 1/0228* (2013.01); *G01J 2001/4238* (2013.01); *G01J 2001/4466* (2013.01)

(58) Field of Classification Search
CPC .. G01C 3/08; G01J 1/0228; G01J 2001/4238; G01J 2001/4466
See application file for complete search history.

(56) References Cited

U.S. PATENT DOCUMENTS

2019/0250257 A1    8/2019  Finkelstein
2021/0020793 A1*   1/2021  Shinohara ................. G01J 1/44
(Continued)

FOREIGN PATENT DOCUMENTS

JP    H11331883 A    11/1999
JP    2004228719 A    8/2004
(Continued)

OTHER PUBLICATIONS

International Search Report (PCT/ISA/210), International Application No. PCT/JP2022/000580, dated Mar. 8, 2022.

*Primary Examiner* — Thanh Luu
*Assistant Examiner* — Monica T Taba
(74) *Attorney, Agent, or Firm* — Michael Best & Friedrich LLP

(57) ABSTRACT

A photodetection device according to the present disclosure includes: a light-receiving section including a light-receiving element, a first switch, a second switch, and a signal generator, the first switch that couples the light-receiving element to a first node by being turned on, the second switch that applies a predetermined voltage to the first node by being turned on, and the signal generator that generates a pulse signal on the basis of a voltage at the first node; a controller that controls operations of the first switch and the second switch; a detector that detects a timing at which the pulse signal is changed, on the basis of the pulse signal; and an output section that outputs a detection signal corresponding to a detection result by the detector when the second switch is turned on.

12 Claims, 43 Drawing Sheets

(51) Int. Cl.
  *G01J 1/42*  (2006.01)
  *G01J 1/44*  (2006.01)

(56) References Cited

U.S. PATENT DOCUMENTS

2021/0165084 A1\* 6/2021 Makimoto .............. G01S 17/89
2021/0341592 A1\* 11/2021 Tachino ................ G01S 7/4863

FOREIGN PATENT DOCUMENTS

| JP | 2019145702 A | 8/2019 |
| JP | 2019184297 A | 10/2019 |
| JP | 2019203736 A | 11/2019 |
| JP | 2020112501 A | 7/2020 |
| JP | 2020148682 A | 9/2020 |
| JP | 2021019281 A | 2/2021 |
| WO | WO-2020045123 A1 | 3/2020 |
| WO | WO-2020183843 A1 | 9/2020 |
| WO | 2021140912 A1 | 7/2021 |

\* cited by examiner

[ FIG. 1 ]
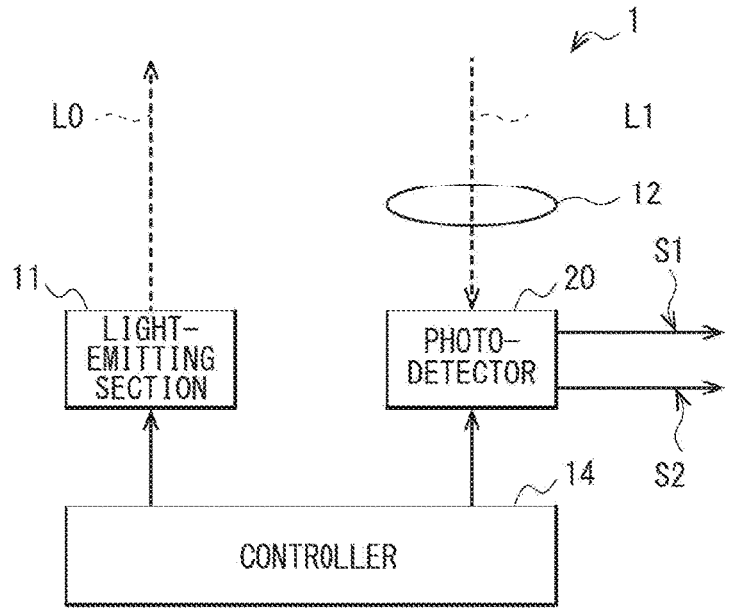
[ FIG. 2 ]
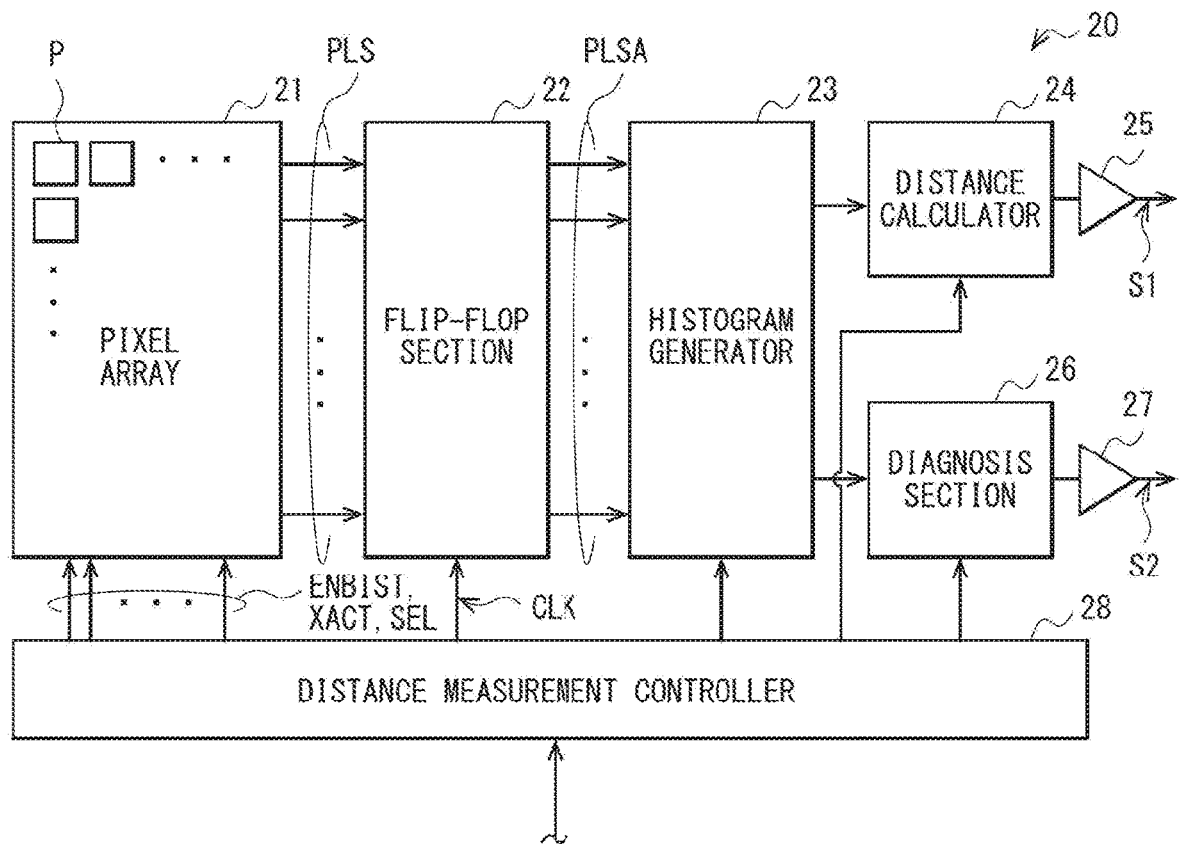

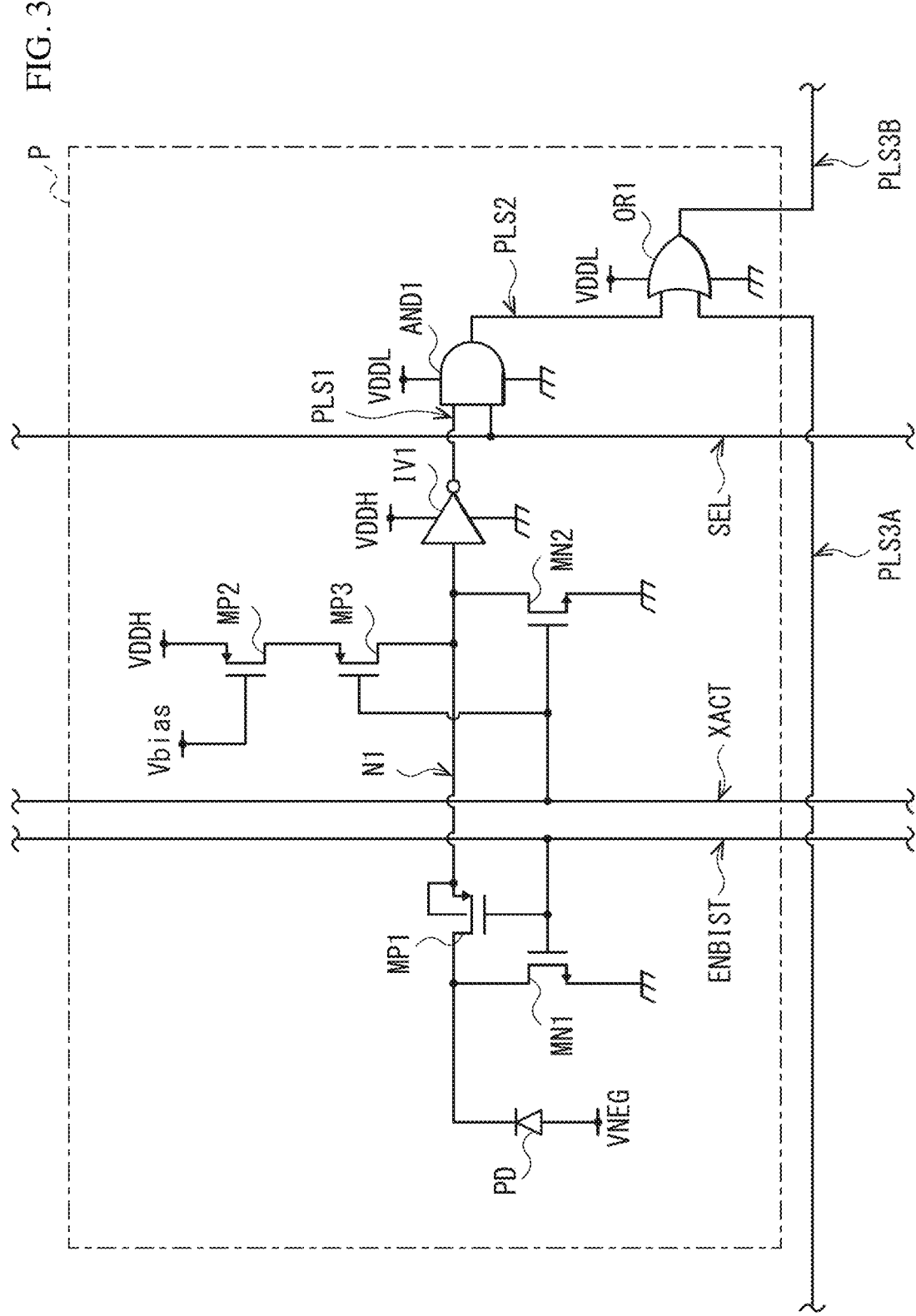

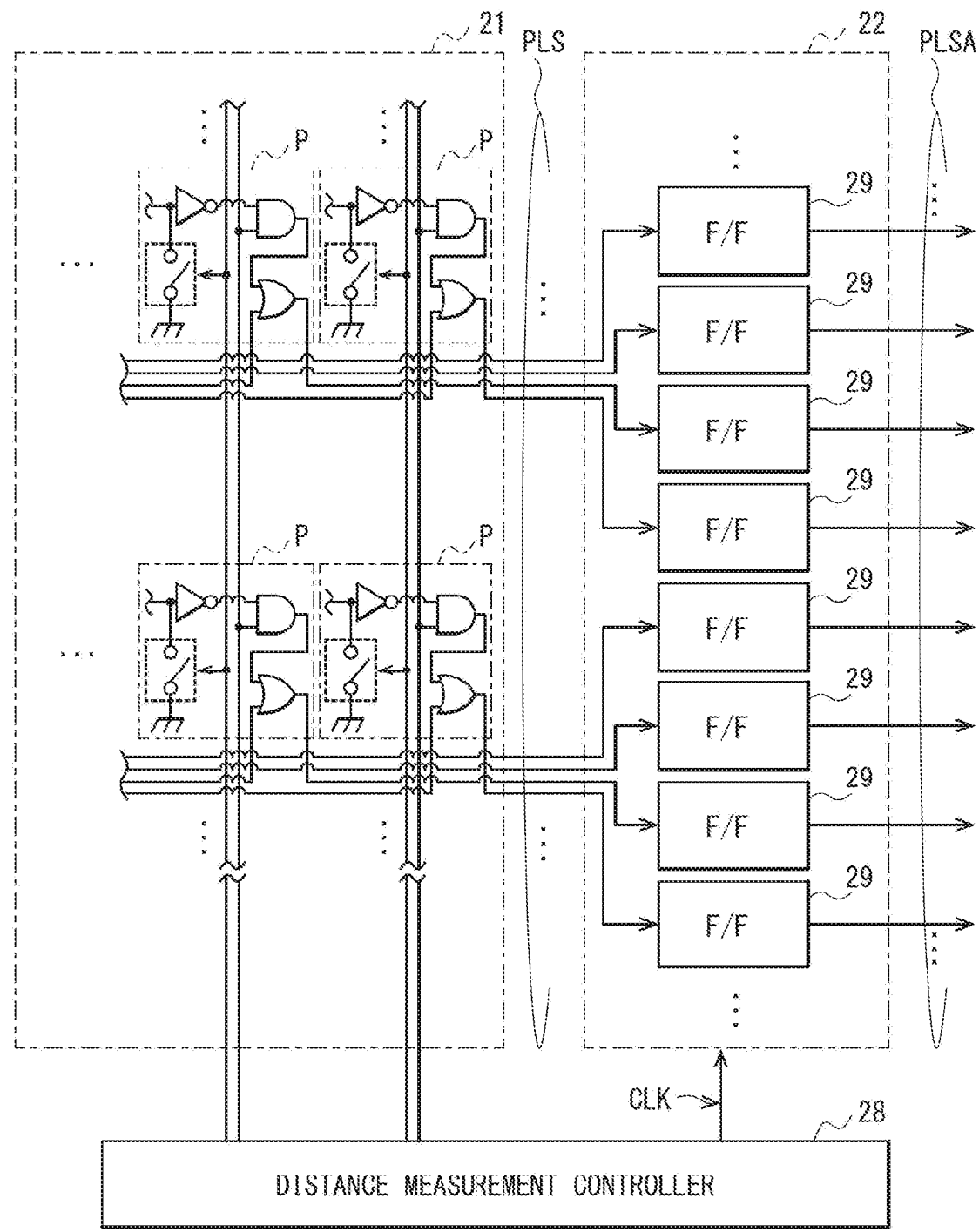
[FIG. 5]

[ FIG. 6 ]
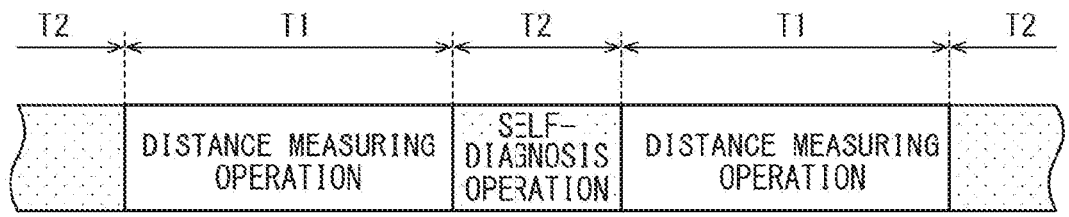
[ FIG. 7 ]
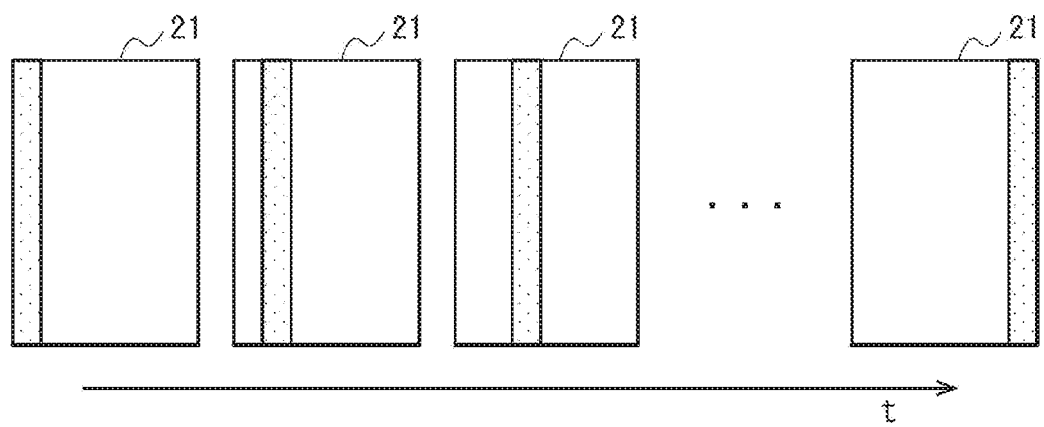
[ FIG. 8 ]
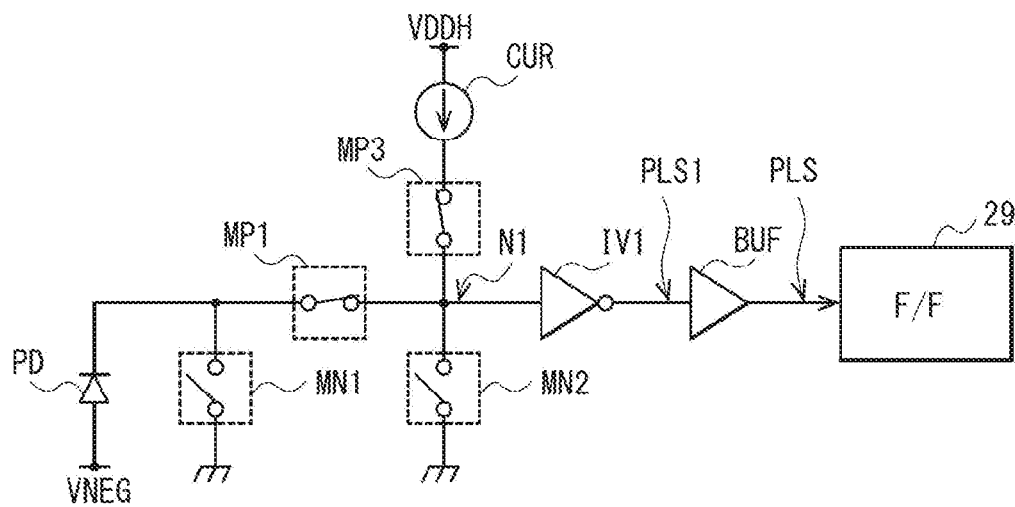

[ FIG. 9 ]
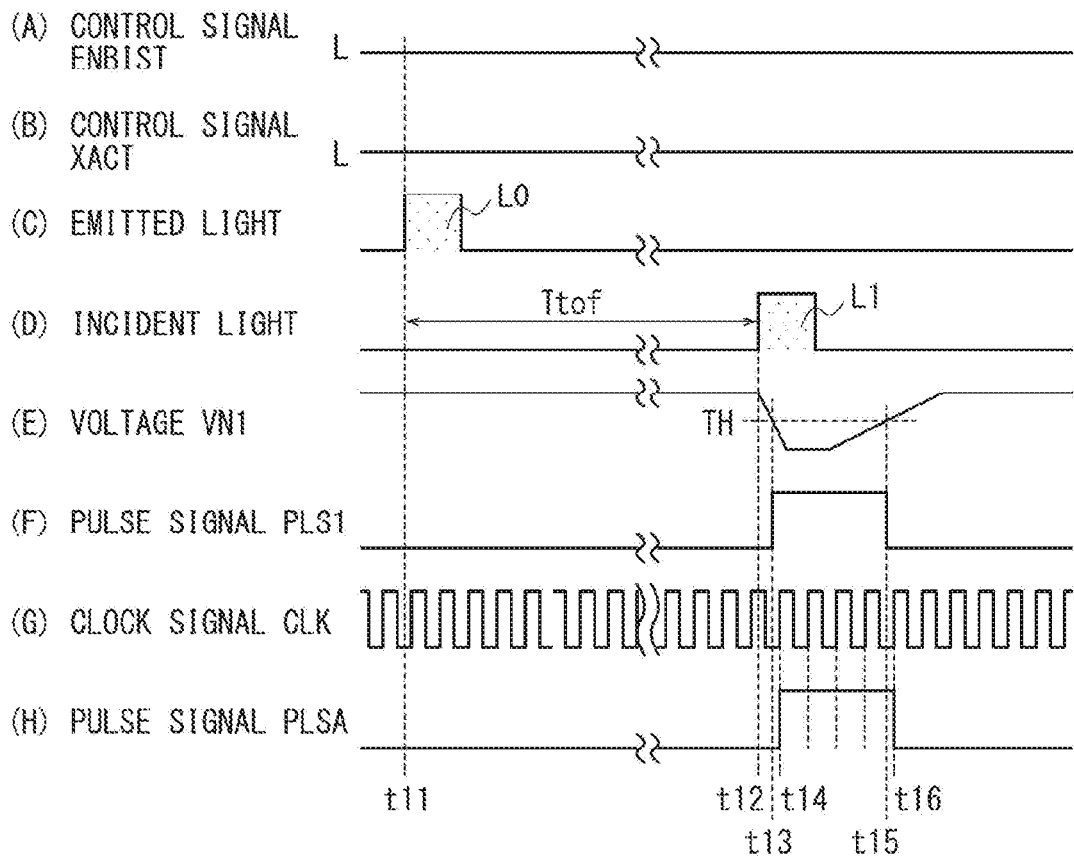
[ FIG. 10 ]
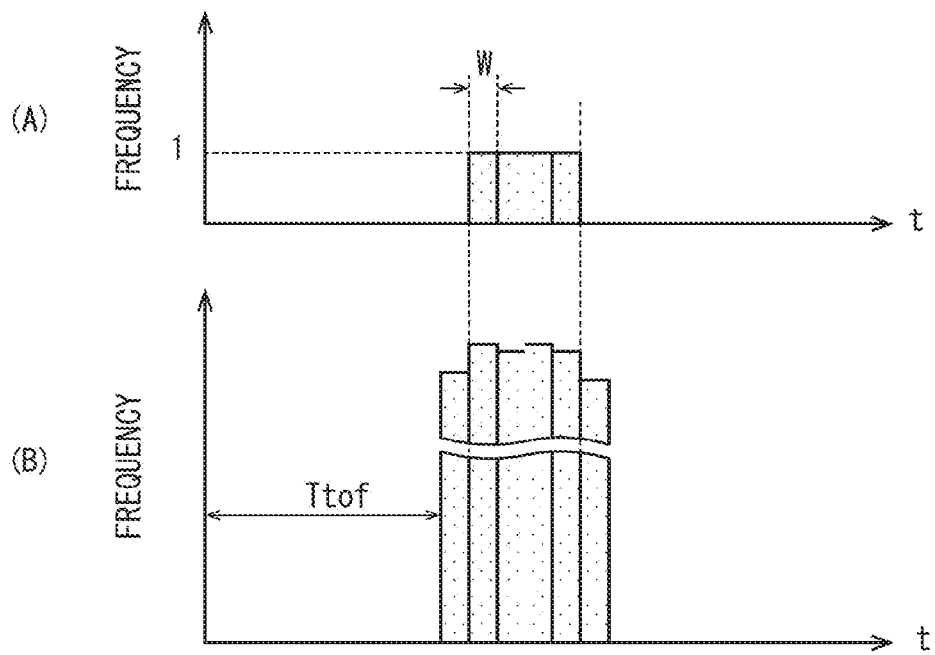

[ FIG. 11 ]
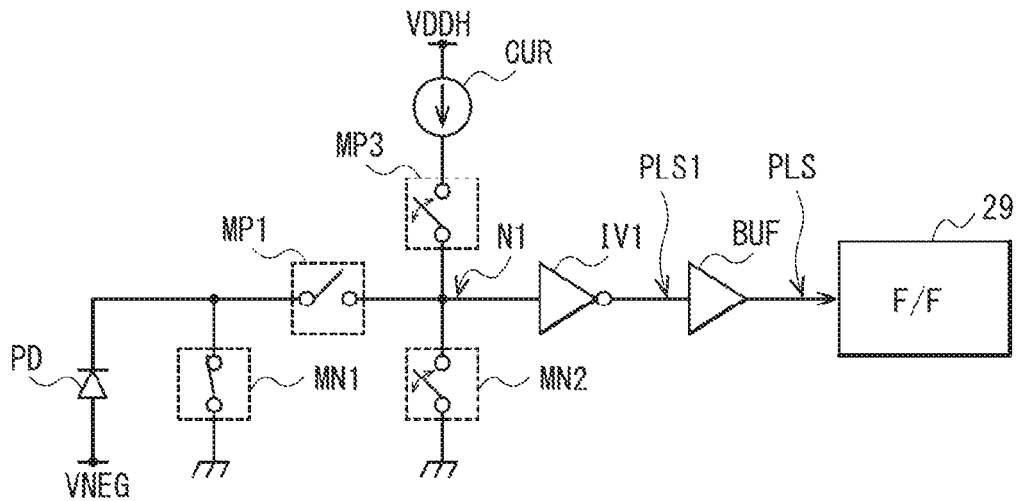
[ FIG. 12 ]
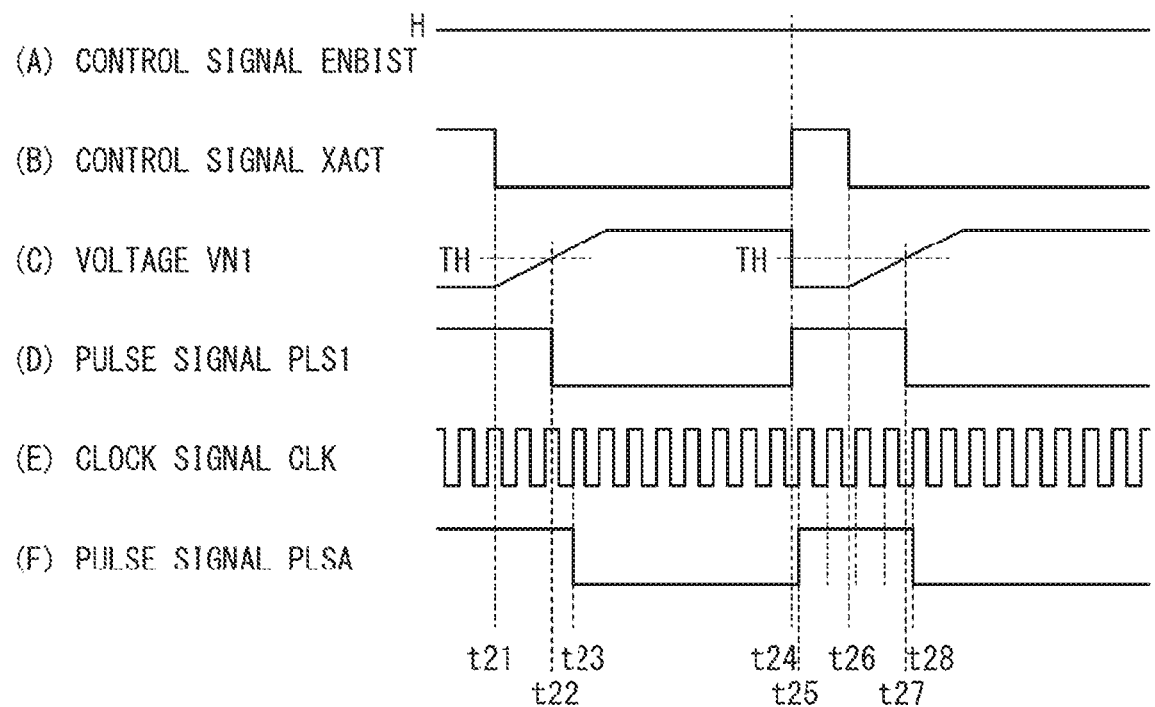

[ FIG. 13 ]
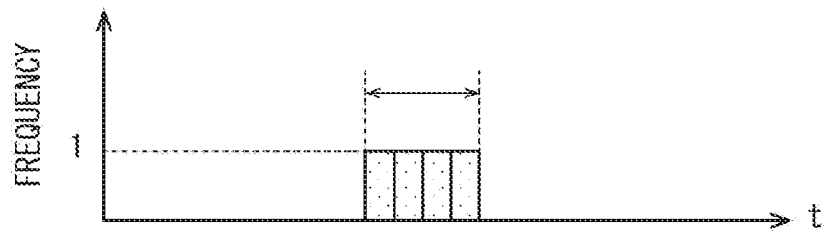
[ FIG. 14A ]
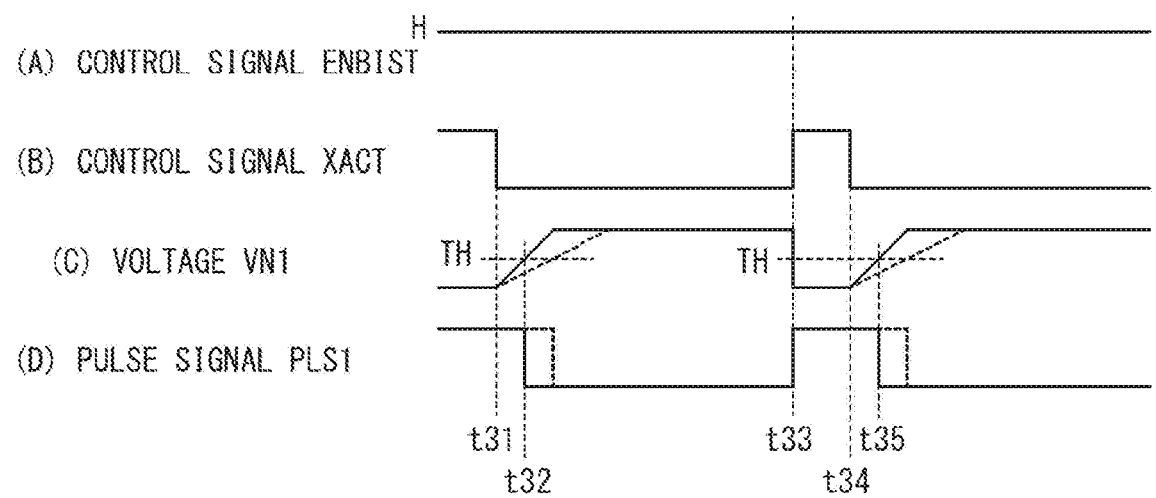
[ FIG. 14B ]
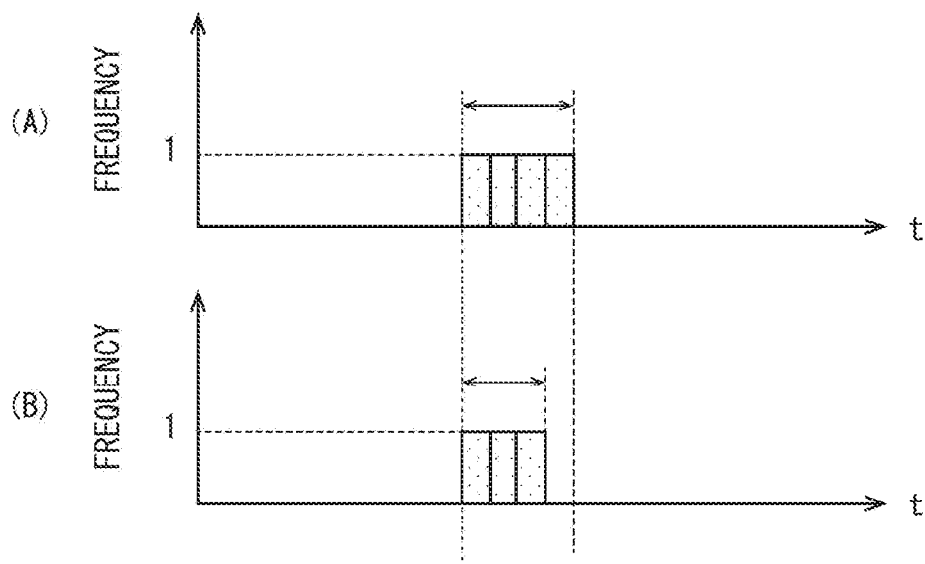

[ FIG. 15A ]
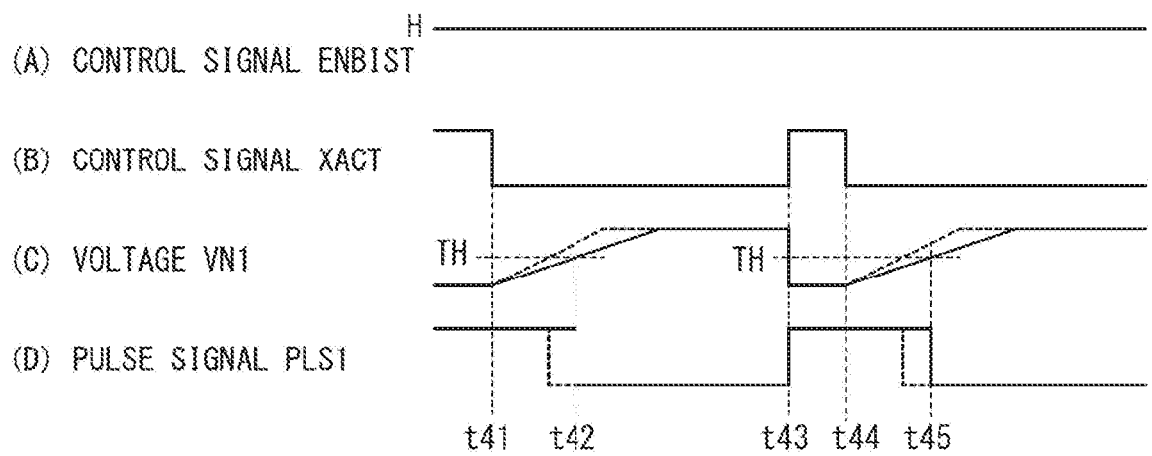
[ FIG. 15B ]
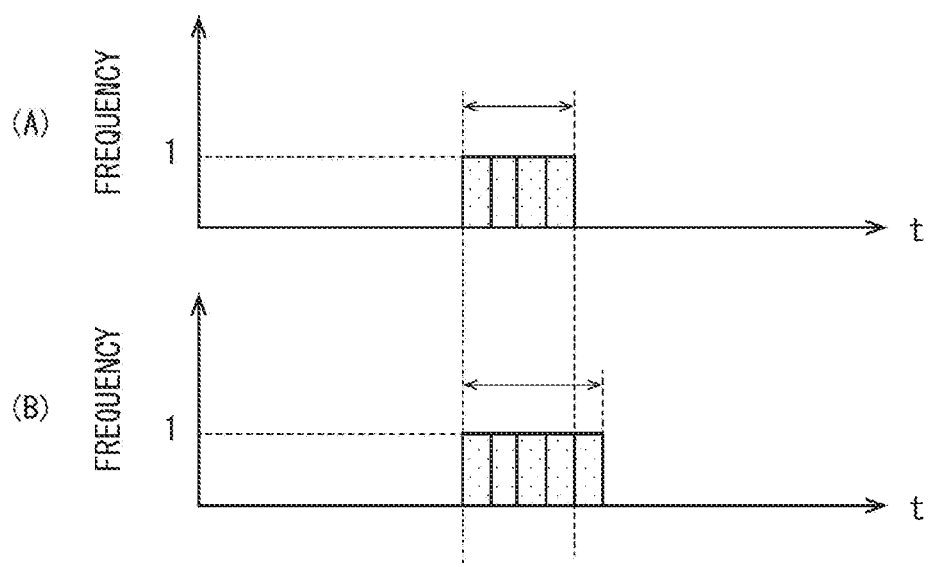

[ FIG. 16A ]
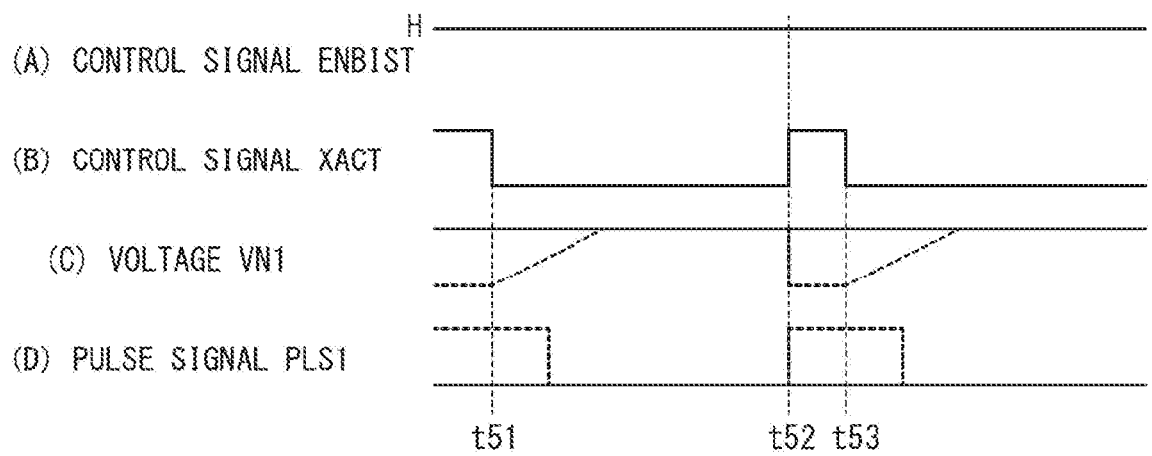
[ FIG. 16B ]
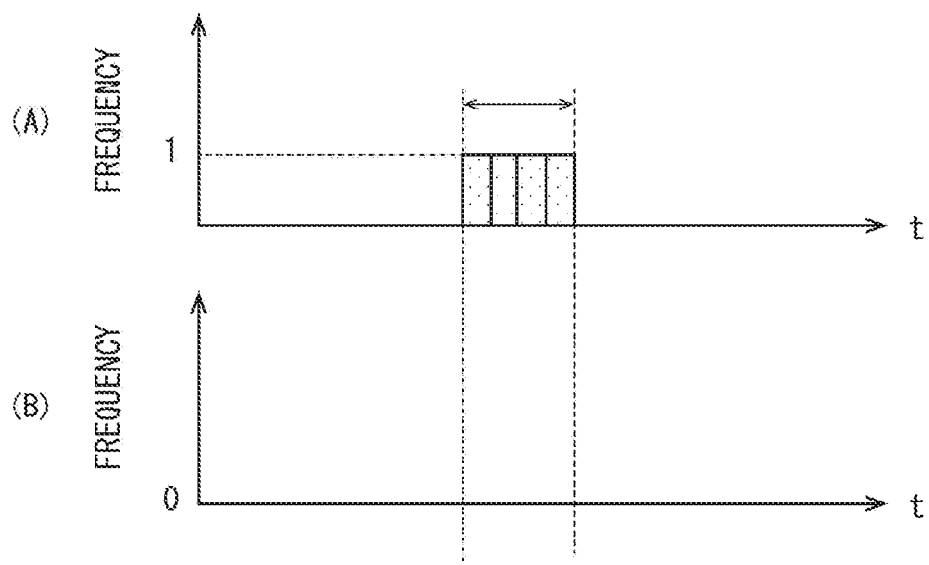

[ FIG. 17A ]
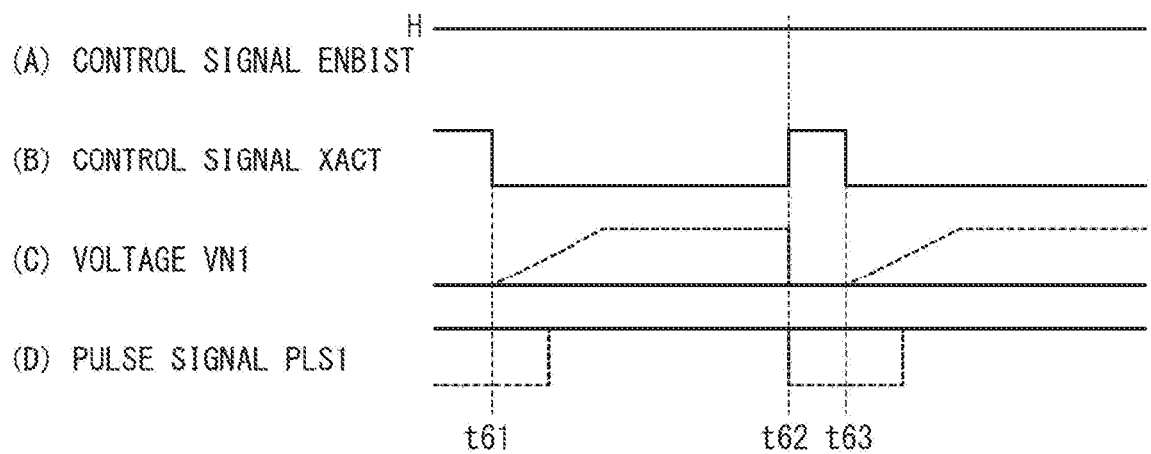
[ FIG. 17B ]
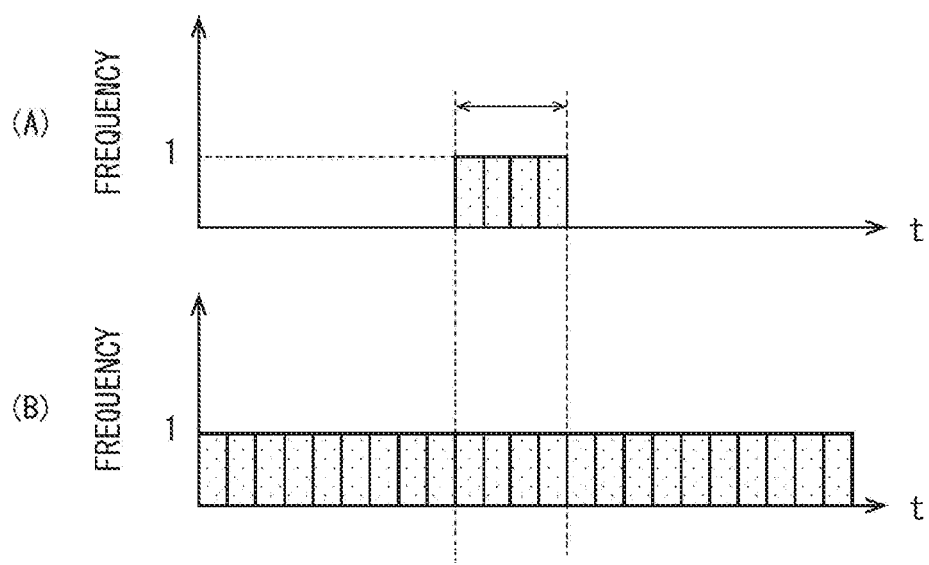

[ FIG. 18 ]
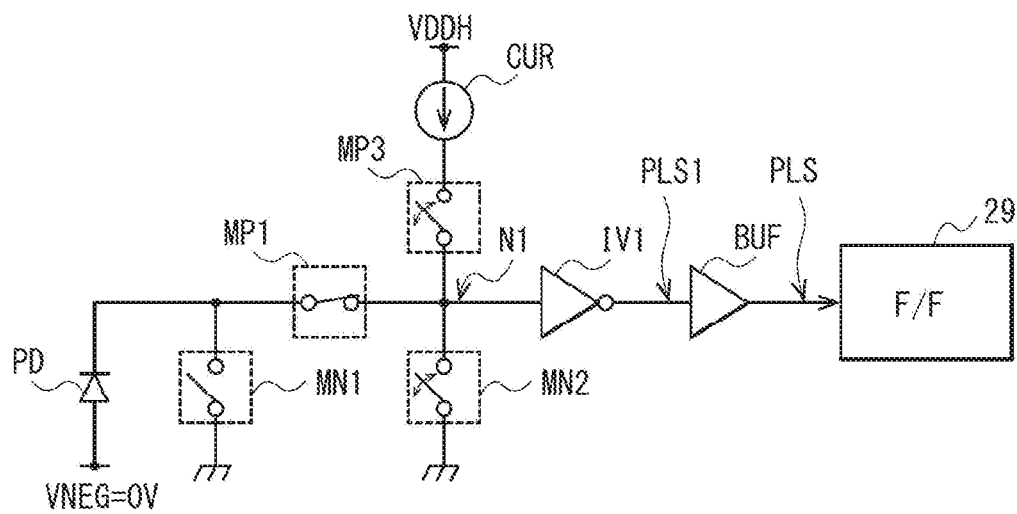
[ FIG. 19A ]
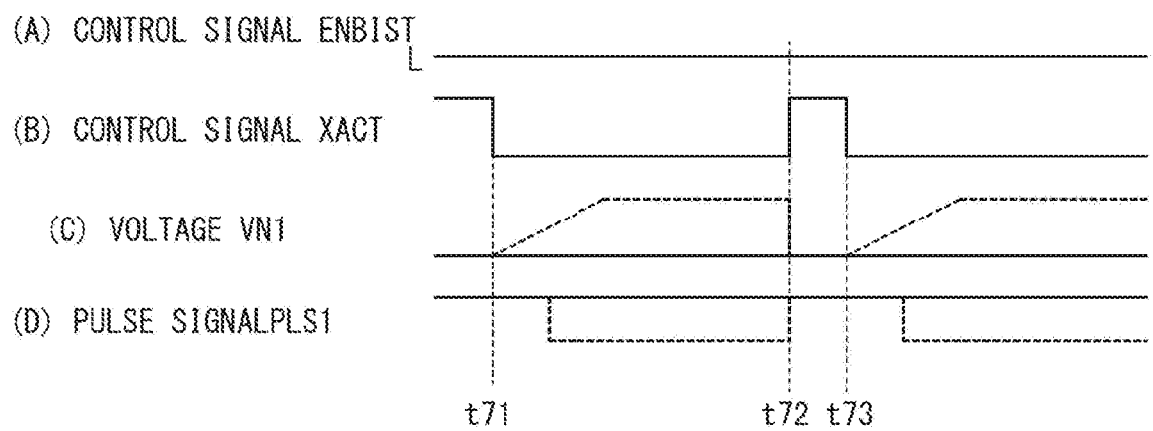

[ FIG. 19B ]
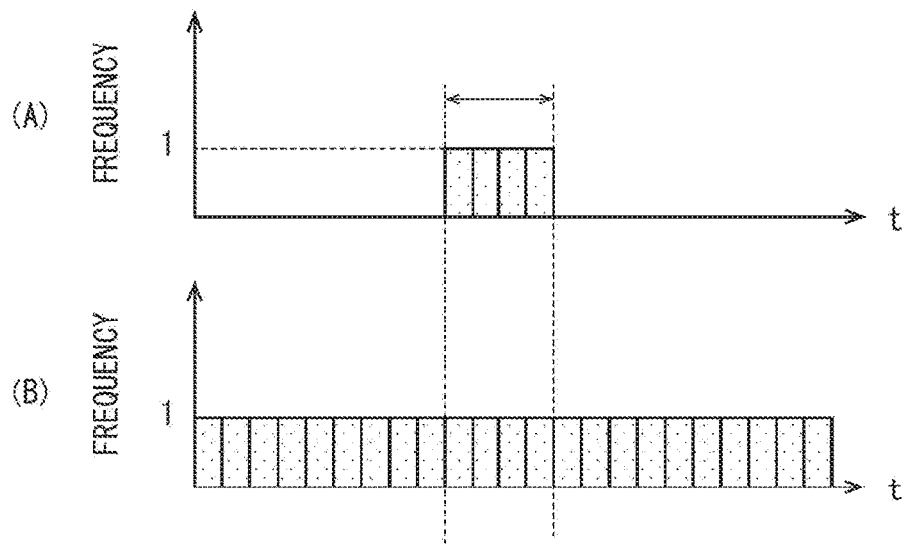
[ FIG. 20 ]
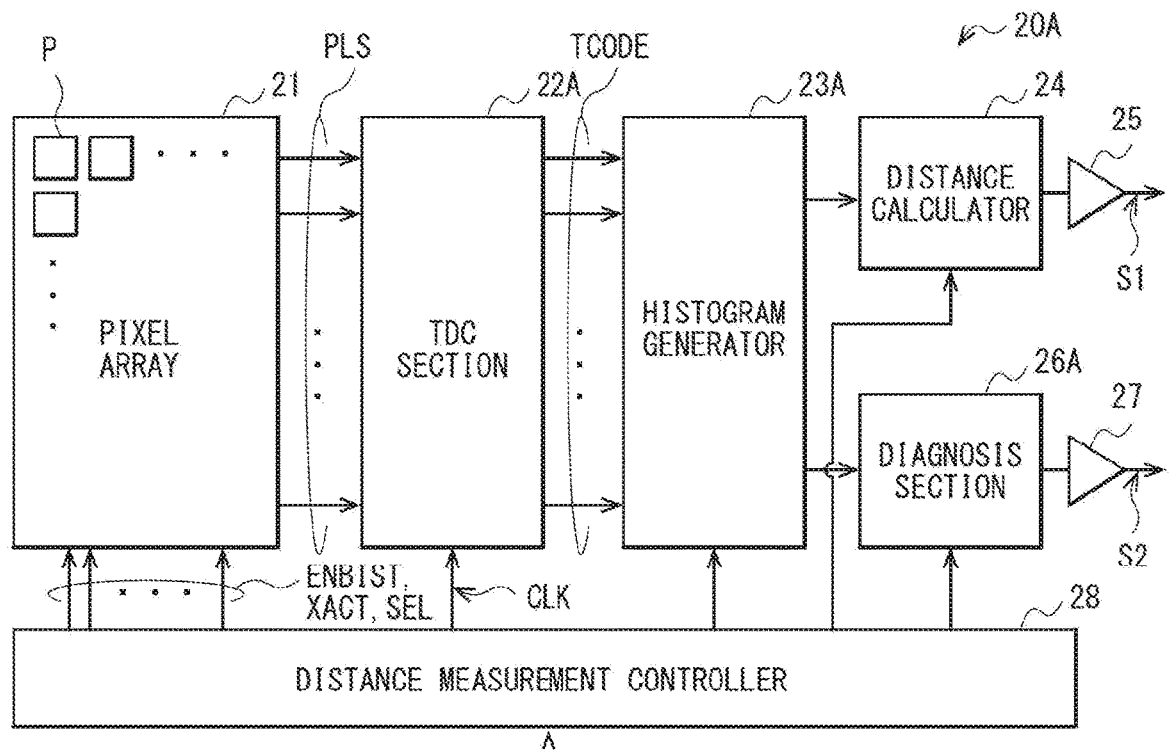

[ FIG. 21 ]
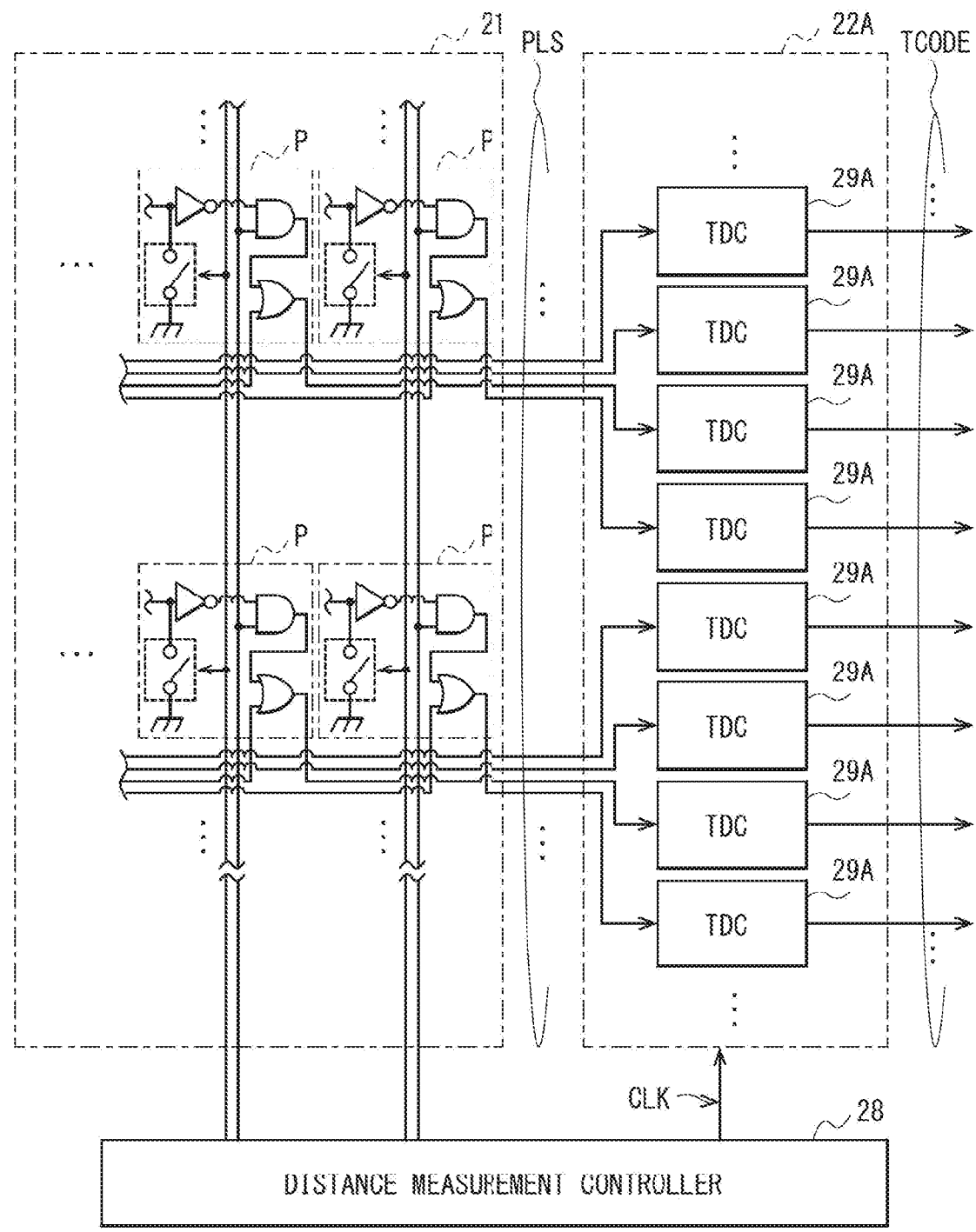

[ FIG. 22 ]
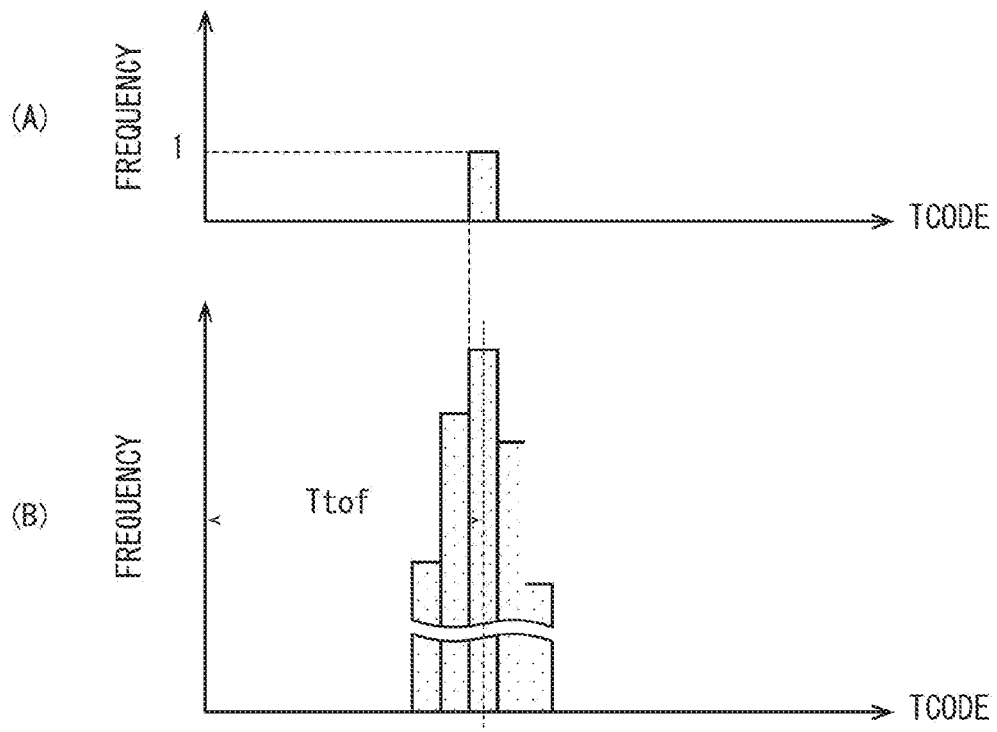
[ FIG. 23 ]
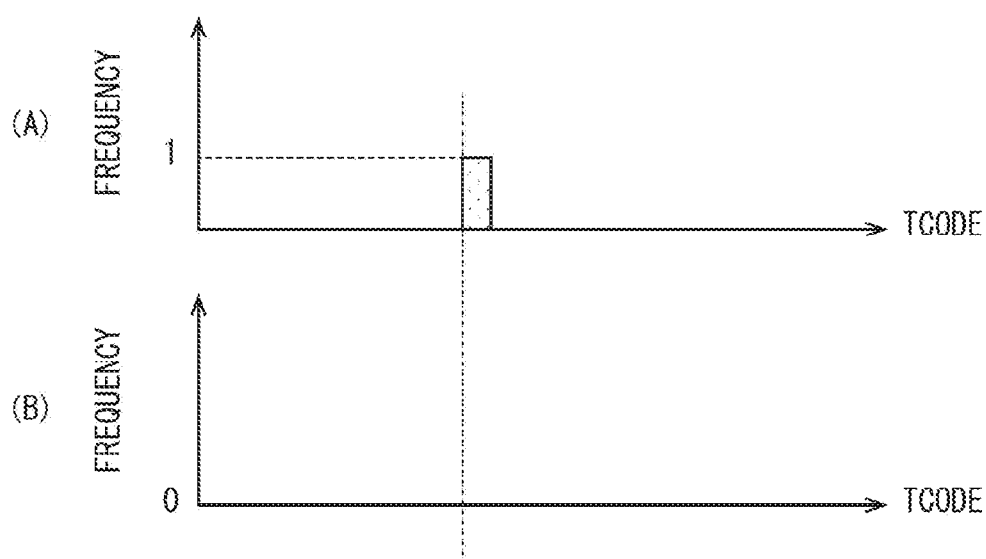

[ FIG. 24 ]
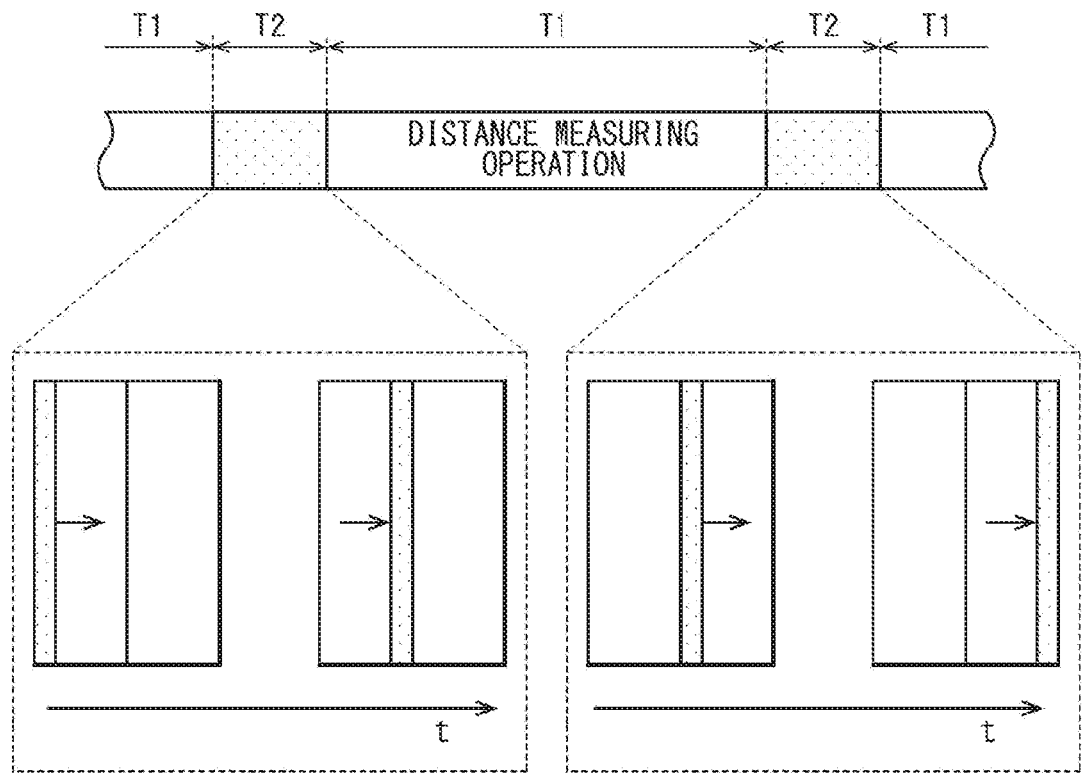
[ FIG. 25 ]
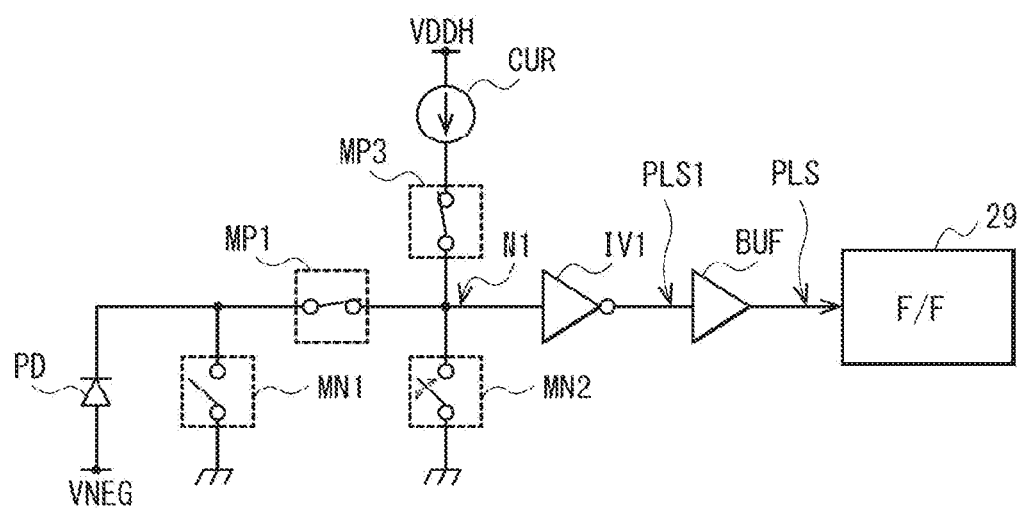

[ FIG. 27 ]
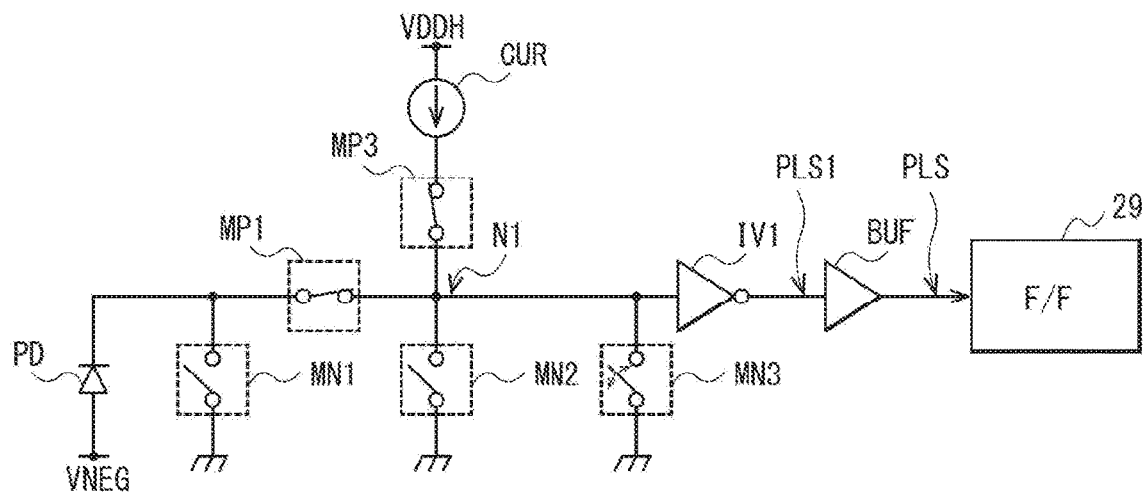
[ FIG. 28 ]
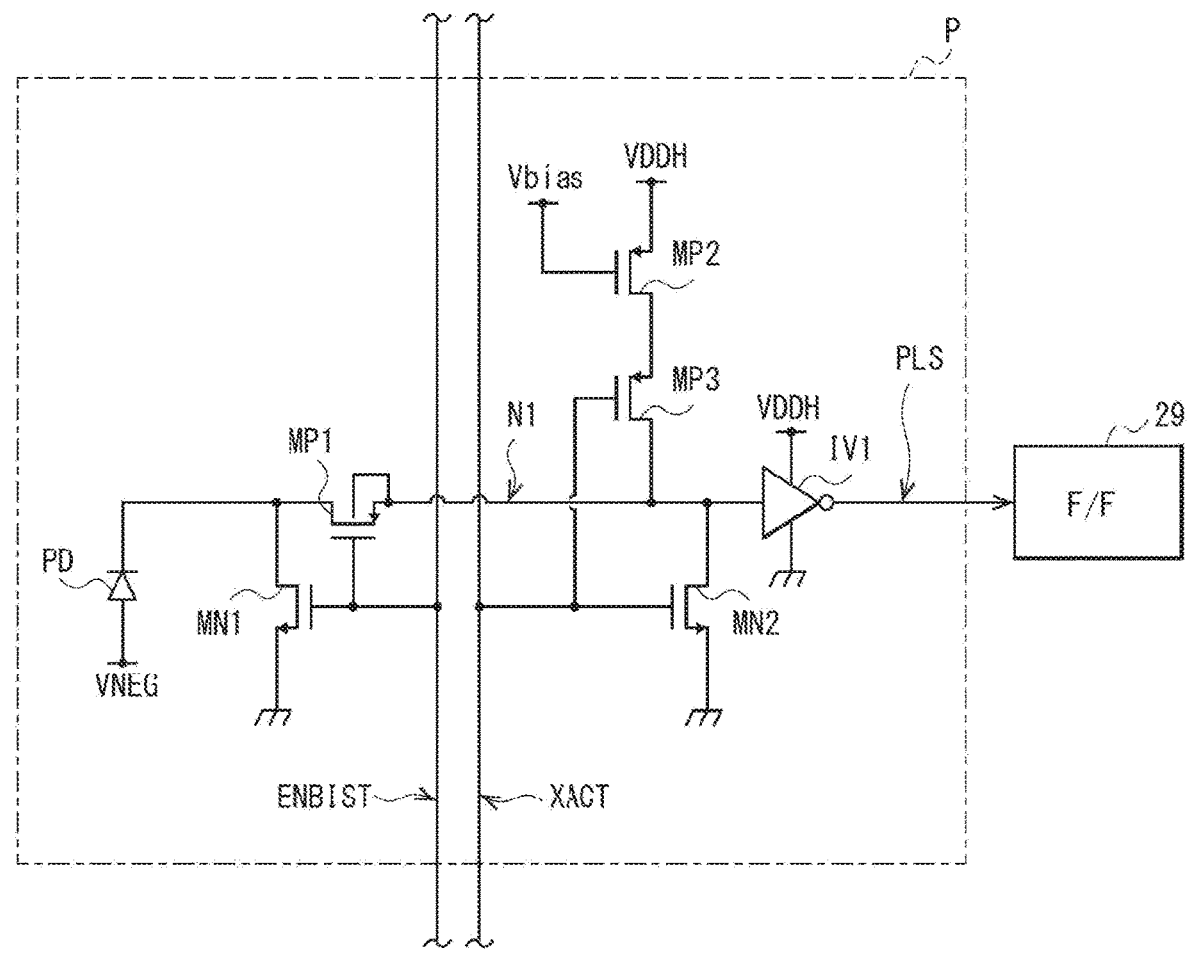

[FIG. 29]
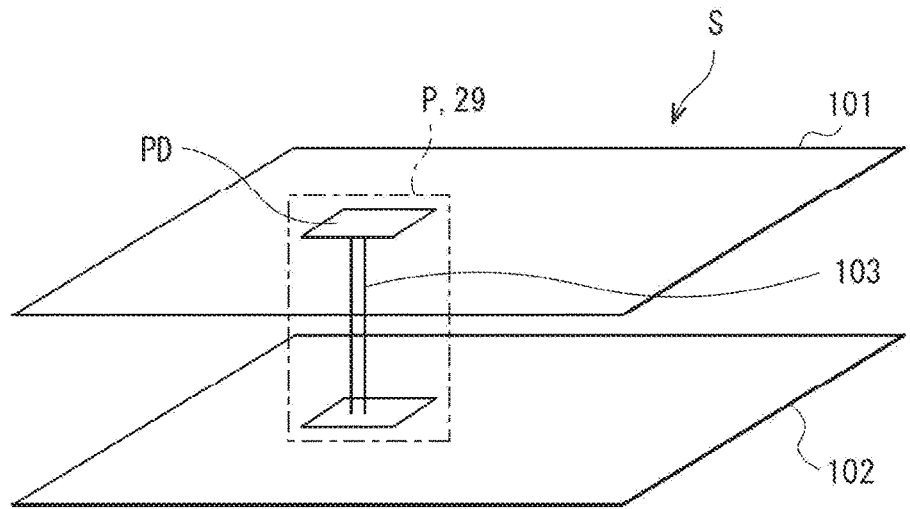
[FIG. 30]
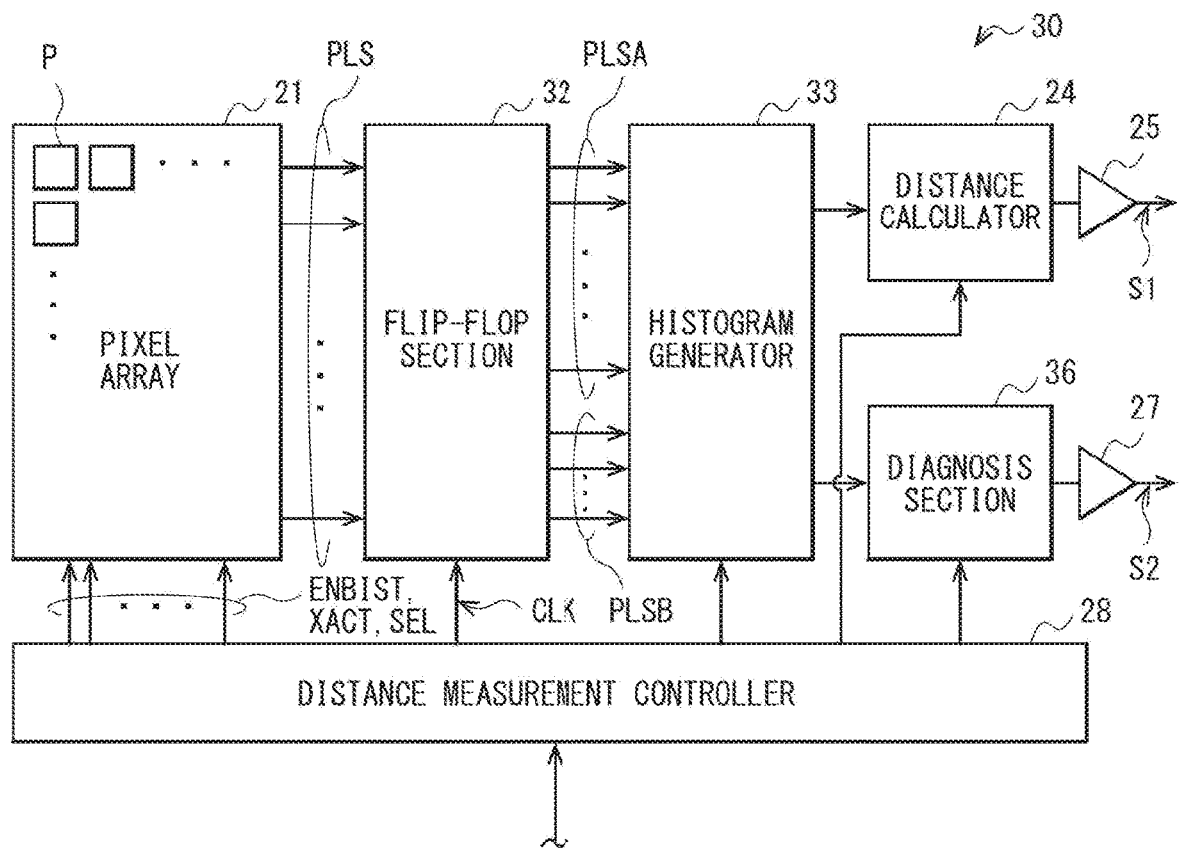

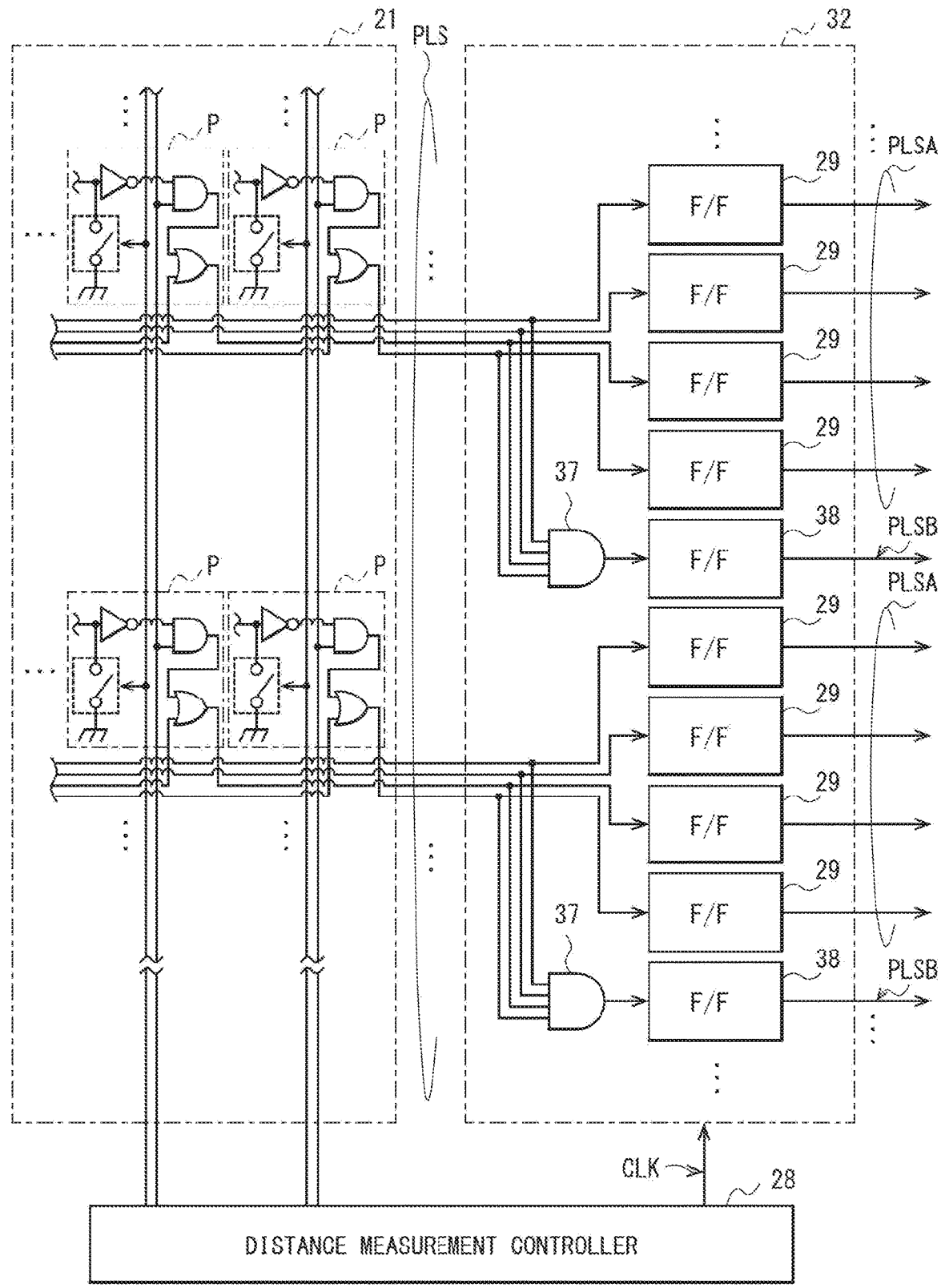
[FIG. 31]

[FIG. 32]
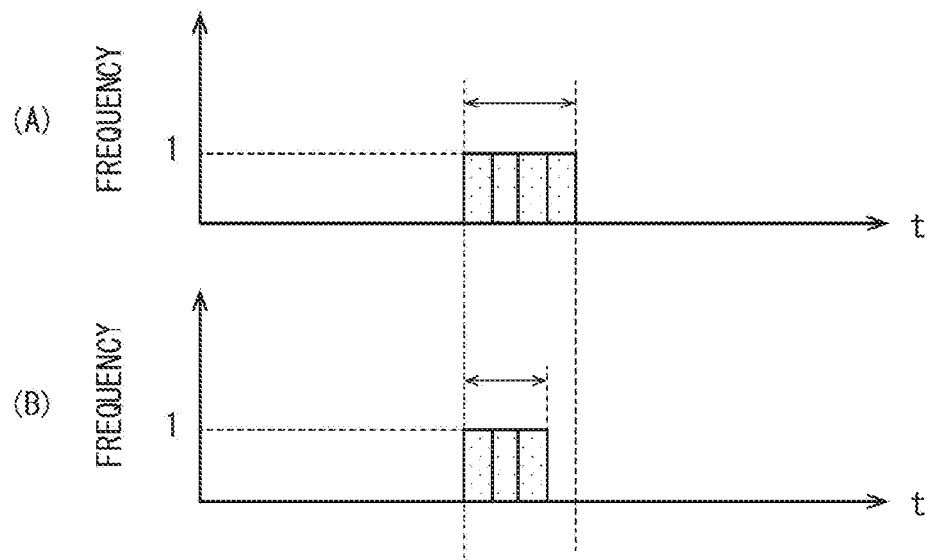
[FIG. 33]
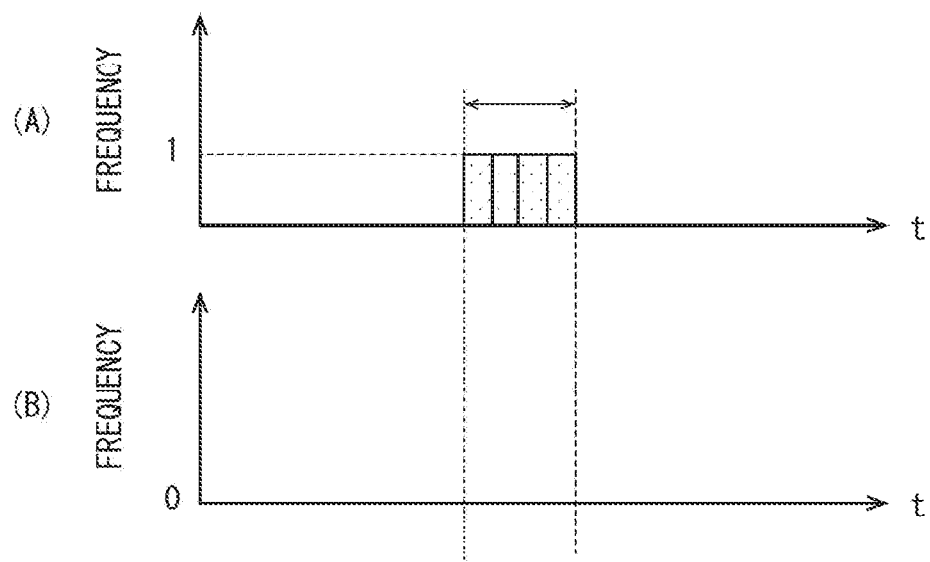

[FIG. 34]
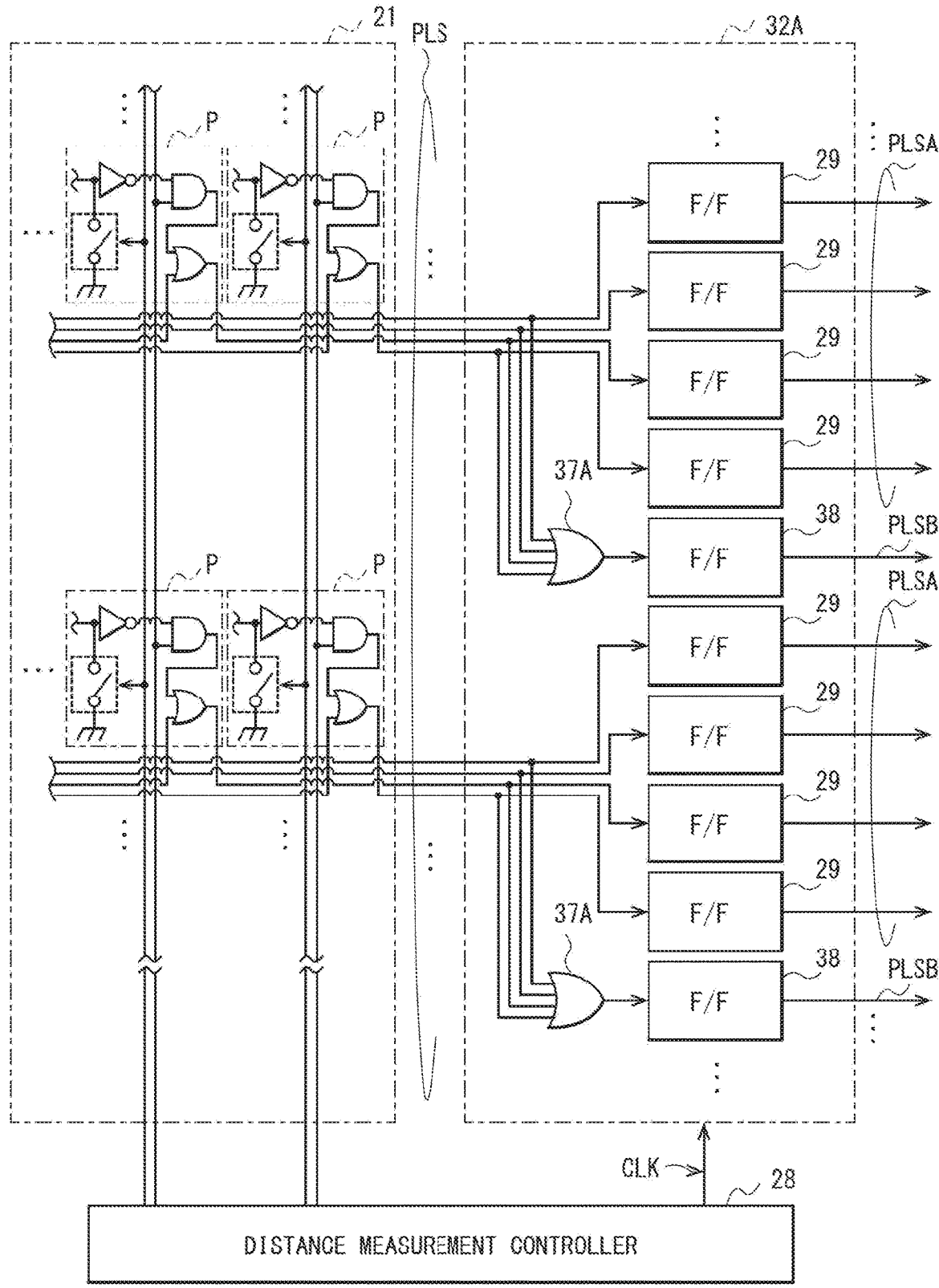

[ FIG. 35 ]
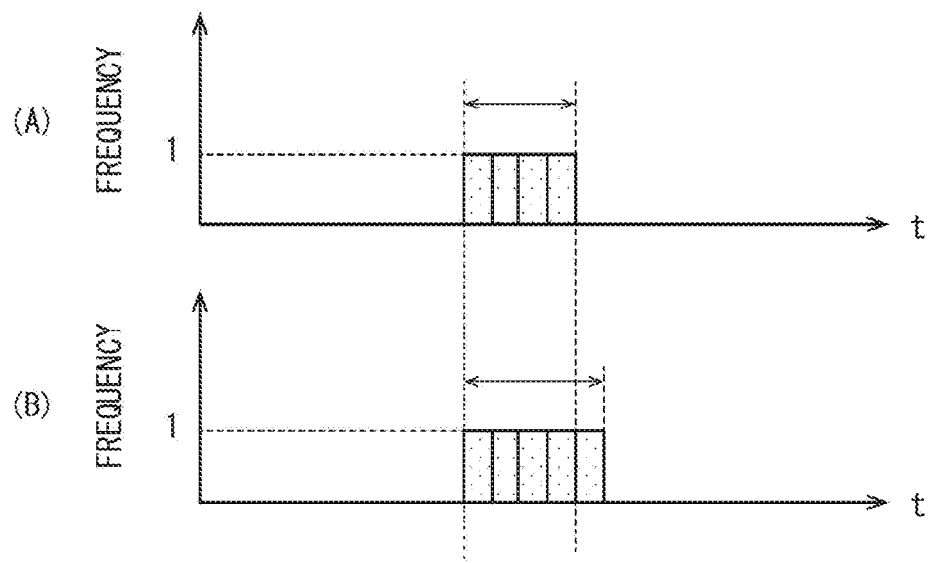
[ FIG. 36 ]
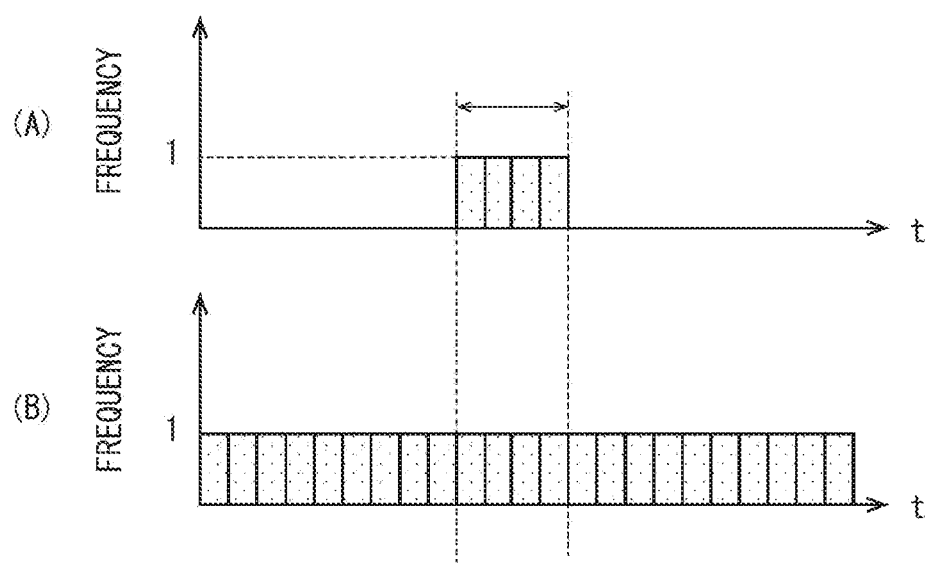

[FIG. 37]
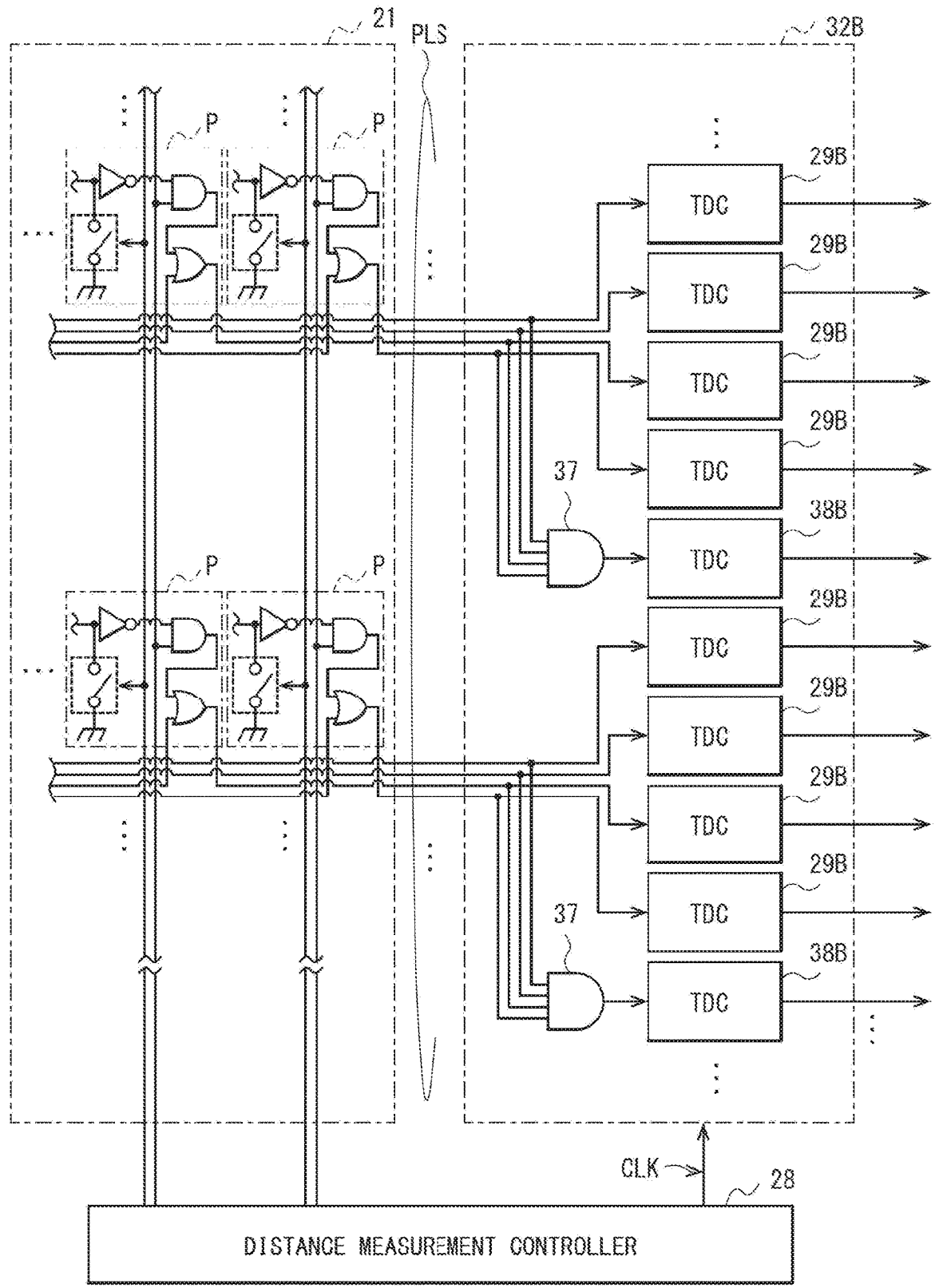

[ FIG. 42 ]
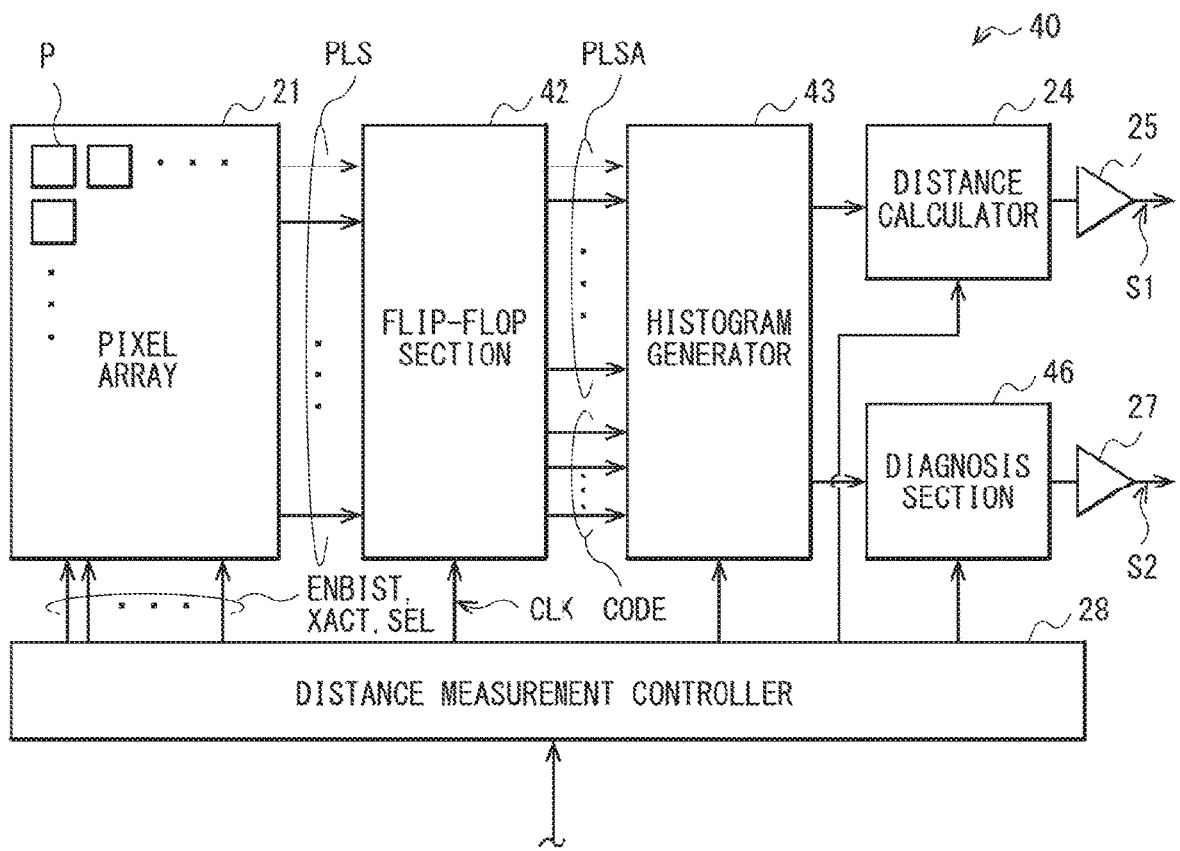

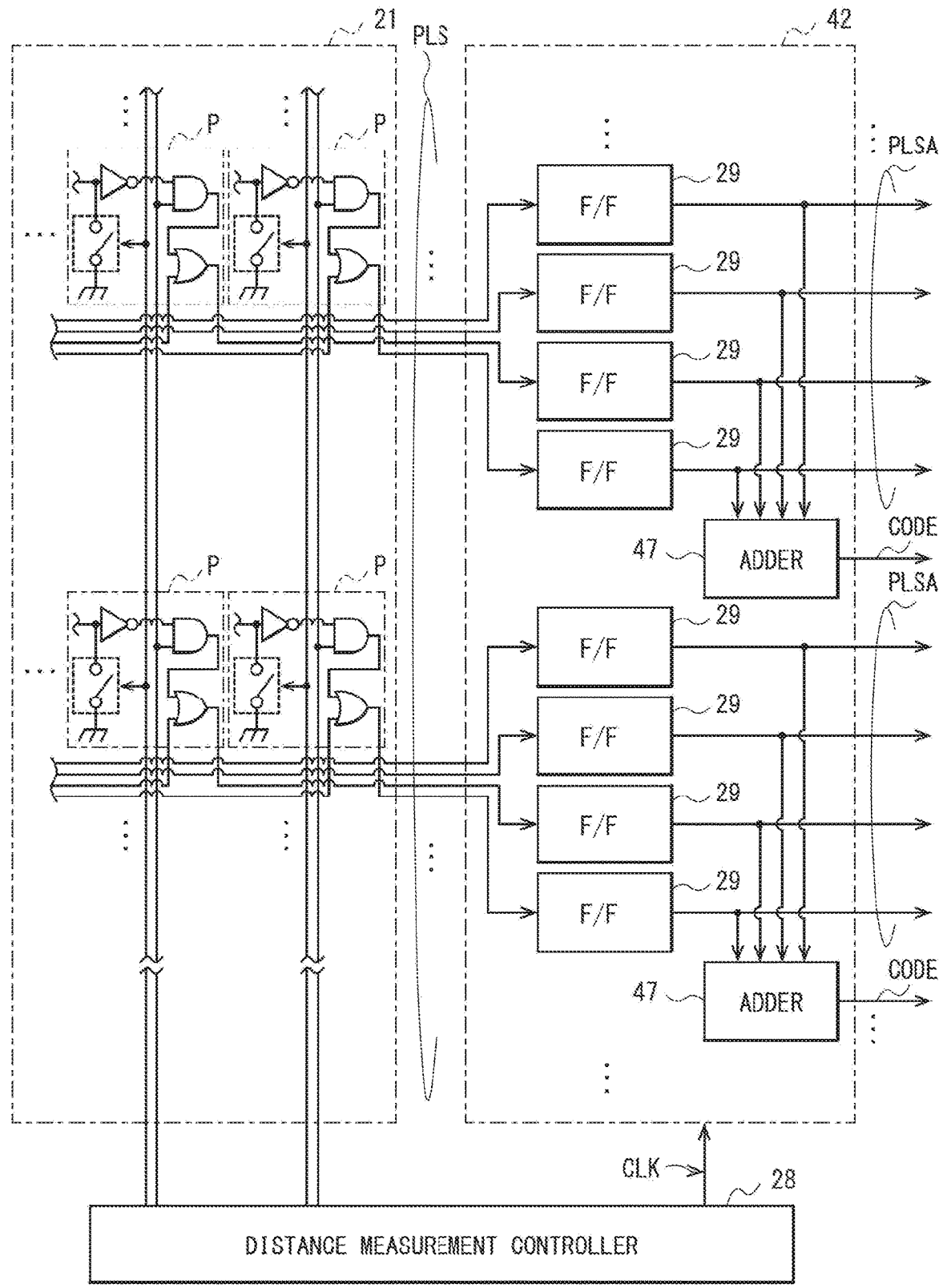
[FIG. 43]

[ FIG. 44 ]
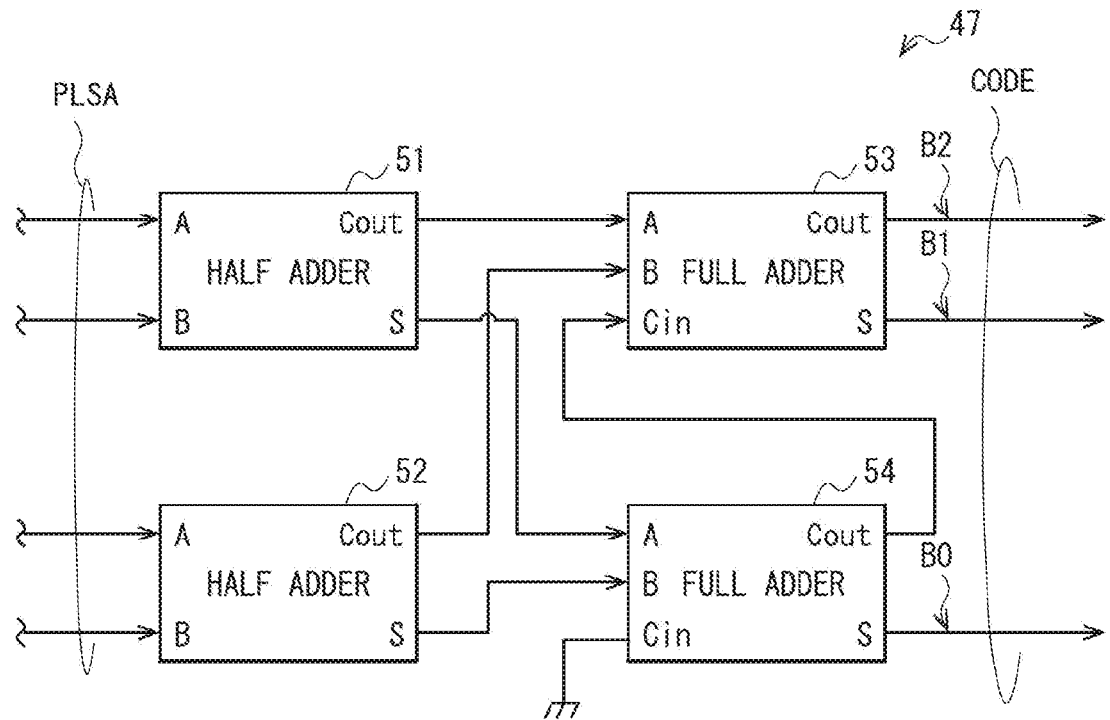
[ FIG. 45 ]
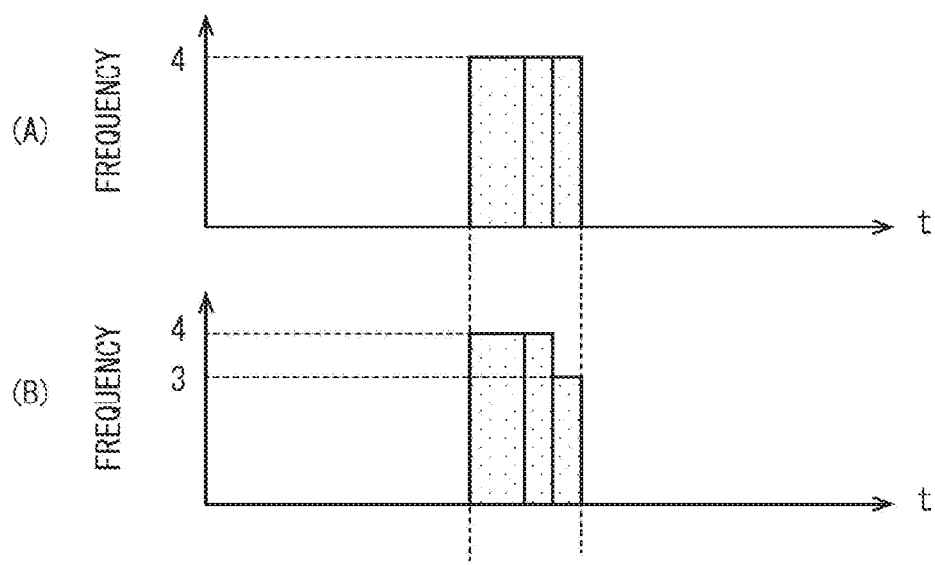

[ FIG. 46 ]
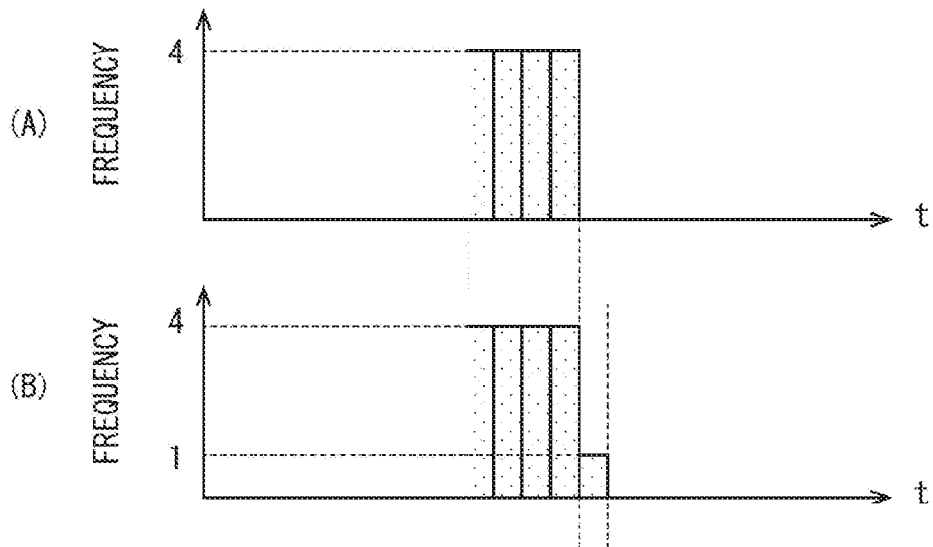
[ FIG. 47 ]
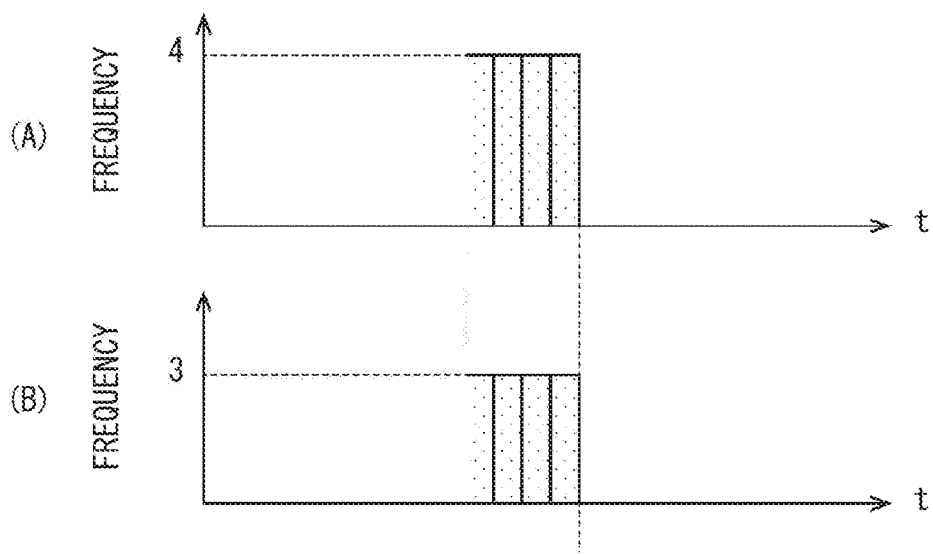

[ FIG. 48 ]
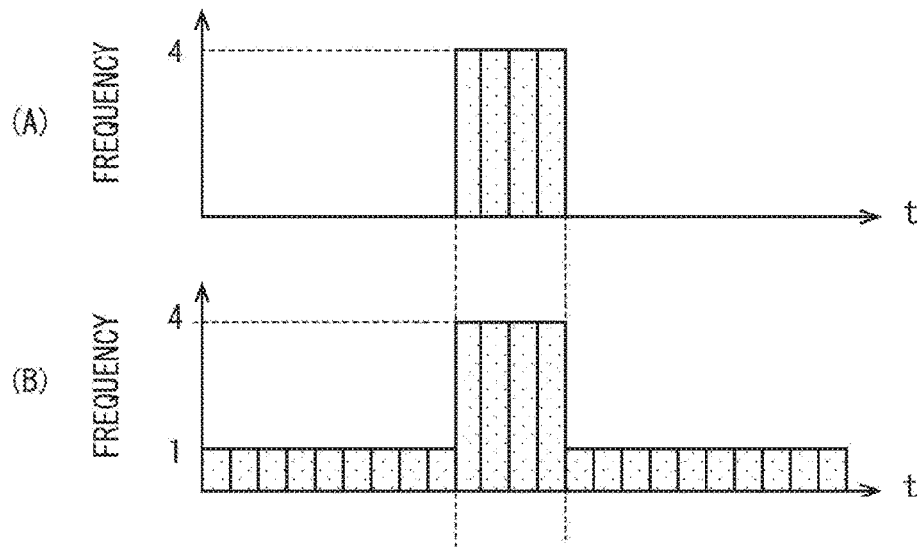
[ FIG. 49 ]
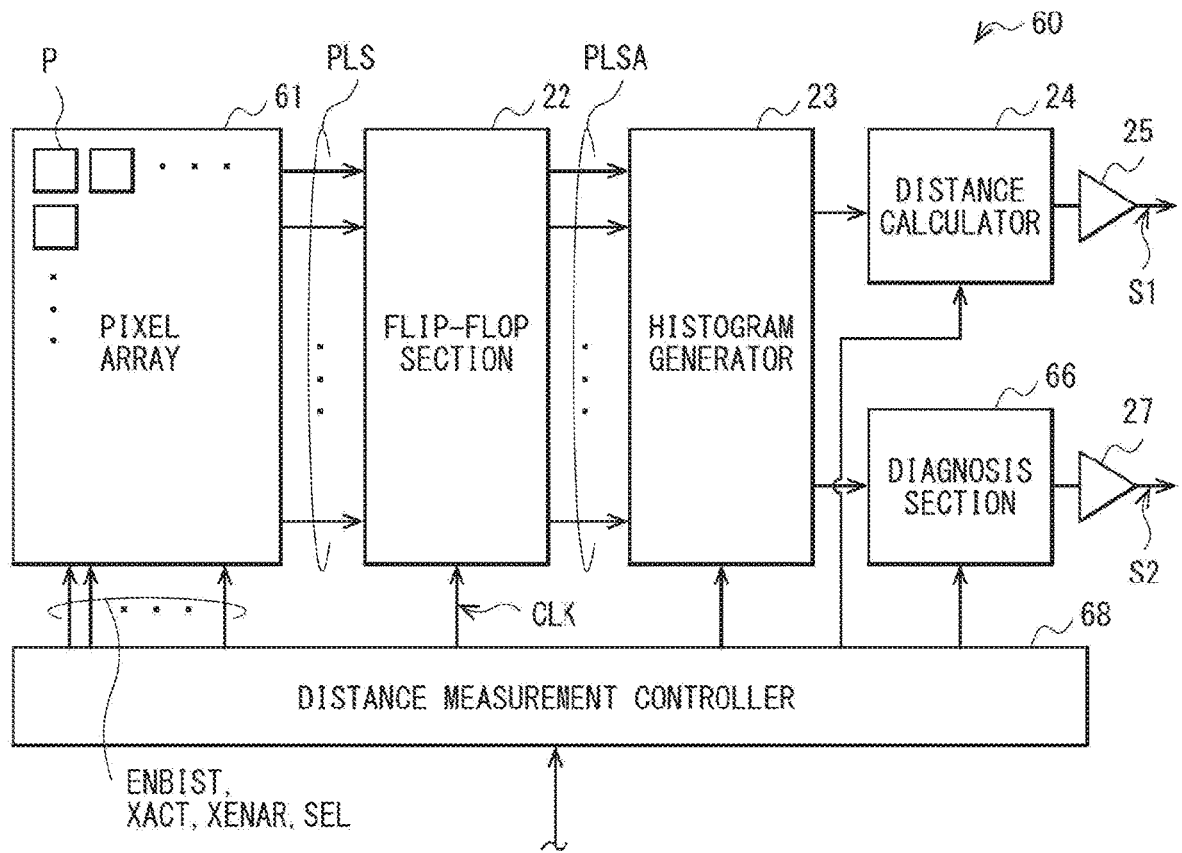

[FIG. 51]
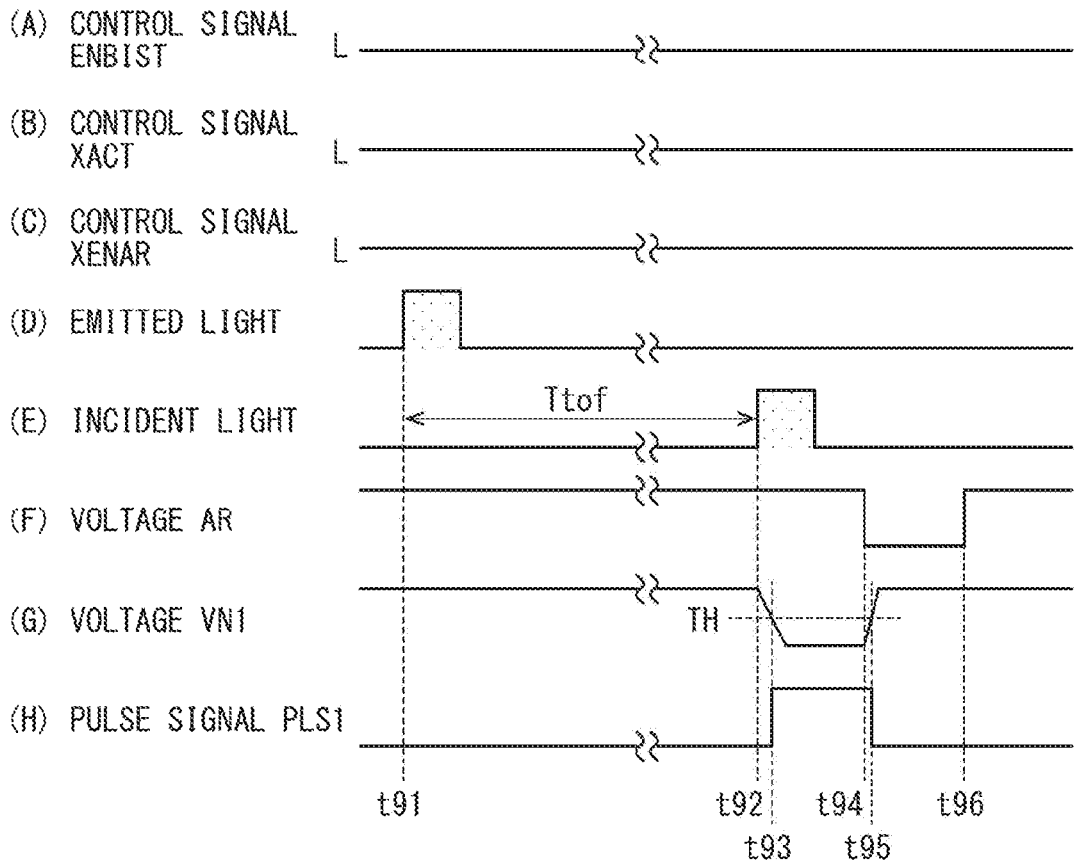
[FIG. 52]
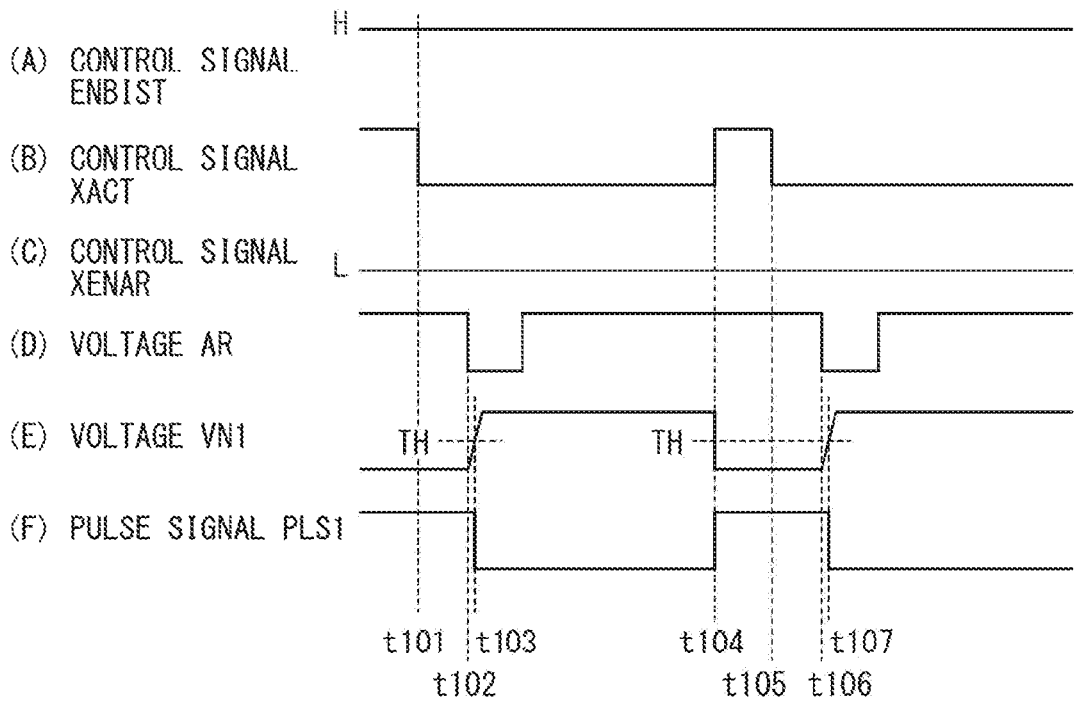

[ FIG. 53 ]
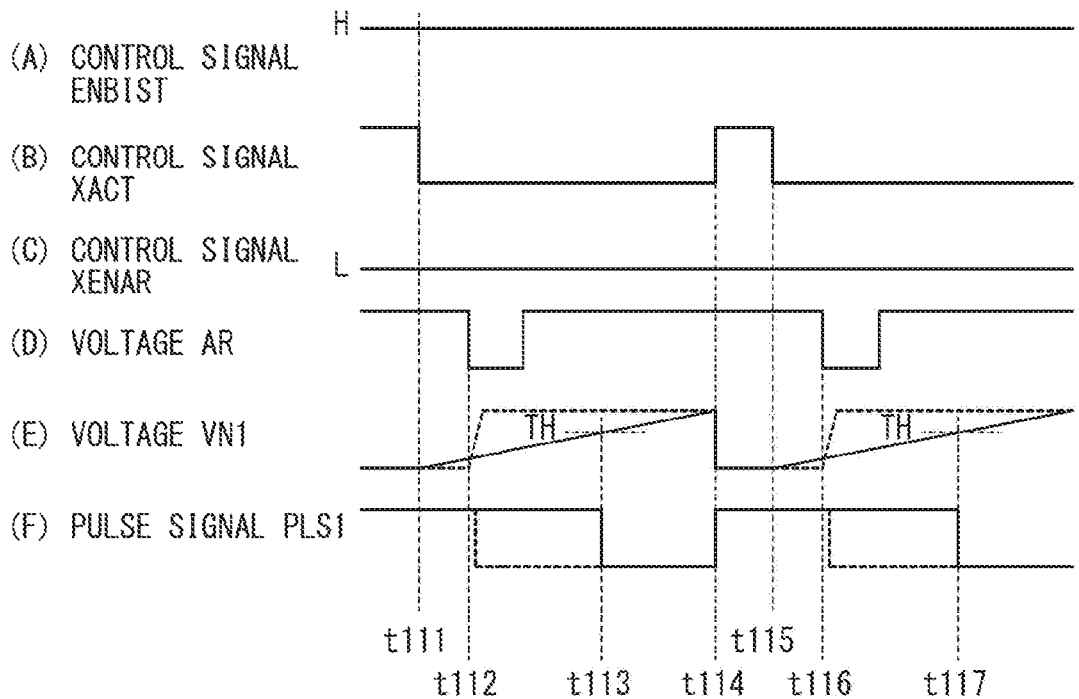
[ FIG. 54 ]
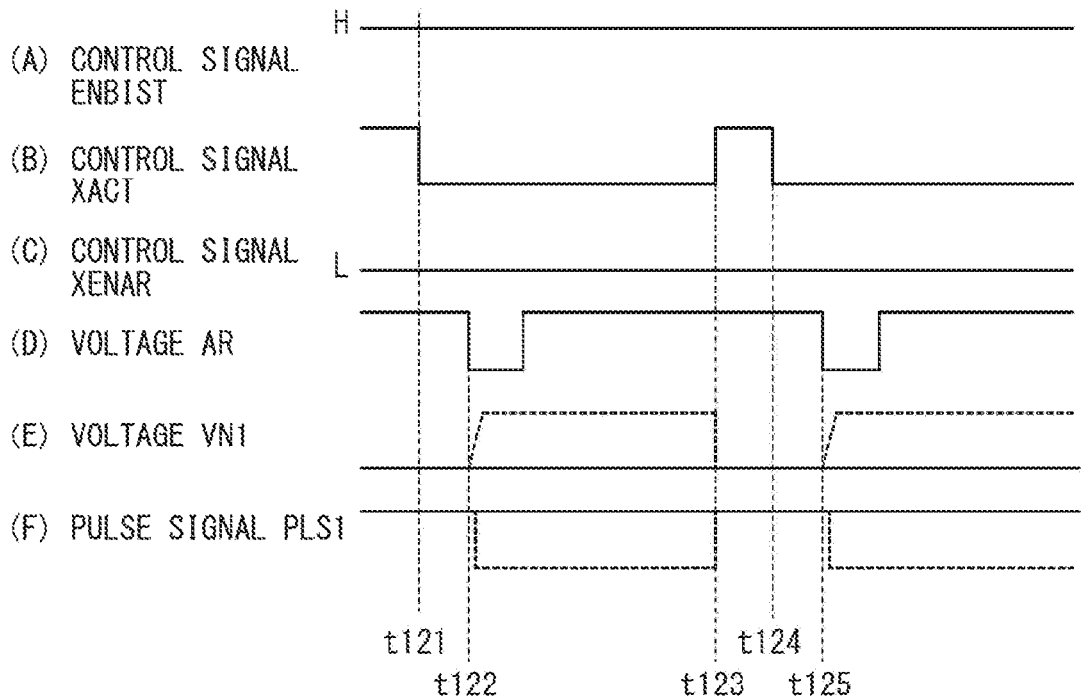

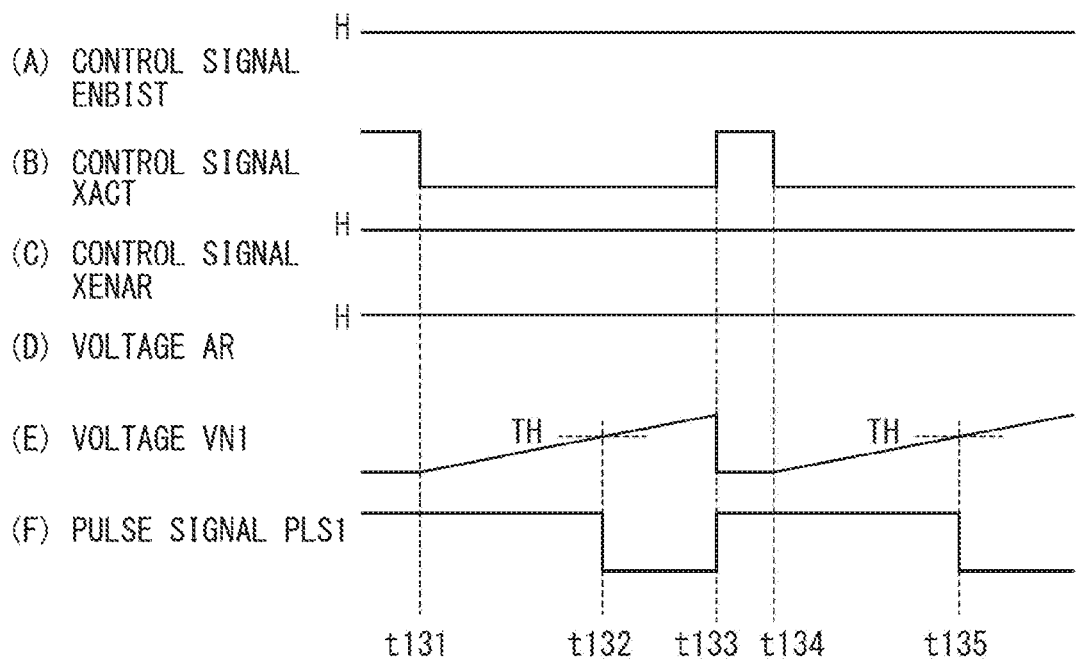
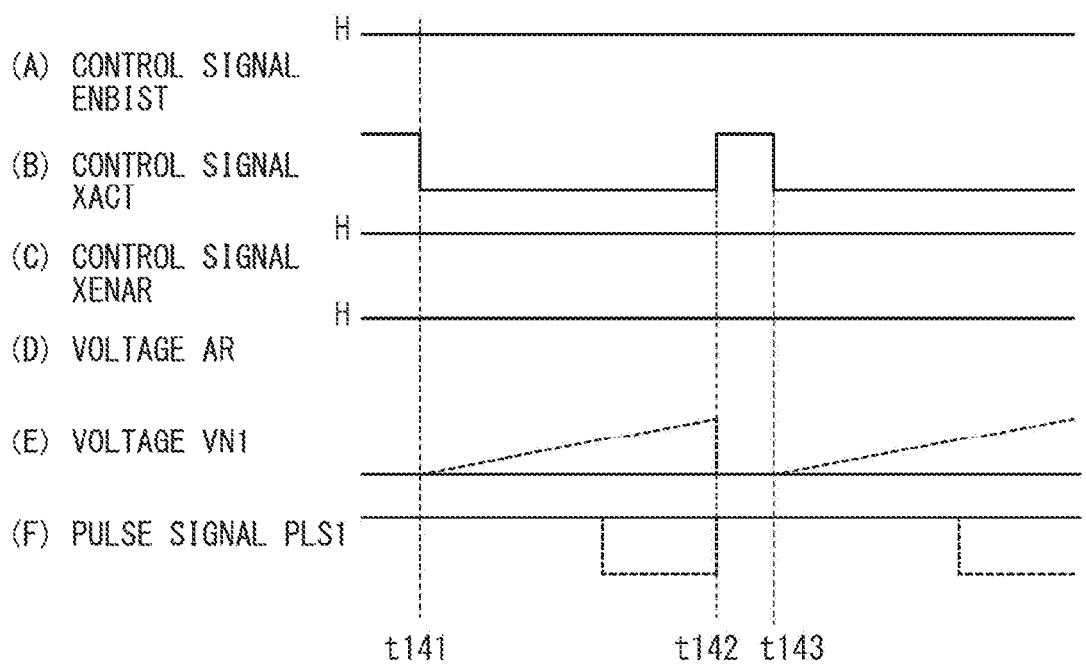

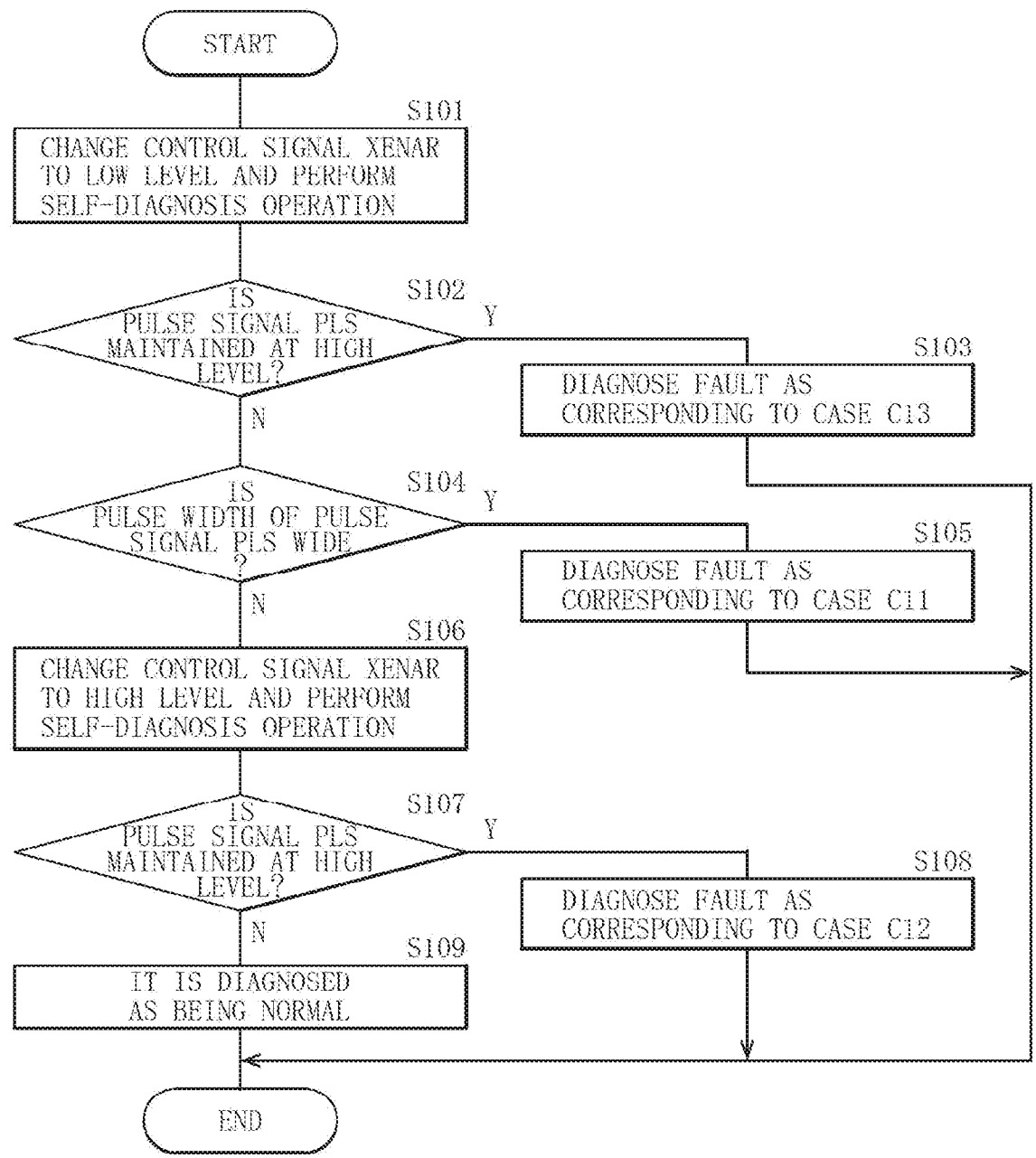

[ FIG. 59 ]
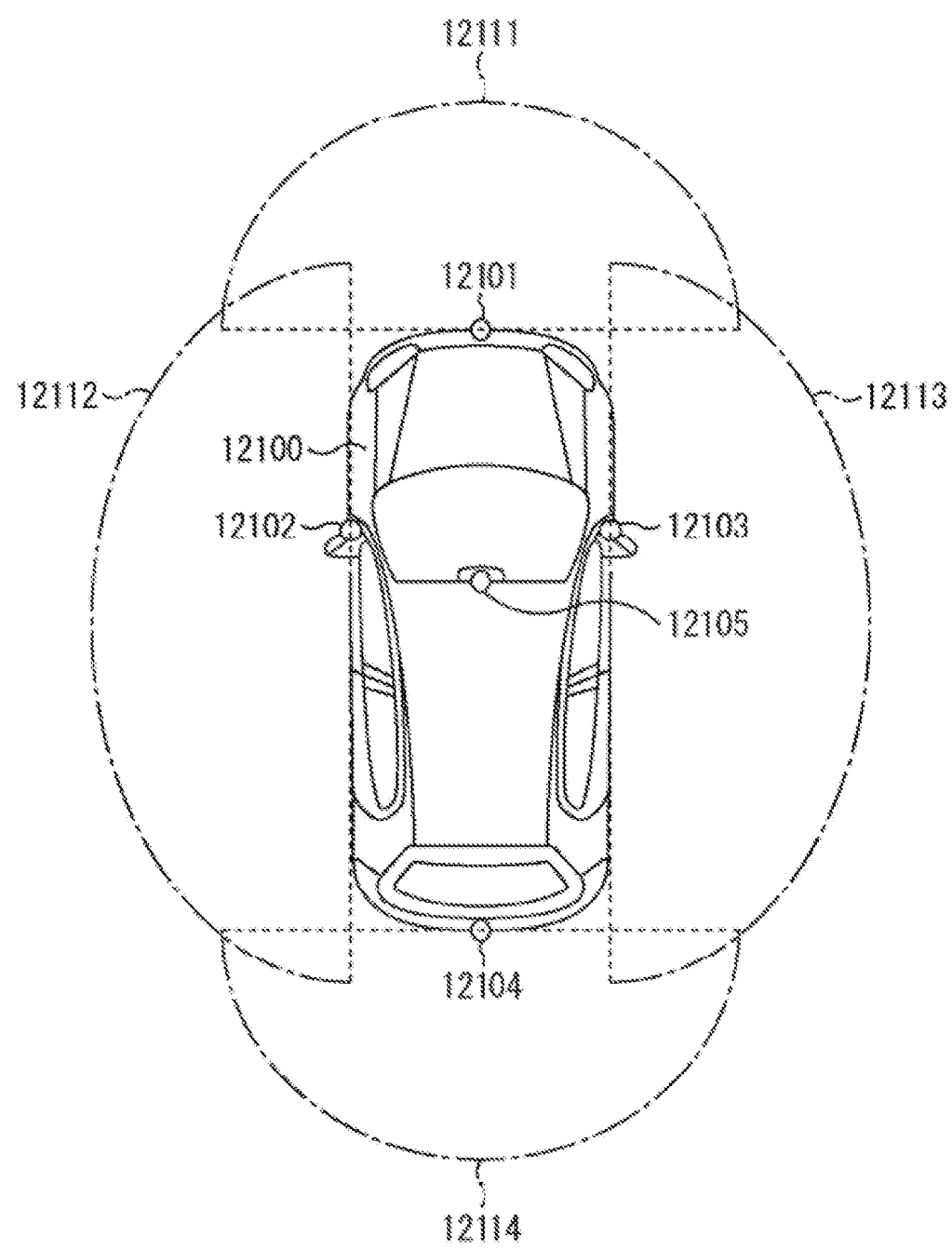

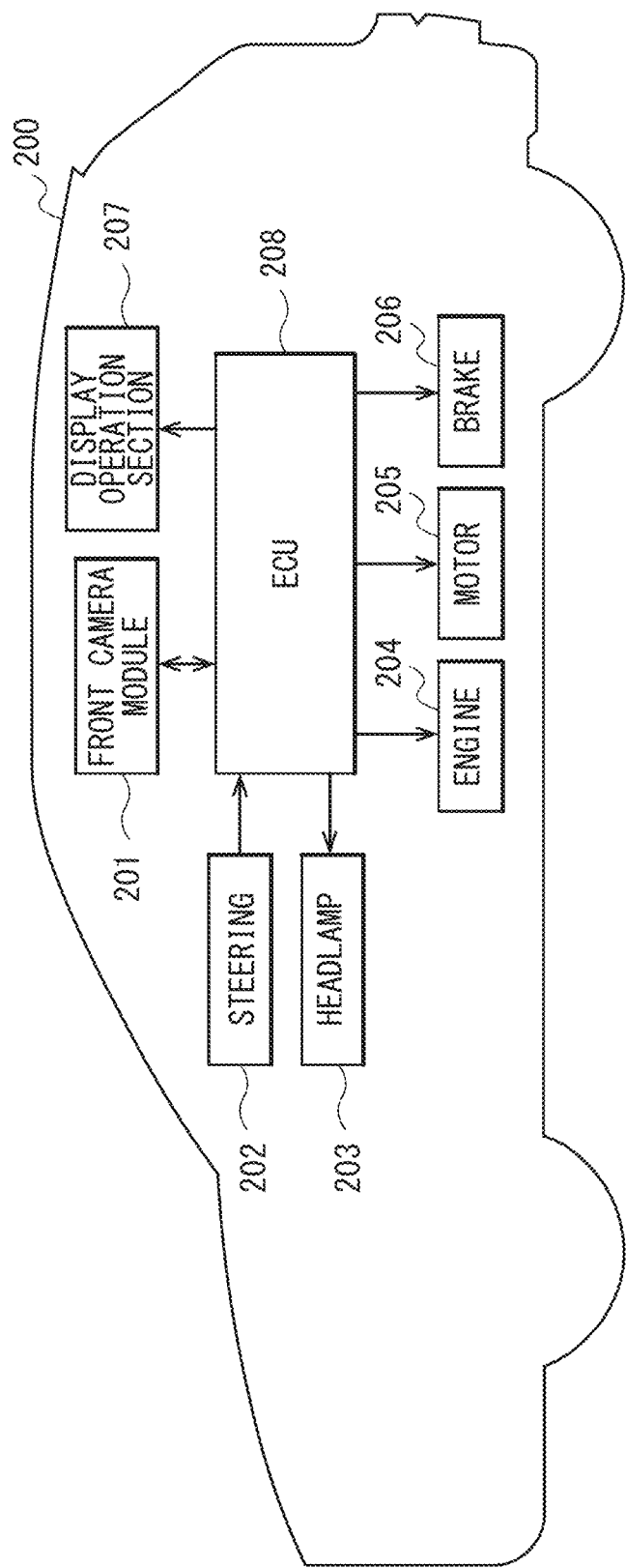

[ FIG. 61 ]
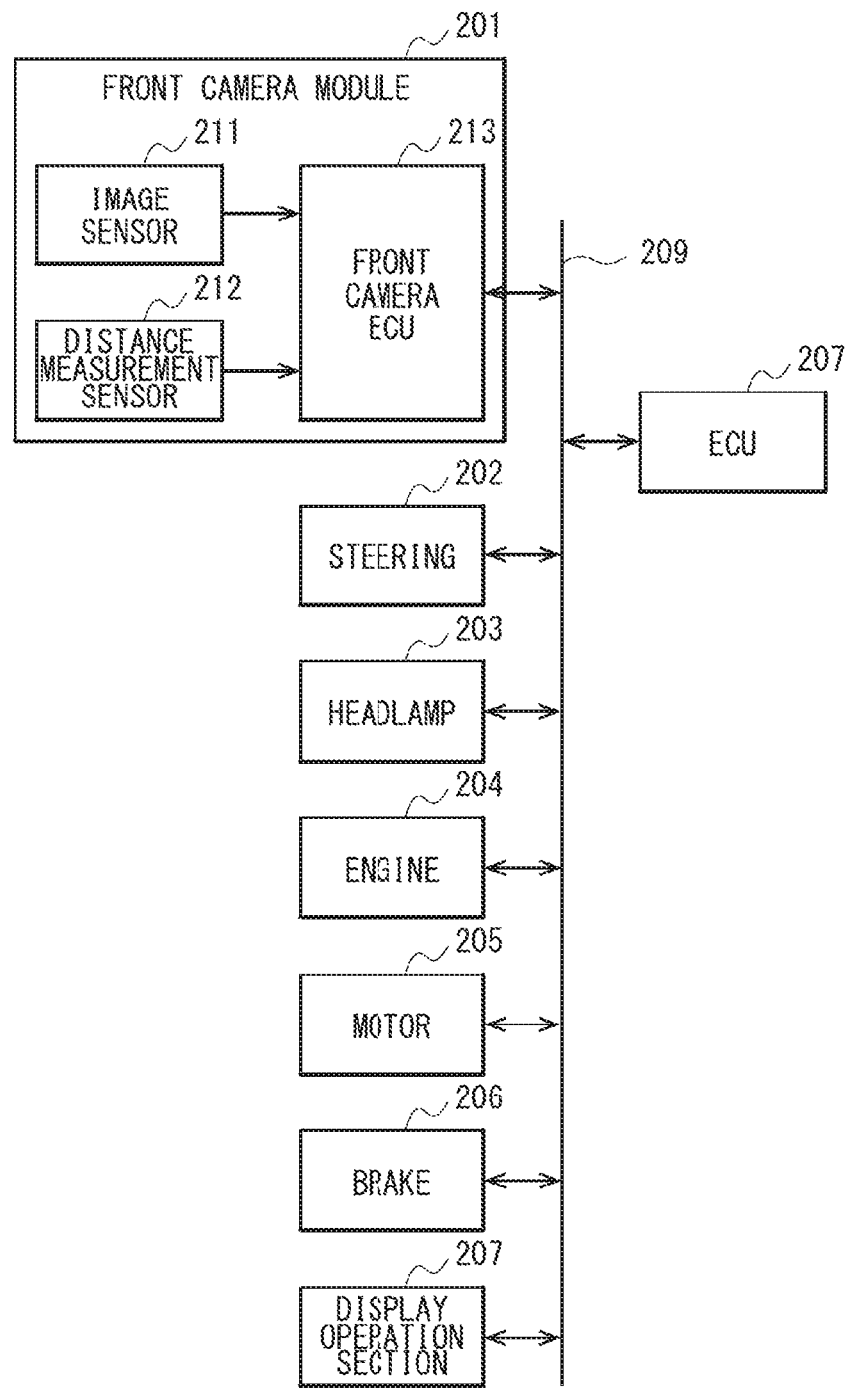

[FIG. 62]
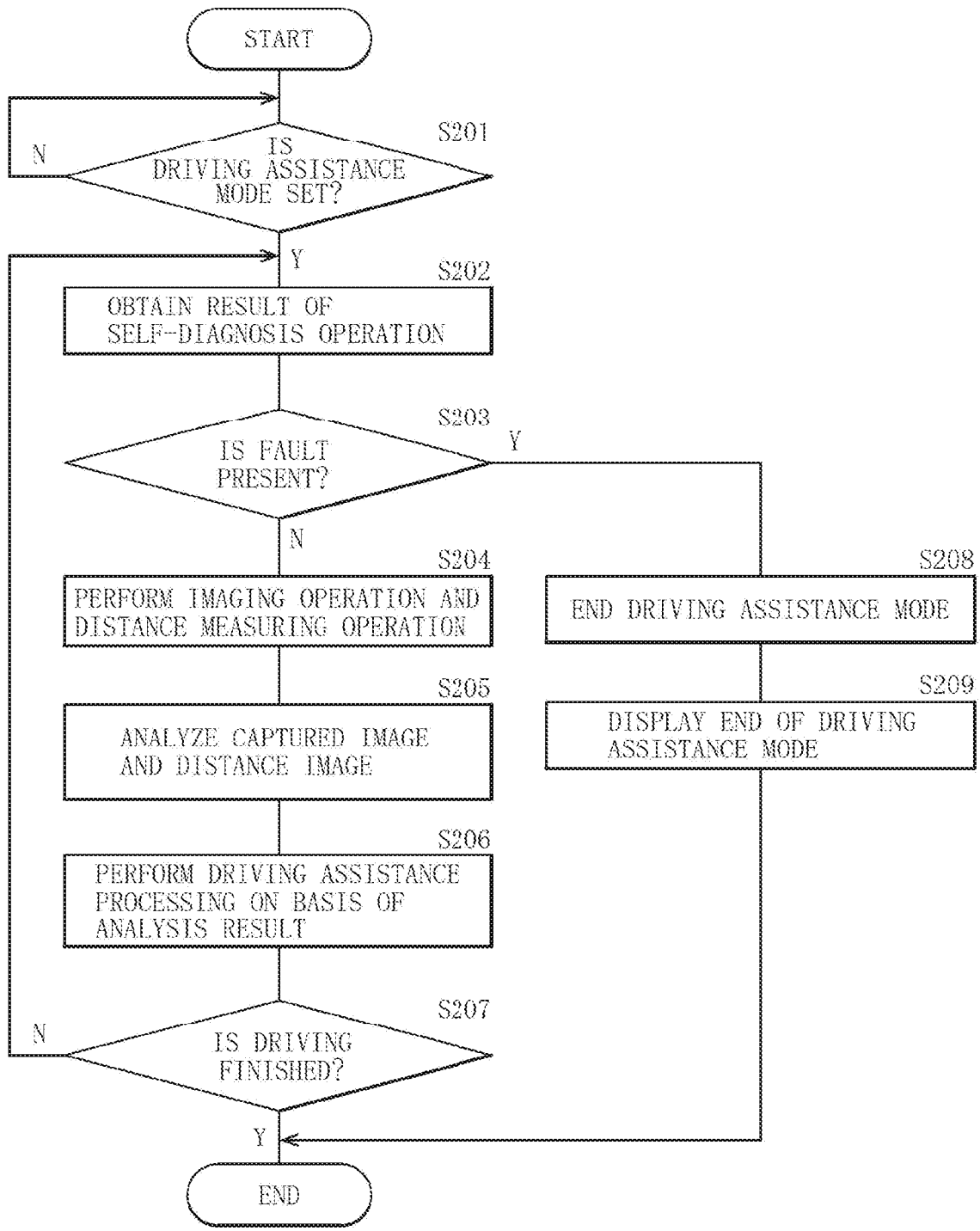

PHOTODETECTION DEVICE AND PHOTODETECTION SYSTEM

TECHNICAL FIELD

The present disclosure relates to a photodetection device and a photodetection system that detect light.

BACKGROUND ART

A TOF (Time OF Flight) method is frequently used to measure a distance to a measurement object. In this TOF method, light is emitted, and reflected light reflected by the measurement object is detected. Then, in the TOF method, the distance to the measurement object is measured by measuring a time difference between a timing at which the light is emitted and a timing at which the reflected light is detected. Some of such distance measuring devices have a BIST (Built-in self test) function. For example, PTL 1 discloses a technology for detecting a fault in a light-receiving section with use of light reflected within a housing.

CITATION LIST

Patent Literature

PTL 1: Japanese Unexamined Patent Application Publication No. 2020-112501

SUMMARY OF THE INVENTION

Thus, in a photodetection device, it is desired to perform self-diagnosis by a BIST function and diagnose presence or absence of a fault.

It is desirable to provide a photodetection device and a photodetection system that are able to perform self-diagnosis.

A photodetection device according to an embodiment of the present disclosure includes a light-receiving section, a controller, a detector, and an output section. The light-receiving section is configured to include a light-receiving element, a first switch, a second switch, and a signal generator. The first switch couples the light-receiving element to a first node by being turned on. The second switch applies a predetermined voltage to the first node by being turned on. The signal generator generates a pulse signal on the basis of a voltage at the first node. The controller is configured to control operations of the first switch and the second switch. The detector is configured to detect a timing at which the pulse signal is changed, on the basis of the pulse signal. The output section is configured to output a detection signal corresponding to a detection result by the detector when the second switch is turned on.

A photodetection system according to an embodiment of the present disclosure includes a light-emitting section and a photodetector. The light-emitting section is configured to emit light. The photodetector is configured to detect light reflected by a measurement object of the light emitted from the light-emitting section. The photodetector includes a light-receiving section, a controller, a detector, and a output section. The light-receiving section is configured to include a light-receiving element, a first switch, a second switch, and a signal generator. The first switch couples the light-receiving element to a first node by being turned on. The second switch applies a predetermined voltage to the first node by being turned on. The signal generator generates a pulse signal on the basis of a voltage at the first node. The controller is configured to control operations of the first switch and the second switch. The detector is configured to detect a timing at which the pulse signal is changed, on the basis of the pulse signal. The output section is configured to output a detection signal corresponding to a detection result by the detector when the second switch is turned on.

In the photodetection device and the photodetection system according to the embodiments of the present disclosure, in the light-receiving section, the first node is coupled to the light-receiving element by turning on the first switch, and the predetermined voltage is applied to the first node by turning on the second switch. The pulse signal is generated on the basis of the voltage at the first node. The first switch and the second switch are controlled by the controller. The detector detects a timing at which the pulse signal is changed, on the basis of the pulse signal. The output section then outputs the detection signal corresponding to the detection result by the detector when the second switch is turned on.

BRIEF DESCRIPTION OF DRAWINGS

FIG. 1 is a block diagram illustrating a configuration example of a photodetection system according to an embodiment of the present disclosure.

FIG. 2 is a block diagram illustrating a configuration example of a photodetector according to a first embodiment.

FIG. 3 is a circuit diagram illustrating a configuration example of a light-receiving section illustrated in FIG. 2.

FIG. 5 is a circuit diagram illustrating a configuration example of a flip-flop section illustrated in FIG. 2.

FIG. 6 is an explanatory diagram illustrating an operation example of the photodetection system illustrated in FIG. 1.

FIG. 7 is an explanatory diagram illustrating an operation example of the pixel array illustrated in FIG. 2.

FIG. 8 is an explanatory diagram illustrating an operation state in a distance measuring operation of the light-receiving section illustrated in FIG. 3.

FIG. 9 is a timing waveform diagram illustrating an example of a distance measuring operation of the photodetection system illustrated in FIG. 1.

FIG. 10 is an explanatory diagram illustrating an example of a distance measuring operation of a histogram generator illustrated in FIG. 2.

FIG. 11 is an explanatory diagram illustrating an operation state in a self-diagnosis operation of the light-receiving section illustrated in FIG. 3.

FIG. 12 is a timing waveform diagram illustrating an example of the self-diagnosis operation of the light-receiving section illustrated in FIG. 3.

FIG. 13 is an explanatory diagram illustrating an example of a self-diagnosis operation of the histogram generator illustrated in FIG. 2.

FIG. 14A is another timing waveform diagram illustrating an example of the self-diagnosis operation of the light-receiving section illustrated in FIG. 3.

FIG. 14B is another explanatory diagram illustrating an example of the self-diagnosis operation of the histogram generator illustrated in FIG. 2.

FIG. 15A is another timing waveform diagram illustrating an example of the self-diagnosis operation of the light-receiving section illustrated in FIG. 3.

FIG. 15B is another explanatory diagram illustrating an example of the self-diagnosis operation of the histogram generator illustrated in FIG. 2.

FIG. 16A is another timing waveform diagram illustrating an example of the self-diagnosis operation of the light-receiving section illustrated in FIG. 3.

FIG. 16B is another explanatory diagram illustrating an example of the self-diagnosis operation of the histogram generator illustrated in FIG. 2.

FIG. 17A is another timing waveform diagram illustrating an example of the self-diagnosis operation of the light-receiving section illustrated in FIG. 3.

FIG. 17B is another explanatory diagram illustrating an example of the self-diagnosis operation of the histogram generator illustrated in FIG. 2.

FIG. 18 is an explanatory diagram illustrating another operation state in the self-diagnosis operation of the light-receiving section illustrated in FIG. 3.

FIG. 19A is another timing waveform diagram illustrating an example of the self-diagnosis operation of the light-receiving section illustrated in FIG. 3.

FIG. 19B is another explanatory diagram illustrating an example of the self-diagnosis operation of the histogram generator illustrated in FIG. 2.

FIG. 20 is a block diagram illustrating a configuration example of a photodetector according to a modification example of the first embodiment.

FIG. 21 is a circuit diagram illustrating a configuration example of a TDC section illustrated in FIG. 20.

FIG. 22 is an explanatory diagram illustrating an example of a distance measuring operation of a histogram generator illustrated in FIG. 20.

FIG. 23 is an explanatory diagram illustrating an example of a self-diagnosis operation of the histogram generator illustrated in FIG. 20.

FIG. 24 is an explanatory diagram illustrating an operation example of a photodetection system according to another modification example of the first embodiment.

FIG. 25 is an explanatory diagram illustrating an operation state of a light-receiving section according to another modification example of the first embodiment.

FIG. 27 is an explanatory diagram illustrating an operation state of a light-receiving section according to another modification example of the first embodiment.

FIG. 28 is a circuit diagram illustrating a configuration example of a light-receiving section according to another modification example of the first embodiment.

FIG. 29 is an explanatory diagram illustrating an installation example of a photodetector according to another modification example of the first embodiment.

FIG. 30 is a block diagram illustrating a configuration example of a photodetector according to a second embodiment.

FIG. 31 is a circuit diagram illustrating a configuration example of a flip-flop section illustrated in FIG. 30.

FIG. 32 is an explanatory diagram illustrating an example of a self-diagnosis operation of a histogram generator illustrated in FIG. 30.

FIG. 33 is an explanatory diagram illustrating an example of the self-diagnosis operation of the histogram generator illustrated in FIG. 30.

FIG. 34 is a circuit diagram illustrating a configuration example of a flip-flop section according to a modification example of the second embodiment.

FIG. 35 is an explanatory diagram illustrating an example of a self-diagnosis operation of a histogram generator according to a modification example of the second embodiment.

FIG. 36 is another explanatory diagram illustrating an example of the self-diagnosis operation of the histogram generator according to the modification example of the second embodiment.

FIG. 37 is a circuit diagram illustrating a configuration example of a TDC section according to another modification example of the second embodiment.

FIG. 42 is a block diagram illustrating a configuration example of a photodetector according to a third embodiment.

FIG. 43 is a circuit diagram illustrating a configuration example of a flip-flop section illustrated in FIG. 42.

FIG. 44 is a circuit diagram illustrating a configuration example of an adder illustrated in FIG. 43.

FIG. 45 is an explanatory diagram illustrating a self-diagnosis operation of a histogram generator illustrated in FIG. 42.

FIG. 46 is another explanatory diagram illustrating an example of the self-diagnosis operation of the histogram generator illustrated in FIG. 42.

FIG. 47 is another explanatory diagram illustrating an example of the self-diagnosis operation of the histogram generator illustrated in FIG. 42.

FIG. 48 is another explanatory diagram illustrating an example of the self-diagnosis operation of the histogram generator illustrated in FIG. 42.

FIG. 49 is a block diagram illustrating a configuration example of a photodetector according to a fourth embodiment.

FIG. 51 is a timing waveform diagram illustrating an example of a distance measuring operation of a photodetection system according to the fourth embodiment.

FIG. 52 is a timing waveform diagram illustrating an example of a self-diagnosis operation of the light-receiving section illustrated in FIG. 50.

FIG. 53 is another timing waveform diagram illustrating an example of the self-diagnosis operation of the light-receiving section illustrated in FIG. 50.

FIG. 54 is another timing waveform diagram illustrating an example of the self-diagnosis operation of the light-receiving section illustrated in FIG. 50.

FIG. 55 is another timing waveform diagram illustrating an example of the self-diagnosis operation of the light-receiving section illustrated in FIG. 50.

FIG. 56 is another timing waveform diagram illustrating an example of the self-diagnosis operation of the light-receiving section illustrated in FIG. 50.

FIG. 57 is a flowchart illustrating an example of a self-diagnosis operation in the photodetection system according to the fourth embodiment.

FIG. 59 is a diagram of assistance in explaining an example of installation positions of an outside-vehicle information detecting section and an imaging section.

FIG. 60 is a block diagram illustrating a configuration example of a vehicle according to an application example.

FIG. 61 is another block diagram illustrating a configuration example of the vehicle according to the application example.

FIG. 62 is a flowchart illustrating an operation of the vehicle according to the practical application example.

MODES FOR CARRYING OUT THE INVENTION

Figure 4:
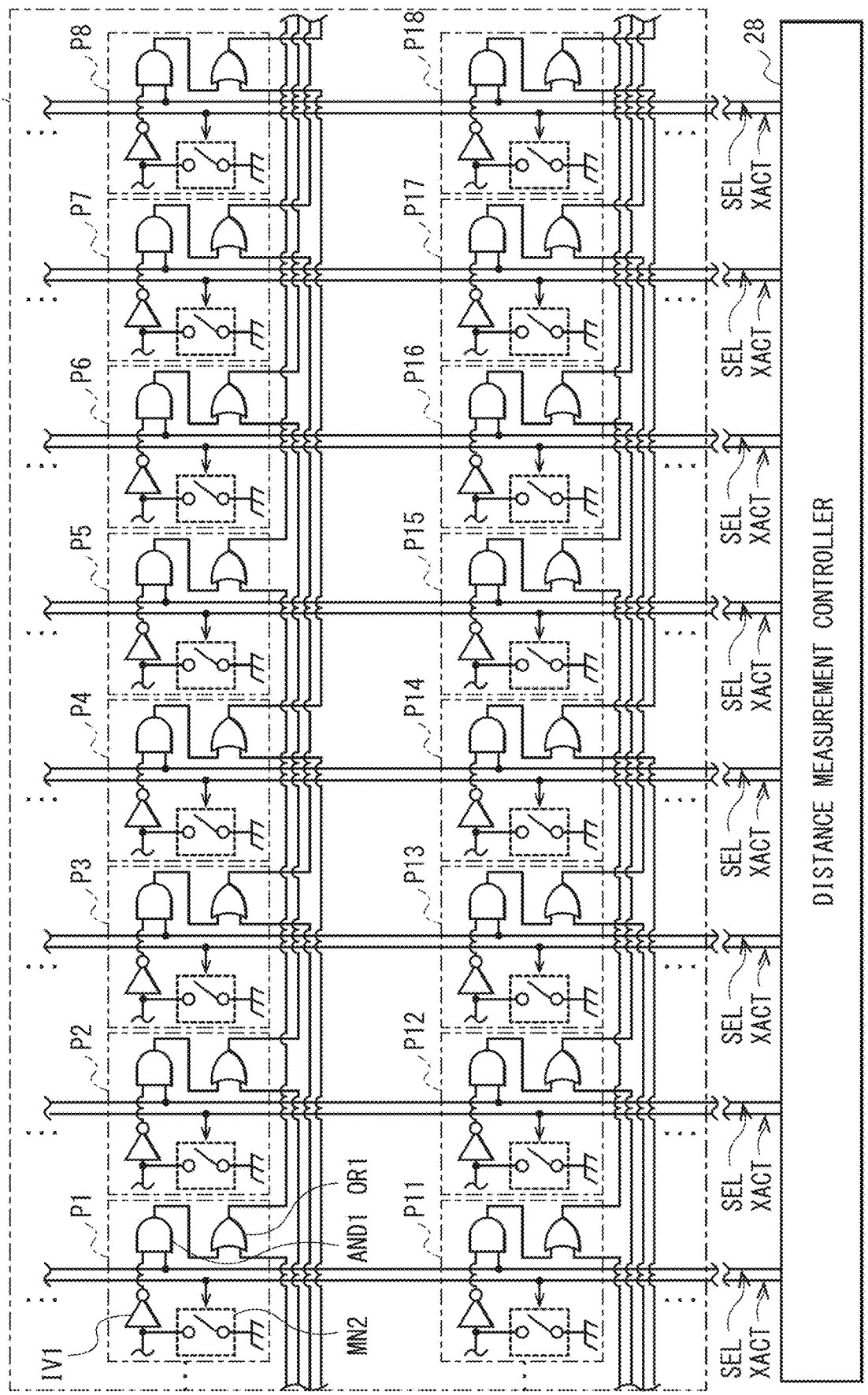
FIG. 4 is a circuit diagram illustrating a configuration example of a pixel array illustrated in FIG. 2.

In the following, some embodiments of the present disclosure are described in detail with reference to the drawings. It is to be noted that description is given in the following order.
1. First Embodiment
2. Second Embodiment
3. Third Embodiment
4. Fourth Embodiment
5. Example of Application to Mobile Body
6. Specific Example of Application to Vehicle

1. First Embodiment

[Configuration Example]

FIG. 1 illustrates a configuration example of a photodetection system (photodetection system 1) according to an embodiment. The photodetection system 1 is a ToF sensor, and is configured to emit light and detect reflected light reflected by a measurement object OBJ. The photodetection system 1 includes alight-emitting section 11, an optical system 12, a photodetector 20, and a controller 14.

The light-emitting section 11 is configured to emit a light pulse L0 toward the measurement object OBJ on the basis of an instruction from the controller 14. The light-emitting section 11 emits the light pulse L0 on the basis of an instruction from the controller 14 by performing a light emission operation of alternately repeating emission and non-emission of light. The light-emitting section 11 includes, for example, a light source that emits infrared light. This light source is configured with use of, for example, a laser light source, an LED (Light Emitting Diode), or the like.

The optical system 12 includes a lens that forms an image on a light-receiving surface of the photodetector 20. Alight pulse (reflected light pulse L1) emitted from the light-emitting section 11 and reflected by the measurement object OBJ enters this optical system 12.

The photodetector 20 is configured to detect the reflected light pulse L1 on the basis of an instruction from the controller 14. The photodetector 20 then generates a distance image on the basis of a detection result, and outputs image data of the generated distance image as a distance image signal S1. In addition, as described later, the photodetector 20 has a function of performing a self-diagnosis operation, and outputs a diagnosis result as a diagnosis result signal S2.

The controller 14 is configured to supply control signals to the light-emitting section 11 and the photodetector 20 and control operations of the light-emitting section 11 and the photodetector 20 to thereby control an operation of the photodetection system 1.

FIG. 2 illustrates a configuration example of the photodetector 20. The photodetector 20 includes a pixel array 21, a flip-flop section 22, a histogram generator 23, a distance calculator 24, an output section 25, a diagnosis section 26, an output section 27, and a distance measurement controller 28.

The pixel array 21 includes a plurality of light-receiving sections P disposed in a matrix. The light-receiving sections P are each configured to detect light to thereby generate a pulse signal having a pulse corresponding to the detected light. In addition, in a case where the photodetection system 1 performs a self-diagnosis operation, the light-receiving sections P are each able to generate a pulse signal on the basis of supplied control signals (control signals ENBIST and XACT to be described later).

FIG. 3 illustrates a configuration example of the light-receiving section P. The light-receiving section P includes a photodiode PD, transistors MN1, MP1, MP2, MP3, and MN2, an inverter IV1, an AND circuit AND1, and an OR circuit OR. The transistors MN1 and MN2 are N-type MOS (Metal Oxide Semiconductor)transistors, and the transistors MP1 to MP3 are P-type MOS transistors.

The photodiode PD is a photoelectric conversion element that converts light into electric charge. The photodiode PD has an anode supplied with a power supply voltage VNEG, and a cathode coupled to a drain of the transistor MN1 and a drain of the transistor MP1. It is possible to use, for example, a single photon avalanche diode (SPAD; Single Photon Avalanche Diode) for the photodiode PD.

The transistor MN1 has a gate supplied with the control signal ENBIST, the drain coupled to the cathode of the photodiode PD and the drain of the transistor MP1, and a source grounded. The transistor MP1 has a gate supplied with the control signal ENBIST, the drain coupled to the cathode of the photodiode PD and the drain of the transistor MN1, and a source and a back gate coupled to a node N1. With this configuration, in a case where the control signal ENBIST is at a low level, the transistor MP1 is turned on, and the transistor MN1 is turned off. Accordingly, in the light-receiving section P, the cathode of the photodiode PD is coupled to the node N1 through the transistor MP1. In addition, in a case where the control signal ENBIST is at a high level, the transistor MN1 is turned on, and the transistor MP1 is turned off. Accordingly, in the light-receiving section P, the cathode of the photodiode PD and the node N1 are separated from each other, and the cathode of the photodiode PD is grounded through the transistor MN1.

The transistor MP2 has a gate supplied with a bias voltage Vbias, a source supplied with a power supply voltage VDDH, and a drain coupled to a source of the transistor MP3. The transistor MP2 operates as a constant current source (constant current source CUR to be described later) that passes a current from a power supply node for the power supply voltage VDDH to the node N1. The transistor MP3 has a gate supplied with the control signal XACT, the source coupled to the drain of the transistor MP2, and a drain coupled to the node N1. The transistor MN2 has a gate supplied with the control signal XACT, a drain coupled to the node N1, and a source grounded. With this configuration, in a case where the control signal XACT is at the low level, the transistor MP3 is turned on, and the transistor MN2 is turned off. Accordingly, in the light-receiving section P, the drain of the transistor MP2 operating as a constant current source is coupled to the node N1 through the transistor MP3. In addition, in a case where the control signal XACT is at the high level, the transistor MN2 is turned on, and the transistor MP3 is turned off. Accordingly, in the light-receiving section P, the drain of the transistor MP2 operating as a constant current source and the node N1 are separated from each other, and the node N1 is grounded through the transistor MN2.

The inverter IV1 is configured to generate an inverted voltage of a voltage at the node N1 to thereby generate a pulse signal PLS1. The inverter IV1 is supplied with the power supply voltage VDDH.

The AND circuit AND1 is configured to generate a pulse signal PLS2 by finding logical AND of the pulse signal PLS1 and a control signal SEL. This AND circuit AND1 is supplied with a power supply voltage VDDL lower than the power supply voltage VDDH.

The OR circuit OR1 is configured to generate a pulse signal PLS3 (pulse signal PLS3B) by finding logical OR of the pulse signal PLS2 and a pulse signal PLS3 (pulse signal PLS3A) supplied from another light-receiving section P. This OR circuit OR1 is supplied with the power supply voltage VDDL.

FIG. 4 illustrates a configuration example of the pixel array 21. For explanatory convenience, FIG. 4 illustrates the light-receiving section P in a simplified manner. Specifically, the photodiode PD, and the transistors MN1, MP1, MP2, and MP3 are not illustrated. In addition, the transistor MN2 is illustrated by using the symbol of a switch.

In this example, a plurality of light-receiving sections P arranged side by side in a horizontal direction in FIG. 4 are coupled one to every fourth light-receiving section P. Specifically, an output terminal of the OR circuit OR1 of a certain light-receiving section P (light-receiving section P1) is coupled to an input terminal of the OR circuit OR1 of the fourth light-receiving section P (light-receiving section P5) from the right of the light-receiving section P1. The output terminal of the OR circuit OR1 of the light-receiving section P (light-receiving section P2) on the right of the light-receiving section P1 is coupled to the input terminal of the OR circuit OR1 of the fourth light-receiving section P (light-receiving section P6) from the right of the light-receiving section P2. The output terminal of the OR circuit OR1 of the light-receiving section (light-receiving section P3) on the right of the light-receiving section P2 is coupled to the input terminal of the OR circuit OR1 of the fourth light-receiving section P (light-receiving section P7) from the right of the light-receiving section P3. The output terminal of the OR circuit OR1 of the light-receiving section P (light-receiving section P4) on the right of the light-receiving section P3 is coupled to the input terminal of the OR circuit OR1 of the fourth light-receiving section P (light-receiving section P8) from the right of the light-receiving section P4. In this example, eight light-receiving sections P1 to P8 in a certain row have been described as an example. The same applies to a plurality of light-receiving sections P in other rows. Thus, in the pixel array 21, the plurality of light-receiving sections P are coupled by so-called daisy chain coupling. Then, of the plurality of light-receiving sections P coupled by daisy chain coupling in such a manner, the OR circuits OR1 of the light-receiving sections P in a final stage each output the pulse signal PLS as illustrated in FIG. 2.

The flip-flop section 22 (FIG. 2) is configured to sample a plurality of pulse signals PLS supplied from the pixel array 21 on the basis of a clock signal CLK.

FIG. 5 illustrates a configuration example of the flip-flop section 22. The flip-flop section 22 includes a plurality of flip-fops 29. The flip-flops 29 provided corresponding one-to-one to the plurality of pulse signals PLS supplied from the pixel array 21. Each of the plurality of flip-flops 29 is a D-type flip-flop, and is configured to sample a corresponding pulse signal PLS on the basis of the clock signal CLK to thereby generate a pulse signal PLSA.

The histogram generator 23 (FIG. 2) is configured to generate a histogram indicating a generation timing of the pulse signal PLS on the basis of each of a plurality of pulse signals PLSA supplied from the flip-flop sections 22. Specifically, in a distance measuring operation, the photodetector 20 generates the pulse signal PLS by detecting the reflected light pulse L1, which causes the histogram generator 23 to generate a histogram indicating a light reception timing in each of the plurality of light-receiving sections P on the basis of the plurality of pulse signals PLSA. In addition, in a self-diagnosis operation, the photodetector 20 generates the pulse signal PLS on the basis of the control signal XACT, which causes the histogram generator 23 to generate a histogram indicating a generation timing of a pulse of the pulse signal PLS based on the control signal XACT in each of the plurality of light-receiving sections P on the basis of the plurality of pulse signals PLSA.

The distance calculator 24 is configured to generate a distance image by calculating a distance value to the measurement object OBJ on the basis of data of the light reception timing in each of the plurality of light-receiving sections P. The data is supplied from the histogram generator 23.

The output section 25 is configured to output, as the distance image signal S1, image data of the distance image generated by the distance calculator 24.

The diagnosis section 26 is configured to perform diagnosis processing on the plurality of light-receiving sections P in the pixel array 21 on the basis of data of the generation timing of the pulse of the pulse signal PLS based on the control signal XACT. The data is supplied from the histogram generator 23.

The output section 27 is configured to output a result of the diagnosis processing by the diagnosis section 26 as the diagnosis result signal S2. The diagnosis result signal S2 includes a flag signal that indicates whether or not a fault is present in any of the plurality of light-receiving sections P. In addition, in a case where a fault is present in any of the plurality of light-receiving sections P, the diagnosis result signal S2 includes a signal indicating details of the fault. The output section 27 outputs the diagnosis result signal S2 including such information.

The distance measurement controller 28 is configured to control operations of the pixel array 21, the flip-flop section 22, the histogram generator 23, the distance calculator 24, and the diagnosis section 26 on the basis of an instruction from the controller 14 (FIG. 1) to thereby control an operation of the photodetector 20.

Here, the photodiode PD corresponds to a specific example of a "light-receiving element" in the present disclosure. The node N1 corresponds to a specific example of a "first node" in the present disclosure. The transistor MP1 corresponds to a specific example of a "first switch" in the present disclosure. The transistor MN2 corresponds to a specific example of a "second switch" in the present disclosure. The pulse signal PLS1 corresponds to a specific example of a "pulse signal" in the present disclosure. The inverter IV1 corresponds to a specific example of a "signal generator" in the present disclosure. The distance measurement controller 28 corresponds to a specific example of a "controller" in the present disclosure. The flip-flop section 22 and the histogram generator 23 correspond to specific examples of a "detector" in the present disclosure. The output section 27 corresponds to a specific example of an "output section" in the present disclosure. The diagnosis section 26 corresponds to a specific example of a "diagnosis section" in the present disclosure.

[Operation and Workings]

Next, the operation and workings of the photodetection system 1 according to the present embodiment are described.

(Overview of Overall Operation)

First, an overview of the overall operation of the photodetection system 1 is described with reference to FIGS. 1 and 2. The light-emitting section 11 emits the light pulse L0 toward the measurement object OBJ. The optical system 12 forms an image on the light-receiving surface of the photodetector 20. The photodetector 20 detects a light pulse (reflected light pulse L1) reflected by the measurement object OBJ. The controller 14 supplies control signals to the light-emitting section 11 and the photodetector 20 and controls operations of the light-emitting section 11 and the photodetector 20 to thereby control a distance measuring operation of the photodetection system 1.

In the photodetector 20, the pixel array 21 generates a plurality of pulse signals PLS corresponding to light reception results by the plurality of light-receiving sections P. The flip-flop section 22 samples the plurality of pulse signals PLS supplied from the pixel array 21 on the basis of the clock signal CLK to thereby generate each of a plurality of pulse signals PLSA. The histogram generator 23 generates a histogram indicating the light reception timing in each of the plurality of light-receiving sections P on the basis of each of the plurality of pulse signals PLSA supplied from the flip-flop section 22. The distance calculator 24 calculates a distance value to the measurement object OBJ on the basis of data of the light reception timing in each of the plurality of light-receiving sections P supplied from the histogram generator 23 to thereby generate a distance image. The output section 25 outputs image data of this distance image as the distance image signal S1.

In the self-diagnosis operation, the pixel array 21 generates a plurality of pulse signals PLS on the basis of the control signal XACT. The flip-flop section 22 samples the plurality of pulse signals PLS supplied from the pixel array 21 on the basis of the clock signal CLK to thereby generate each of a plurality of pulse signals PLSA. The histogram generator 23 generates a histogram indicating the generation timing of the pulse of the pulse signal PLS based on the control signal XACT on the basis of each of the plurality of pulse signals PLSA supplied from the flip-flop section 22. The diagnosis section 26 performs diagnosis processing on the plurality of light-receiving sections P in the pixel array 21 on the basis of data of the generation timing of the pulse of the pulse signal PLS based on the control signal XACT. The data is supplied from the histogram generator 23. The output section 27 outputs, as the diagnosis result signal S2, a result of the diagnosis processing by the diagnosis section 26.

The distance measurement controller 28 controls operations of the pixel array 21, the flip-flop section 22, the histogram generator 23, the distance calculator 24, and the diagnosis section 26 on the basis of an instruction from the controller 14 to thereby control the operation of the photodetector 20.

(Detailed Operation)

Next, the operation of the photodetection system 1 is described in detail.

FIG. 6 illustrates an operation example of the photodetection system 1. In the photodetection system 1, distance measurement periods T1 and blanking periods P2 are alternately provided. In the distance measurement period T1, the photodetection system 1 performs the distance measuring operation. Accordingly, the photodetection system 1 repeatedly performs the distance measuring operation. In the blanking period T2, the photodetection system 1 performs the self-diagnosis operation on the plurality of light-receiving sections P in the pixel array 21. Here, in the distance measurement period T1 corresponds to a specific example of a "first period" in the present disclosure. The blanking period T2 corresponds to a specific example of a "second period" in the present disclosure.

(Distance Measuring Operation)

First, description is given of the distance measuring operation. In the distance measuring operation, the photodetector 20 sequentially selects a plurality of light-receiving sections P as detection targets from among the plurality of light-receiving sections P in the pixel array 21 in one distance measurement period T1, and calculates a distance value on the basis of the light reception timings in the plurality of light-receiving sections P selected.

FIG. 7 illustrates an example of an operation of selecting a plurality of light-receiving sections P as detection targets in the photodetector 20. In FIG. 7, a shaded portion schematically indicates positions of the plurality of light-receiving sections P selected in the pixel array 21. In this example, in one distance measurement period T1, a plurality of light-receiving sections P is sequentially selected in order from a left end in the pixel array 21.

Specifically, in FIG. 4, the distance measurement controller 28 selects a plurality of light-receiving sections P as detection targets with use of the control signal SEL. For example, the distance measurement controller 28 changes control signals SEL to be supplied to the light-receiving sections P in four columns including the light-receiving sections P1, P2, P3, and P4 to the high level, and changes the control signals SEL to be supplied to the light-receiving sections P in other columns to the low level. Thus, the light-receiving sections P in the four columns including the light-receiving sections P1, P2, P3, and P4 are selected as detection targets.

In each of the selected light-receiving sections P, as illustrated in FIG. 3, the AND circuit AND1 generates the pulse signal PLS2 corresponding to the pulse signal PLS1 by finding logical AND of the pulse signal PLS1 generated by the inverter IV1 and the control signal SEL that is at the high level. In each of the unselected light-receiving sections P, as illustrated in FIG. 3, the AND circuit AND1 maintains the pulse signal PLS2 at the low level on the basis of the control signal SEL that is at the low level. As a result, the pulse signal PLS2 generated by the selected light-receiving section P is supplied as the pulse signal PLS to the flip-flop section 22.

FIG. 8 illustrates the selected light-receiving section P and the flip-flop 29 that performs an operation on the basis of the pulse signal PLS1 generated by the selected light-receiving section P. For explanatory convenience, FIG. 8 illustrates circuits in a simplified manner. Specifically, in FIG. 8, the transistor MP2 is illustrated with use of the constant current source CUR, and the AND circuit AND1 and the OR circuit OR1 in the light-receiving section P, and the OR circuit OR1 of one or more light-receiving sections P on downstream side of that light-receiving section P are illustrated with use of a buffer BUF. In addition, the transistors MN1, MN2, MP1, and MP3 are each illustrated with use of the symbol of a switch that indicates an on/off state of a transistor.

FIG. 9 illustrates an operation example of the light-receiving section P and the flip-flop 29 in the distance measuring operation, where (A) indicates a waveform of the control signal ENBIST, (B) indicates a waveform of the control signal XACT, (C) indicate a waveform of light emitted from the light-emitting section 11, (D) indicates a waveform of light incident on the photodetector 20, (E) indicates a waveform of a voltage VN1 at the node N1, (F) indicates a waveform of the pulse signal PLS1 (pulse signal PLS), (G) indicates a waveform of the clock signal CLK, and (H) indicates a waveform of the pulse signal PLSA.

In the distance measuring operation, the distance measurement controller 28 changes the control signals ENBIST and XACT to the low level ((A) and (B) of FIG. 9). Accordingly, in the light-receiving section P, as illustrated in FIG. 8, transistors MP1 and MP3 are turned on, and the transistors MN1 and MN2 are turned off. As a result, the cathode of the photodiode PD is coupled to the node N1, and the constant current source CUR is coupled to the node N1.

At a timing t11, the light-emitting section 11 emits the light pulse L0 on the basis of an instruction from the controller 14 ((C) of FIG. 9). This light pulse L0 is reflected by the measurement object OBJ. The light pulse (reflected light pulse L1) reflected by the measurement object OBJ enters the light-receiving section P of the photodetector 20 at a timing t12. A time from the timing t11 at which the light pulse L0 is emitted to the timing t12 at which the reflected light pulse L1 enters the light-receiving section P is a time-of-flight Ttof of the light pulse detected by that light-receiving section P.

In the light-receiving section P, the photodiode PD causes avalanche amplification by detecting light, which decreases the voltage VN1 at the node N1 ((E) of FIG. 9). Then, at a timing t13, in a case where the voltage VN1 at the node N1 becomes lower than a logical threshold TH of the inverter IV1, the inverter IV1 changes the pulse signal PLS1 from the low level to the high level ((F) of FIG. 9). At a subsequent timing t14, The flip-flop 29 samples the pulse signal PLS corresponding to this pulse signal PLS1 on the basis of a rising edge of the clock signal CLK to change the pulse signal PLSA from the low level to the high level ((G) and (H) of FIG. 9).

Thereafter, a current flows into the node N1 through the constant current source CUR to increase the voltage VN1 at the node N1 ((E) of FIG. 9). Then, at a timing t15, in a case where the voltage VN1 at the node N1 becomes higher than the logical threshold TH of the inverter IV1, the inverter IV1 changes the pulse signal PLS from the high level to the low level ((F) of FIG. 9). At a subsequent timing t16, the flip-flop 29 samples the pulse signal PLS corresponding to this pulse signal PLS1 on the basis of a rising edge of the clock signal CLK to change the pulse signal PLSA from the high level to the low level ((G) and (H) of FIG. 9).

As described above, in the photodetection system 1, the light pulse L0 is emitted once to generate the pulse signal PLSA including a pulse starting from a timing corresponding to the light reception timing of the reflected light pulse L1 reflected. A pulse width of this pulse in this example is a time length corresponding to four clock pulses in the clock signal CLK as illustrated in (H) of FIG. 9.

The photodetection system 1 repeats the operation illustrated in FIG. 9 by repeatedly emitting the light pulse L1 a plurality of times in one distance measurement period T1.

The photodetection system 1 performs such an operation on each of the selected light-receiving sections P.

FIG. 10 illustrates an operation example of the histogram generator 23 in the distance measuring operation, (A) indicates a histogram about one light-receiving section P obtained when the light pulse L0 is emitted once, and (B) indicates a histogram about the one light-receiving section P obtained when the light pulse L0 is emitted a plurality of times.

As illustrated in (H) of FIG. 9, the photodetection system 1 generates the pulse signal PLSA including the pulse starting from the timing corresponding to the light reception timing of the reflected light pulse L1 by emitting the light pulse L0 once. The pulse width of this pulse in this example is a time length corresponding to four clock pulses in the clock signal CLK. Accordingly, the histogram generator 23 generates the histogram illustrated in (A) of FIG. 10. A width W of a bin in the histogram corresponds to a pulse period of the clock signal CLK. In this example, the light pulse L0 is emitted once; therefore, frequency is "1". A left end of this histogram corresponds to the light reception timing of the reflected light pulse L1, and a width of a distribution of the histogram corresponds to the pulse width of the pulse of the pulse signal PLS.

The photodetection system 1 repeatedly emits the light pulse L0 a plurality of times in one distance measurement period T1. Accordingly, data as illustrated in (A) of FIG. 10 for a plurality of times is accumulated. Accordingly, the histogram generator 23 generates the histogram illustrated in (B) of FIG. 10. The photodetection system 1 is able to calculate the light reception timing on the basis of, for example, a left end position of this histogram and is able to calculate the time-of-flight Ttof on the basis of this light reception timing.

The histogram generator 23 generates the histogram illustrated in (B) of FIG. 10 about each of the plurality of light-receiving sections P, and calculates the light reception timing in each of the plurality of light-receiving sections P.

The distance calculator 24 calculates the distance value to the measurement object OBJ on the basis of data of the light reception timing in each of the plurality of light-receiving sections P supplied from the histogram generator 23 to thereby generate a distance image. The output section 25 then outputs image data of this distance image as the distance image signal S1.

(Self-Diagnosis Operation)

Next, description is given of the self-diagnosis operation, In the self-diagnosis operation, the photodetector 20 sequentially selects a plurality of light-receiving sections P as detection targets from among the plurality of light-receiving sections P in the pixel array 21 in one blanking period T2, as in a case of the distance measuring operation (FIG. 7). The photodetector 20 then performs self-diagnosis by changing the control signal XACT in the plurality of light-receiving sections P selected.

FIG. 11 illustrates the selected light-receiving section P, and the flip-flop 29 that performs an operation on the basis of the pulse signal PLS1 generated by the selected light-receiving section P. For explanatory convenience, as with FIG. 8, FIG. 11 illustrates circuit in a simplified manner.

FIG. 12 illustrates an operation example of the light-receiving section P and the flip-flop 29 in the self-diagnosis operation, (A) indicates a waveform of the control signal ENBIST, (B) indicates a waveform of the control signal XACT, (C) indicates a waveform of the voltage VN1 at the node N1, (D) indicates a waveform of the pulse signal PLS1

(pulse signal PLS), (E) indicates a waveform of the clock signal CLK, and (F) indicates a waveform of the pulse signal PLSA.

In the self-diagnosis operation, the distance measurement controller 28 changes the control signal ENBIST to the high level ((A) of FIG. 12). Accordingly, in the light-receiving section P, as illustrated in FIG. 11, the transistor MP1 is turned off, and the transistor MN1 is turned on. As a result, the cathode of the photodiode PD is separated from the node N1, and grounded. In addition, the distance measurement controller 28 changes the control signal XACT to the high level in a period before a timing t21 ((B) of FIG. 12). Accordingly, in the light-receiving section P, the transistor MN2 is turned on, and the transistor MP3 is turned off. As a result, the constant current source CUR is separated from the node N1, and the node N1 is grounded.

At the timing t21, the distance measurement controller 28 changes the control signal XACT from the high level to the low level ((B) of FIG. 12). Accordingly, in the light-receiving section P, the transistor MP3 is turned on, and the transistor MN2 is turned off. As a result, the node N1 is separated from a ground node, and coupled to the constant current source CUR.

Thereafter, a current flows into the node N1 through the constant current source CUR to increase the voltage VN1 at the node N1 ((C) of FIG. 12). Then, at a timing t22, in a case where the voltage VN1 at the node N1 becomes higher than the logical threshold TH of the inverter IV1, the inverter IV1 changes the pulse signal PLS from the high level to the low level ((D) of FIG. 12). At a subsequent timing t23, the flip-flop 29 samples the pulse signal PLS corresponding to this pulse signal PLS1 on the basis of a rising edge of the clock signal CLK to change the pulse signal PLSA from the high level to the low level ((E) and (F) of FIG. 12). The voltage VN1 then reaches the high level to thereby complete preparation.

At a timing t24 after the voltage VN1 reaches the high level, the distance measurement controller 28 changes the control signal XACT from the low level to the high level ((B) of FIG. 12). Accordingly, in the light-receiving section P, the transistor MN2 is turned on, and the transistor MP3 is turned off. As a result, the node N1 is separated from the constant current source CUR, and grounded, which changes the voltage VN1 at the node N1 from the high level to the low level ((C) of FIG. 12). The voltage VN1 at the node N1 becomes lower than the logical threshold TH of the inverter IV1, which causes the inverter IV1 to change the pulse signal PLS1 from the low level to the high level ((D) of FIG. 12). At a subsequent timing t25, the flip-flop 29 samples the pulse signal PLS corresponding to this pulse signal PLS1 on the basis of a rising edge of the clock signal CLK to change the pulse signal PLSA from the low level to the high level ((E) and (F) of FIG. 12).

Next, at a timing t26, the distance measurement controller 28 changes the control signal XACT from the high level to the low level ((B) of FIG. 12). Accordingly, in the light-receiving section P, the transistor MP3 is turned on, and the transistor MN2 is turned off. As a result, the node N1 is separated from the ground node, and is coupled to the constant current source CUR.

Thereafter, a current flows into the node N1 through the constant current source CUR to increase the voltage VN1 at the node N1 ((C) of FIG. 12). Then, at a timing t27, in a case where the voltage VN1 at the node N1 becomes higher than the logical threshold TH of the inverter IV1, the inverter IV1 changes the pulse signal PLS from the high level to the low level ((D) of FIG. 12). At a subsequent timing t28, the flip-flop 29 samples the pulse signal PLS corresponding to this pulse signal PLS1 on the basis of a rising edge of the clock signal CLK to change the pulse signal PLSA from the high level to the low level ((E) and (F) of FIG. 12).

FIG. 13 illustrates an operation example of the histogram generator 23 in the self-diagnosis operation. In FIG. 12, the photodetection system 1 changes the control signal XACT to the high level at timings t24 to t26 to generate the pulse signal PLSA including a pulse starting from a timing corresponding to a rising timing of this control signal XACT, as illustrated in (F) of FIG. 12. A pulse width of this pulse in this example is a time length corresponding to four clock pulses in the clock signal CLK. Accordingly, the histogram generator 23 generates a histogram illustrated in FIG. 13. In this example, the control signal XACT is changed to the high level once; therefore, frequency is "1". A left end of this histogram corresponds to the generation timing of the pulse of the pulse signal PLS, and a width of a distribution of the histogram corresponds to the pulse width of the pulse of the pulse signal PLS.

The diagnosis section 26 diagnoses the pulse generation timing of the pulse of the pulse signal PLS and the pulse width of the pulse signal PLS on the basis of data in each of the plurality of light-receiving sections P supplied from the histogram generator 23 to thereby perform diagnosis processing on the plurality of light-receiving sections P in the pixel array 21.

Next, the self-diagnosis operation is described in detail with reference to some examples of faults. In the light-receiving section P, various faults may occur due to an initial failure, deterioration over time, and the like. Examples of faults in FIG. 8 may include a case where a current to be applied by the constant current source CUR is large (case C1) and a case where a current to be applied by the constant current source CUR is small (case C2). The examples of the faults may further include a case where the voltage VN1 at the node N1 is stuck at the high level (case C3) and a case where the voltage VN1 at the node N1 is stuck at the low level (case C4). The examples of the faults may further include a case where the cathode of the photodiode PD is stuck at the low level or the anode and the cathode of the photodiode PD are mutually short-circuited (case C5). The diagnosis section 26 is able to diagnose these various faults in the light-receiving section P.

(Case C1)

First, description is given of the case where a current to be applied by the constant current source CUR is large (case C1).

FIG. 14A illustrates an operation example of the light-receiving section P in the case C1, where (A) indicates a waveform of the control signal ENBIST, (B) indicates a waveform of the control signal XACT, (C) indicates a waveform of the voltage VN1 at the node N1, and (D) indicates a waveform of the pulse signal PLS1. In (C) and (D) of FIG. 14A, a broken line indicates a waveform in a case where no fault is present, and a solid line indicates a waveform in a case where a fault is present. (A) to (D) of FIG. 14A respectively correspond to (A) to (D) of FIG. 12. In FIG. 14A, waveforms of the clock signal CLK and the pulse signal PLSA are not illustrated; however, as with (E) and (F) of FIG. 12, the flip-flop 29 samples the pulse signal PLS on the basis of a rising edge of the clock signal CLK to generate the pulse signal PLSA.

At a timing t31, the distance measurement controller 28 changes the control signal XACT from the high level to the low level ((B) of FIG. 14A). Accordingly, the node the node N1 is separated from the ground node, and is coupled to the constant current source CUR. Then, a current flows into the node N1 through the constant current source CUR to increase the voltage VN1 at the node N1 ((C) of FIG. 14). In the case C1, a current to be applied by the constant current source CUR is large, which increases the voltage VN1 in a short time, as compared with a case where no fault is present. Then, at a timing t32, in a case where the voltage VN1 at the node N1 becomes higher than the logical threshold TH of the inverter IV1, the inverter IV1 changes the pulse signal PLS1 from the high level to the low level ((D) of FIG. 14A). The voltage VN1 then reaches the high level to thereby complete preparation.

Then, at a timing t33 after the voltage VN1 reaches the high level, the distance measurement controller 28 changes the control signal XACT from the low level to the high level ((B) of FIG. 14A). Accordingly, the node N1 is separated from the constant current source CUR and grounded, which changes the voltage VN1 at the node N1 from the high level to the low level ((C) of FIG. 14A). The voltage VN1 at the node N1 becomes lower than the logical threshold TH of the inverter IV1, which causes the inverter IV1 to change the pulse signal PLS1 from the low level to the high level ((D) of FIG. 14A).

Next, at a timing t34, the distance measurement controller 28 changes the control signal XACT from the high level to the low level ((B) of FIG. 14A). Accordingly, the node N1 is separated from the ground node, and is coupled to the constant current source CUR. Then, a current flows into the node N1 through the constant current source CUR to increase the voltage VN1 at the node N1 ((C) of FIG. 14A). In the case C1, a current to be applied by the constant current source CUR is large, which increase the voltage VN1 in a short time, as compared with a case where no fault is present. Then, at a timing t35, in a case where the voltage VN1 at the node N1 becomes higher than the logical threshold TH of the inverter IV1, the inverter IV1 changes the pulse signal PLS1 from the high level to the low level ((D) of FIG. 14A).

Thus, in the case C1, a current to be applied by the constant current source CUR is large, which increases the voltage VN1 from the timing t34 onward in a short time, as compared with a case where no fault is present. Accordingly, an end timing of the pulse of the pulse signal PLS1 becomes earlier, and the pulse width of the pulse signal PLS1 becomes shorter. Accordingly, the pulse width of the pulse signal PLSA generated by the flip-flop 29 also becomes shorter.

Figure 41:
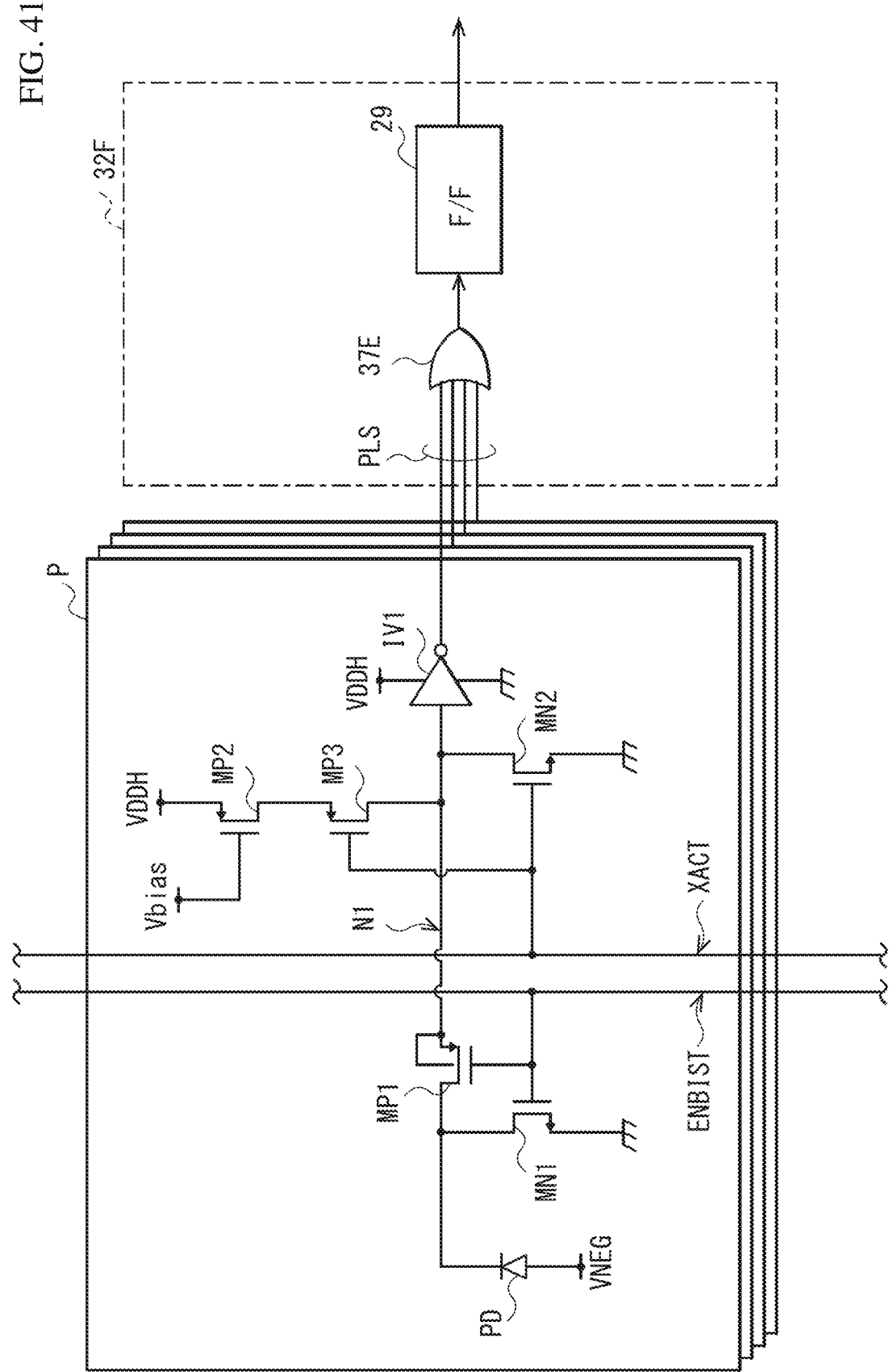
FIG. 41 is a circuit diagram illustrating a configuration example of a light-receiving section and a flip-flop section according to another modification example of the second embodiment.

FIG. 14B illustrates an operation example of the histogram generator 23 in the case C1, where (A) indicates a case where no fault is present, and (B) indicates a case where a fault associated with the case C1 is present. As illustrated in (D) of FIG. 14A, in the case C1, the pulse width of the pulse signal PLS1 becomes shorter. Accordingly, as illustrated in (B) of FIG. 14B, a right end of the histogram moves to the left, as compared with a case where no fault is present ((A) of FIG. 41B), which narrows the width of the distribution of the histogram.

In a case where the right end of the histogram moves to the left to thereby narrow the width of the distribution of the histogram, the diagnosis section 26 diagnoses the light-receiving section P as having such a fault that a current to be applied by the constant current source CUR is increased. (Case C2)

Next, description is given of a case where a current to be applied by the constant current source CUR is small (case C2).

FIG. 15A illustrates an operation example of the light-receiving section P in the case C2. At a timing t41, the distance measurement controller 28 changes the control signal XACT from the high level to the low level ((B) of FIG. 15A). Accordingly, the node N1 is separated from the ground node, and is coupled to the constant current source CUR. Then, a current flows into the node N1 through the constant current source CUR to increase the voltage VN1 at the node N1 ((C) of FIG. 15). In the case C2, a current to be applied by the constant current source CUR is small, which increases the voltage VN1 in a long time, as compared with a case where no fault is present. Then, at a timing t42, in a case where the voltage VN1 at the node N1 becomes higher than the logical threshold TH of the inverter IV1, the inverter IV1 changes the pulse signal PLS1 from the high level to the low level ((D) of FIG. 15A). The voltage VN1 then reaches the high level to thereby complete preparation.

Then, at a timing after the voltage VN1 reaches the high level, the distance measurement controller 28 changes the control signal XACT from the low level to the high level ((B) of FIG. 15A). Accordingly, the node N1 is separated from the constant current source CUR, and grounded, which changes the voltage VN1 at the node N1 from the high level to the low level ((C) of FIG. 15A). The voltage VN1 at the node N1 becomes lower than the logical threshold TH of the inverter IV1, which causes the inverter IV1 to change the pulse signal PLS1 from the low level to the high level ((D) of FIG. 15A).

Next, at a timing t44, the distance measurement controller 28 changes the control signal XACT from the high level to the low level ((B) of FIG. 15A). Accordingly, the node N1 is separated from the ground node, and is coupled to the constant current source CUR. Then, a current flows into the node N1 through the constant current source CUR to increase the voltage VN1 at the node N1 ((C) of FIG. 15). In the case C2, a current to be applied by the constant current source CUR is small, which increases the voltage VN1 in a long time, as compared with a case where no fault is present. Then, at a timing t45, in a case where the voltage VN1 at the node N1 becomes higher than the logical threshold TH of the inverter IV1, the inverter IV1 changes the pulse signal PLS1 from the high level to the low level ((D) of FIG. 15A).

Thus, in the case C2, a current to be applied by the constant current source CUR is small, which increases the voltage VN1 at a timing t44 onward in a long time, as compared with a case where no fault is present. Accordingly, the end timing of the pulse of the pulse signal PLS1 becomes later, and the pulse width of the pulse signal PLS1 becomes longer. Accordingly, the pulse width of the pulse signal PLSA generated by the flip-flop 29 also becomes longer.

FIG. 15B illustrates an operation example of the histogram generator 23 in the case C2, where (A) indicates a case where no fault is present, and (B) indicates a case where a fault associated with the case C2 is present. As illustrated in (D) of FIG. 15A, in the case C2, the pulse width of the pulse signal PLS1 becomes longer; therefore, the pulse width of the pulse signal PLSA generated by the flip-flop 29 also become longer. Accordingly, as illustrated in (B) of FIG. 15B, a right end of the histogram moves to the right, as compared with a case where no fault is present ((A) of FIG. 15B), which widens the width of the distribution of the histogram.

In a case where the right end of the histogram moves to the right to thereby widen the width of the distribution of the histogram, the diagnosis section 26 diagnoses the light-receiving section P as having such a fault that a current to be applied by the constant current source CUR is decreased.

(Case C3)

Next, description is given of a case where the voltage VN1 at the node N1 is stuck at the high level (case C3).

FIG. 16A illustrates an operation example of the light-receiving section P in the case C3. At a timing t51, the distance measurement controller 28 changes the control signal XACT from the high level to the low level ((B) of FIG. 16A). In addition, the distance measurement controller 28 changes the control signal XACT from the low level to the high level at a timing t52, and changes the control signal XACT from the high level to the low level at a timing t53. In the case C3, the voltage VN1 at the node N1 is stuck at the high level ((C) of FIG. 16A). Accordingly, the inverter IV1 maintains the pulse signal PLS1 at the low level ((D) of FIG. 16A).

Thus, in the case C3, the voltage VN1 at the node N1 is stuck at the high level; therefore, the pulse signal PLS1 is maintained at the low level. Accordingly, the pulse signal PLSA generated by the flip-flop 29 is also maintained at the low level.

FIG. 16B illustrates an operation example of the histogram generator 23 in the case D3, where (A) indicates a case where no fault is present, and (B) indicates a case where a fault associated with the case C3 is present. As illustrated in (D) of FIG. 16A, in the case C3, the pulse signal PLS1 is maintained at the low level; therefore, the pulse signal PLSA generated by the flip-flop 29 is also maintained at the low level. Accordingly, as illustrated in (B) of FIG. 16B, in the histogram, frequency in all bins is "0".

In a case where frequency in all bins is "0" in such a manner, the diagnosis section 26 diagnoses the light-receiving section P as having such a fault that the voltage VN1 at the node N1 is stuck at the high level.

(Case C4)

Next, description is given of a case where the voltage VN1 at the node N1 is stuck at the low level (case C4).

FIG. 17A illustrates an operation example of the light-receiving section P in the case C4. At a timing t61, the distance measurement controller 28 changes the control signal XACT from the high level to the low level ((B) of FIG. 17A). In addition, the distance measurement controller 28 changes the control signal XACT from the low level to the high level at a timing t62, and changes the control signal XACT from the high level to the low level at a timing t63. In the case C4, the voltage VN1 at the node N1 is stuck at the low level ((C) of FIG. 17A). Accordingly, the inverter IV1 maintains the pulse signal PLS1 at the high level ((D) of FIG. 17A).

Thus, in the case C4, the voltage VN1 at the node N1 is stuck at the low level; therefore, the pulse signal PLS1 is maintained at the high level. Accordingly, the pulse signal PLSA generated by the flip-flop 29 is also maintained at the high level.

FIG. 17B illustrates an operation example of the histogram generator 23 in the case C4, where (A) indicates a case where no fault is present, and (B) indicates a case where a fault associated with the case C4 is present. As illustrated in (D) of FIG. 17A, in the case C4, the pulse signal PLS1 is maintained at the high level; therefore, the pulse signal PLSA generated by the flip-flop 29 is also maintained at the high level. Accordingly, as illustrated in (B) of FIG. 17B, in the histogram, frequency in all bins is "1".

In a case where frequency in all bins is "1" in such a manner, the diagnosis section 26 diagnoses the light-receiving section P as having such a fault that the voltage VN1 at the node N1 is stuck at the low level.

(Case C5)

Next, description is given of a case where the cathode of the photodiode PD is stuck at the low level or the anode and the cathode of the photodiode are mutually short-circuited (case C5).

FIG. 18 illustrates the selected light-receiving section P, and the flip-flop 29 that performs an operation on the basis of the pulse signal PLS1 generated by the selected light-receiving section P. For explanatory convenience, as with FIG. 8, FIG. 18 illustrates circuits in a simplified manner.

FIG. 19A illustrates an operation example of the light-receiving section P in the case C5, where (A) indicates a waveform of the control signal ENBIST, (B) indicates a waveform of the control signal XACT, (C) indicates a waveform of the voltage VN1 at the node N1, and (D) indicates a waveform of the pulse signal PLS1 (pulse signal PLS).

In this self-diagnosis operation, the distance measurement controller 28 changes the control signal ENBIST to the low level ((A) of FIG. 19A). Accordingly, in the light-receiving section P, as illustrated in FIG. 18, the transistor MP1 is turned on, and the transistor MN1 is turned off. As a result, the cathode of the photodiode PD is separated from the ground node, and is coupled to the node N1. In addition, as illustrated in FIG. 18, the distance measurement controller 28 changes the power supply voltage VNEG to be applied to the anode of the photodiode PD to "0 V". It is to be noted that in this example, the power supply voltage VNEG is changed to "0 V", but this is not limitative. It is possible to apply a voltage not allowing the photodiode PD (single photon avalanche diode) to operate. For example, in a case where the power supply voltage VNEG is changed to "−20 V" in the distance measuring operation, the power supply voltage VNEG may be changed to "−10 V" in this self-diagnosis operation. Accordingly, the photodiode PD is turned off, and the anode and the cathode of the photodiode PD are electrically insulated. In other words, in the example in FIG. 11, the transistor MP1 is turned off; however, in the example in FIG. 18, the transistor MP1 is turned on, and the photodiode PD is turned off. Accordingly, it is possible to perform self-diagnosis regarding the cathode of the photodiode PD as described below. It is to be noted that even in this case, it is possible to perform operations similar to the self-diagnosis operations in the cases C1 to C4 described above (FIGS. 14A, 14B, 15A, 15B, 16A, 16B, 17A, and 17B).

At a timing t71, the distance measurement controller 28 changes the control signal XACT from the high level to the low level ((B) of FIG. 19A). In addition, the distance measurement controller 28 changes the control signal XACT from the low level to the high level at a timing t72, and changes the control signal XACT from the high level to the low level at a timing t73. In a case where no fault is present, as in the case of FIG. 12, the voltage VN1 at the node N1 is changed in accordance with the control signal XACT, and the pulse signal PLS1 is changed in accordance with this voltage VN1. Meanwhile, in the case C5, the cathode of the photodiode PD is stuck at the low level, or the anode and the cathode of the photodiode PD are mutually short-circuited. Accordingly, the voltage VN1 is maintained at the low level ((C) of FIG. 19A). Accordingly, the inverter IV1 maintains the pulse signal PLS1 at the high level ((D) of FIG. 19A).

FIG. 19B illustrates an operation example of the histogram generator 23 in the case C5, where (A) indicates a case where no fault is present, and (B) indicates a case where a fault associated with the case C5 is present. As illustrated in (D) of FIG. 19A, in the case C5, the pulse signal PLS1 is maintained at the high level; therefore, the pulse signal PLSA generated by the flip-flop 29 is also maintained at the high level. Accordingly, as illustrated in (B) of FIG. 19B, in the histogram, frequency in all bins is "1".

In a case where frequency in all bins is "1" under condition that the control signal ENBIST is changed to the low level and the power supply voltage VNEG is changed to "0 V", the diagnosis section 26 diagnoses the light-receiving section P as having such a fault that the cathode of the photodiode PD is stuck at the low level or the cathode and the anode of the photodiode PD are mutually short-circuited.

Thus, the diagnosis section 26 performs diagnosis processing on faults in the light-receiving section P described in the cases C1 to C5. The output section 27 then outputs a result of the diagnosis processing by the diagnosis section 26 as the diagnosis result signal S2.

Thus, in the photodetection system 1, the light-receiving section P is provided that includes the photodiode PD, a first switch (transistor MP1) that is coupled to the photodiode PD and the node N1 by being turned on, a second switch (transistor MN2) that applies a predetermined voltage (a ground voltage in this example) to the node N1 by being turned on, and a signal generator (inverter IV1) that generates the pulse signal PLS1 on the basis of the voltage VN1 at the node N1. A detector (the flip-flop section 22 and the histogram generator 23) is provided that detects a timing at which the pulse signal PLS is changed, on the basis of the pulse signal PLS1. The output section 27 is provided that outputs the diagnosis result signal S2 corresponding to a detection result by the detector when the second switch (transistor MN2) is turned on. Accordingly, in the photodetection system 1, it is possible to confirm whether or not the light-receiving section P is to perform a desired operation in a case where the transistor MN2 is turned on, which makes it possible to perform self-diagnosis on the light-receiving section P.

In addition, in the photodetection system 1, as illustrated in FIG. 6, the distance measuring operation is performed in the distance measurement period T1, and the self-diagnosis operation is performed in the blanking period T2, which makes it possible to perform self-diagnosis on the light-receiving section P while continuing the distance measuring operation.

[Effects]

As described above, in the present embodiment, the light-receiving section is provided that includes the photo-diode, the first switch that couples the photodiode and the node N1 by being turned on, the second switch that applies a predetermined voltage to the node N1 by being turned on, and the signal generator that generates the pulse signal on the basis of the voltage at the node N1. The detector is provided that detects a timing at which the pulse signal is changed on the basis of the pulse signal. The output section is provided that outputs the diagnosis result signal corresponding to a detection result by the detector when the second switch is turned on. Thus, it is possible to perform self-diagnosis.

[Modification Example 1-1]

In the embodiment described above, the flip-flop section 22 samples the pulse signal PLS, and the histogram generator 23 generates a histogram on the basis of a result of the sampling, but this is not limitative. A photodetection system 1A according to the present modification example is described in detail below.

The photodetection system 1A includes a photodetector 20A, as with the photodetection system 1 (FIG. 1) according to the embodiment described above.

FIG. 20 illustrates a configuration example of the photodetector 20A. The photodetector 20A includes a TDC (Time to Digital Converter) section 22A, a histogram generator 23A, and a diagnosis section 26A.

The TDC section 22A is configured to generate a plurality of timing codes TCODE by detecting rising timings of a plurality of pulse signals PLS supplied from the pixel array 21.

FIG. 21 illustrates a configuration example of the TDC section 22A. The TDC section 22A includes a plurality of TDCs 29A. The plurality of TDCs 29A is provided corresponding one-to-one to the plurality of pulse signals PLS supplied from the pixel array 21. Each of the plurality of TDCs 29A is configured to perform a counting operation on the basis of the clock signal CLK and latch a count value on the basis of a rising edge of the pulse signal PLS, thereby generating the timing code TCODE. The TDC section 22A then supplies the timing codes TCODE generated by the plurality of TDCs 29A to the histogram generator 23A.

The histogram generator 23A is configured to generate a histogram indicating the generation timing of the pulse of the pulse signal PLS on the basis of each of the plurality of timing codes TCODE supplied from the TDC section 22A. Specifically, in the distance measuring operation, the photodetector 20 generates the pulse signal PLS by detecting the reflected light pulse L1, which causes the histogram generator 23 to generate a histogram indicating the light reception timing in each of the plurality of light-receiving sections P on the basis of the plurality of pulse signals PLSA. In addition, in the self-diagnosis operation, the photodetector 20 generates the pulse signal PLS on the basis of the control signal XACT, which causes the histogram generator 23 to generate a histogram indicating the generation timing of the pulse of the pulse signal PLS based on the control signal XACT in each of the plurality of light-receiving sections P on the basis of the plurality of pulse signals PLSA.

The diagnosis section 26A is configured to perform diagnosis processing on the plurality of light-receiving sections P in the pixel array 21 on the basis of data of the generation timing of the pulse of the pulse signal PLS based on the control signal XACT. The data is supplied from the histogram generator 23A.

Here, the TDC section 22A and the histogram generator 23A correspond to specific examples of a "detector" in the present disclosure.

FIG. 22 illustrates an operation example of the histogram generator 23A in the distance measuring operation, where (A) indicates a histogram about one light-receiving section P obtained when the light pulse L0 is emitted once, and (B) indicates a histogram about the one light-receiving section P obtained when the light pulse L0 is emitted a plurality of times.

The photodetection system 1A generates the timing code TCODE corresponding to the light reception timing of the reflected light pulse L1 by emitting the light pulse L0 once. Accordingly, the histogram generator 23A generates a histogram illustrated in (A) of FIG. 22. In this example, the light pulse L0 is emitted once; therefore, frequency is "1".

The photodetection system 1A repeatedly emits the light pulse L0 a plurality of times in one distance measurement period T1. Accordingly, data as illustrated in (A) of FIG. 22 for a plurality of times is accumulated. Accordingly, the histogram generator 23A generates the histogram illustrated in (B) of FIG. 22. The photodetection system 1 is able to calculate the light reception timing on the basis of, for example, a centroid position of this histogram.

The histogram generator 23A generates the histogram illustrated in (B) of FIG. 22 about each of the plurality of light-receiving sections P, and calculates the light reception timing in each of the plurality of light-receiving sections P.

In the self-diagnosis operation, the diagnosis section 26A is able to diagnose faults such as the cases C3 to C5 described above.

In a case where the voltage VN1 at the node N1 is stuck at the high level (case C3), as illustrated in FIG. 16A, the light-receiving section P maintains the pulse signal PLS1 at the low level ((D) of FIG. 16A).

FIG. 23 illustrates an operation example of the histogram generator 23A, where (A) indicates a case where no fault is present, and (B) indicates a case where a fault associated with the case C3 is present. In a case where no fault is present, as illustrated in (A) of FIG. 23, frequency in the timing code TCODE corresponding to the rising timing of the pulse signal PLS is "1".

In the case C3, the pulse signal PLS1 is maintained at the low level; therefore, the pulse signal PLS has no rising edge, which does not cause the TDC 29A to generate the timing code TCODE. Accordingly, in the histogram, as illustrated in (B) of FIG. 23, frequency in all bins is "0". In a case where frequency in all bins is "0" in such a manner, the diagnosis section 26A diagnoses the light-receiving section P as having a fault.

In a case where the voltage VN1 at the node N1 is stuck at the low level (case C4), as illustrated in FIG. 17A, the light-receiving section P maintains the pulse signal PLS at the high level ((D) of FIG. 17A).

In the case C4, the pulse signal PLS1 is maintained at the high level; therefore, the pulse signal PLS has no rising edge, which does not cause the TDC 29A to generate the timing code TCODE as illustrated in FIG. 23. Accordingly, in the histogram, frequency in all bins is "0". Ina case where frequency in all bins is "0" in such a manner, the diagnosis section 26A diagnoses the light-receiving section P as having a fault.

In a case where the cathode of the photodiode PD is stuck at the low level or the anode and the cathode of the photodiode PD are mutually short-circuited (case C5), as illustrated in FIG. 19A, the light-receiving section P maintains the pulse signal PLS1 at the high level ((D) of FIG. 19A).

In the case C5, the pulse signal PLS1 is maintained at the high level; therefore, the pulse signal PLS has no rising edge, which does not cause the TDC 29A to generate the timing code TCODE. Accordingly, in the histogram, frequency in all bins is "0" as illustrated in (B) of FIG. 23. Ina case where frequency in all bins is "0" in such a manner, the diagnosis section 26A diagnoses the light-receiving section P as having a fault.

[Modification Example 1-2]

In the embodiment described above, in one blanking period T2, a plurality of light-receiving sections P is sequentially selected as detection targets from among the plurality of light-receiving sections P in the pixel array 21, but this is not limitative. Instead of this, for example, as illustrated in FIG. 24, in a plurality (two in this example) of blanking periods T2, a plurality of light-receiving sections P may be sequentially selected as detection targets from among the plurality of light-receiving sections P in the pixel array 21. In this example, a first blanking period T2 of the two blanking periods T2, a plurality of light-receiving sections P is sequentially selected as detection targets from among a plurality of light-receiving sections P in a left half of the pixel array 21, and in a subsequent blanking period T2, a plurality of light-receiving sections P is sequentially selected as detection targets from among a plurality of light-receiving sections P in a right half of the pixel array 21. This makes it possible to shorten a time length of the blanking period T2, which makes it possible to increase frequency of the distance measuring operation per unit time, for example.

[Modification Example 1-3]

In the embodiment describe above, in the distance measuring operation, as illustrated in FIG. 8, the transistor MN2 is maintained off, but this is not limitative. Instead of this, for example, as illustrated in FIG. 25, this transistor MN2 may be turned on or off. Accordingly, for example, as described below, in the distance measuring operation, it is possible to prevent false detection of the photodetector 20 by turning on this transistor MN2 in a period in which the light-emitting section 11 emits the light pulse L0.

Figure 26:
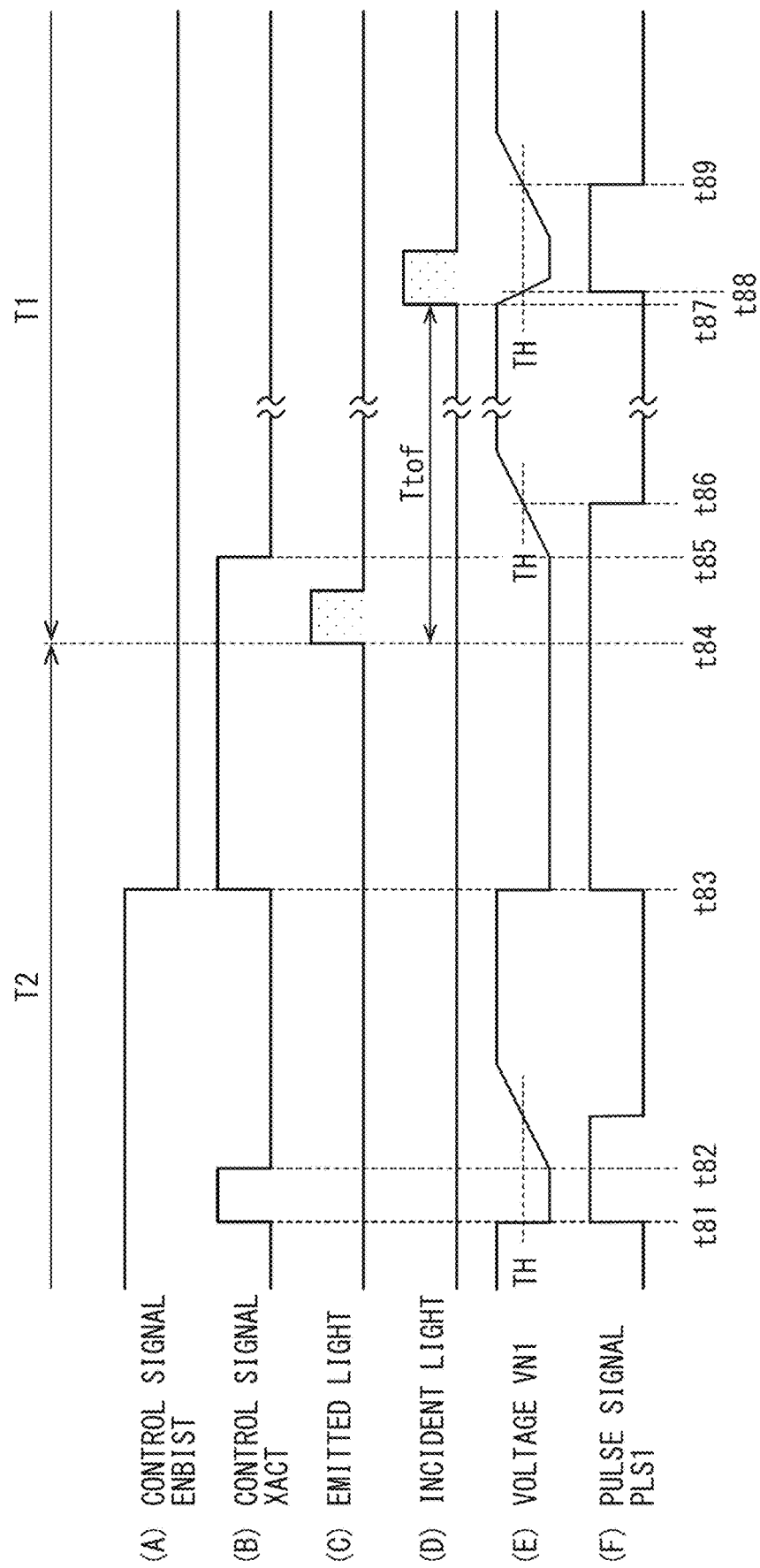
FIG. 26 is a timing waveform diagram illustrating an operation example of a photodetection system according to another modification example of the first embodiment.

FIG. 26 illustrates an operation example of the photodetection system 1 before and after a timing of shifting from the blanking period T2 to the distance measurement period T1, where (A) indicates a waveform of the control signal ENBIST, (B) indicates a waveform of the control signal XACT, (C) indicates a waveform of light emitted from the light-emitting section 11, (D) indicates a waveform of light incident on the photodetector 20, (E) indicates a waveform of the voltage VN1 at the node N1, and (F) indicates a waveform of the pulse signal PLS1.

In the blanking period T2, the photodetection system 1 performs self-diagnosis. In this example, the distance measurement controller 28 changes the control signal XACT to the high level in a period from a timing t81 to a timing t82, and the voltage VN1 at the node N1 and the pulse signal PLS1 are changed in accordance with this control signal XACT ((B), (E), and (F) of FIG. 26).

Then, at a timing t83, the distance measurement controller 28 changes the control signal ENBIST from the high level to the low level ((A) of FIG. 26). Accordingly, the transistor MP1 is turned on, the transistor MN1 is turned off, and the cathode of the photodiode PD is separated from the ground node, and is coupled to the node N1.

In addition, at this timing t83, the distance measurement controller 28 changes the control signal XACT from the low level to the high level ((B) of FIG. 26). Accordingly, the transistor MN2 is turned on, and the transistor MP3 is turned off. As a result, the node N1 is separated from the constant current source CUR, and grounded. The voltage VN1 changes from the high level to the low level in such a manner ((E) of FIG. 26), which causes the inverter IV1 to change the pulse signal PLS1 from the low level to the high level ((F) of FIG. 26).

Then, at a timing t84, the blanking period T2 ends, and the distance measurement period T1 starts. At this timing t84, the light-emitting section 11 emits the light pulse L0 on the basis of an instruction from the controller 14 ((C) of FIG. 26). At this time, the control signal XACT is at the high level ((B) of FIG. 26); therefore, the transistor MN2 is on. Accordingly, the voltage VN1 at the node N1 is maintained at the low level.

Then, at a subsequent timing t85, the distance measurement controller 28 changes the control signal XACT from the high level to the low level ((B) of FIG. 26). Accordingly, the transistor MP3 is turned on, and the transistor MN2 is turned off. As a result, the node N1 is separated from the ground node, and is coupled to the constant current source CUR. A current flows into the node N1 through the constant current source CUR to increase the voltage VN1 at the node N1 ((E) of FIG. 26). Then, at a timing t86, in a case where the voltage VN1 at the node N1 becomes higher than the logical threshold TH of the inverter IV1, the inverter IV1 changes the pulse signal PLS1 from the high level to the low level ((F) of FIG. 26).

A subsequent operation is similar to that in the embodiment described above (FIG. 9).

Thus, in the present modification example, this transistor MN2 is turned on in a period in which the light-emitting section 11 emits the light pulse L0. Accordingly, for example, even in a case where the light pulse L0 emitted from the light-emitting section 11 is reflected by an inner wall of a housing of the photodetection system 1 and enters the photodetector 20, the photodetector 20 does not generate the pulse of the pulse signal PLS1 on the basis of this light. As a result, the photodetector 20 is able to prevent false detection.

In this example, as illustrated in FIG. 25, one transistor MN2 is used, but this is not limitative. As illustrated in FIG. 27, in addition to the transistor MN2, a transistor MN3 may be provided that is turned on or off in the distance measurement period T1.

[Modification Example 1-4]

In the embodiment described above, the light-receiving sections P are coupled by daisy chain coupling, but this is not limitative. Instead of this, for example, a plurality of flip-flops 29 corresponding one-to-one to the plurality of light-receiving sections P in the pixel array 21 may be provided, and the light-receiving sections P may be coupled one-to-one to the flip-flops 29. A photodetection system 1D according to the present modification example includes a photodetector 20D, as with the photodetection system 1 (FIG. 1) according to the embodiment described above. The photodetector 20D includes a pixel array 21D and a flip-flop section 22D, as with the photodetector 20 (FIG. 2) according to the embodiment described above. The pixel array 21D includes a plurality of light-receiving sections P disposed in a matrix. The flip-flop section 22D includes a plurality of flip-flops 29 corresponding to the plurality of light-receiving sections P.

FIG. 28 illustrates a configuration example of the light-receiving section P and the flip-flop 29 according to the present modification example. The light-receiving section P includes the photodiode PD, the transistors MN1, MP1, MP2, MP3, and MN2, and the inverter IV1. The light-receiving section P according to the present modification example corresponds to the light-receiving section P (FIG. 3) according to the embodiment described above from which the AND circuit AND1 and the OR circuit OR1 are omitted. In the light-receiving section P according to the present modification example, the inverter IV1 is configured to generate an inverted voltage of the voltage VN1 at the node N1 to thereby generate the pulse signal PLS. The flip-flop 29 operates on the basis of the pulse signal PLS outputted from the inverter IV1.

FIG. 29 illustrates an installation example of the photodetector 20D. In this example, the photodetector 20D is formed on two semiconductor substrates 101 and 102. The semiconductor substrate 101 is disposed on side of a light-receiving surface of the photodetector 20D, and the semiconductor substrate 102 is disposed on side opposite to the light-receiving surface of the photodetector 20D. The semiconductor substrates 101 and 102 are superimposed on each other. A wiring line of the semiconductor substrate 101 and a wiring line of the semiconductor substrate 102 are coupled to each other by a wiring line 103. It is possible to use, for example, metallic bonding such as Cu—Cu bonding or bump bonding for the wiring line 103. For example, the photodiode PD of the light-receiving section P illustrated in FIG. 28 is disposed on the semiconductor substrate 101, and elements other than the photodiode PD in the light-receiving section P, and the flip-flop 29 coupled to that light-receiving section P are disposed on the semiconductor substrate 102. The photodiode PD of the light-receiving section P, and the elements other than the photodiode PD in that light-receiving section P and the flip-flop 29 coupled to that light-receiving section P are disposed in regions corresponding to each other in the semiconductor substrates 101 and 102.

[Other Modification Examples]

In addition, two or more of these modification examples may be combined.

2. Second Embodiment

Next, description is given of a photodetection system 2 according to a second embodiment. The present embodiment is configured to collectively perform self-diagnosis on a plurality of light-receiving sections P. It is to be noted that components substantially the same as those of the photodetection system 1 according to the first embodiment described above are denoted by the same reference numerals, and description thereof is omitted as appropriate.

The photodetection system 2 according to the present embodiment includes a photodetector 30, as with the photodetection system 1 (FIG. 1) according to the first embodiment.

FIG. 30 illustrates a configuration example of the photodetector 30. The photodetector 30 includes a flip-flop section 32, a histogram generator 33, and a diagnosis section 36.

FIG. 31 illustrates a configuration example of the flip-flop section 32. The flip-flop section 32 includes a plurality of flip-flops 29, a plurality of AND circuits 37, and a plurality of flip-flops 38.

Each of the plurality of AND circuits 37 is configured to find logical AND of four pulse signals PLS. It is to be noted that, in this example, the AND circuits 37 find logical AND of four pulse signals PLS, but this is not limitative. For example, the AND circuits 37 may find logical AND of two or three pulse signals PLS, or may find logical AND of five or more pulse signals PLS.

The plurality of flip-flops 38 provided corresponding one-to-one to the plurality of AND circuits 37. Each of the plurality of flip-flops 38 is configured to sample an output signal of a corresponding AND circuit 37 on the basis of the clock signal CLK to thereby generate a pulse signal PLSB. This pulse signal PLSB is used in a diagnosis processing operation. In other words, the photodetection system 2 collectively diagnoses four light-receiving sections P in the diagnosis processing operation.

The histogram generator 33 generates a histogram indicating the light reception timing in each of the plurality of light-receiving sections P in the distance measuring operation on the basis of a plurality of pulse signal PLSA. In addition, the histogram generator 33 generates a histogram indicating the generation timing of the pulse of the pulse signal PLS based on the control signal XACT in each of the plurality of light-receiving sections P on the basis of a plurality of pulse signals PLSB in the self-diagnosis operation.

The diagnosis section 36 is configured to perform diagnosis processing on the plurality of light-receiving sections P in the pixel array 21 on the basis of data of the generation timing of the pulse of the pulse signal PLS based on the control signal XACT supplied from the histogram generator 33. This diagnosis section 36 performs diagnosis processing on the plurality of light-receiving sections P by collectively diagnosing four light-receiving sections P.

Here, the flip-flop section 32 and the histogram generator 33 correspond to specific examples of a "detector" in the present disclosure.

The photodetection system 2 performs the distance measuring operation in the distance measurement period T1, and performs self-diagnosis on the plurality of light-receiving sections P in the pixel array 21 in the blanking period T2, as with the photodetection system 1 (FIG. 6) according to the first embodiment. The distance measuring operation in the photodetection system 2 is similar to that in the photodetection system 1 (FIGS. 7 to 10) according to the first embodiment.

In the self-diagnosis operation, the diagnosis section 36 is able to diagnose faults such as the cases C1 and C3 described above.

(Case C1)

In a case where a current to be applied by the constant current source CUR is large (case C1), as illustrated in FIG. 14A, the pulse width of the pulse signal PLS1 becomes shorter, as compared with a case where no fault is present ((D) of FIG. 14A).

FIG. 32 illustrates an operation example of the histogram generator 33, where (A) indicates a case where no fault is present in all of four light-receiving sections P, and (B) indicates a case where a fault associated with the case C1 is present in at least one of the four light-receiving sections P. In a case where no fault is present in all of the four light-receiving sections P, four pulse signals PLS generated by the four light-receiving sections P have substantially the same waveform. The AND circuit 37 of the flip-flop section 32 finds logical AND of the pulse signals PLS supplied from the four light-receiving sections P. An output signal of the AND circuit 37 has substantially the same waveform as those of these four pulse signals PLS. Accordingly, as illustrated in (A) of FIG. 32, a histogram in which frequency is "1" is obtained. A left end of this histogram corresponds to the generation timing of the pulse of the pulse signal PLS, and a width of a distribution of the histogram corresponds to the pulse width of the pulse of the pulse signal PLS.

In a case where a fault associated with the case C1 is present in at least one of the four light-receiving sections P, as illustrated in FIG. 14A, in the light-receiving section P having the fault, the end timing of the pulse of the pulse signal PLS1 becomes earlier, which shortens the pulse width ((D) of FIG. 14A). The AND circuit 37 of the flip-flop section 32 finds logical AND of the pulse signals PLS supplied from the four light-receiving sections P. An output signal of the AND circuit 37 becomes a signal having a short pulse width similarly to the pulse signal PLS1 generated by the light-receiving section P having the fault. As a result, as illustrated in (B) of FIG. 32, a right end of the histogram moves to the left, as compared with a case where no fault is present ((A) of FIG. 32), which narrows the width of the distribution of the histogram.

In a case where the right end of the histogram moves to the left to thereby narrow the width of the distribution of the histogram, the diagnosis section 36 diagnoses at least one of the four light-receiving sections P as having such a fault that a current to be applied by the constant current source CUR is increased.

(Case C3)

In a case where the voltage VN1 at the node N1 is stuck at the high level (case C3), as illustrated in FIG. 16A, the light-receiving section P maintains the pulse signal PLS1 at the low level ((D) of FIG. 16A).

FIG. 33 illustrates an operation example of the histogram generator 33, where (A) indicates a case where no fault is present in all of the four light-receiving sections P, and (B) indicates a case where a fault associated with the case C3 is present in at least one of the four light-receiving sections P. In a case where a fault associated with the case C3 is present in at least one of the four light-receiving sections P, in the light-receiving section P having the fault, as illustrated in FIG. 16A, the pulse signal PLS1 is maintained at the low level ((D) of FIG. 16A). The AND circuit 37 of the flip-flop section 32 finds logical AND of the pulse signals supplied from the four light-receiving sections P. Accordingly, an output signal of the AND circuit 37 is maintained at the low level. As a result, as illustrated in (B) of FIG. 33, in the histogram, frequency in all bins is "0".

In a case where frequency in all bins is "0" in such a manner, the diagnosis section 36 diagnoses at least one of the four light-receiving sections P as having such a fault that the voltage VN1 at the node N1 is stuck at the high level.

Thus, in the photodetection system 3, a composite pulse signal (pulse signal PLSB) is generated on the basis of the pulse signals PLS generated by a plurality (four in this example) of light-receiving sections P, and a timing at which the composite pulse signal is changed is detected, which makes it possible to perform diagnosis processing.

As described above, in the present embodiment, a composite pulse signal is generated on the basis of pulse signals generated by a plurality of light-receiving sections, and a timing at which the composite pulse signal is changed is detected, which makes it possible to perform diagnosis processing.

[Modification Example 2-1]

In the embodiment described above, as illustrated in FIG. 31, the AND circuit 37 finds logical AND of four pulse signals PLS to thereby collectively perform self-diagnosis on the four light-receiving sections P, but this is not limitative. Instead of this, self-diagnosis may be collectively performed on four light-receiving sections P by finding logical OR of four pulse signals PLS. A photodetection system 2A according to the present modification example is described in detail below.

The photodetection system 2A according to the present embodiment includes a photodetector 30A, as with the photodetection system 1 (FIG. 1) according to the first embodiment. The photodetector 30A includes a flip-flop section 32A and a diagnosis section 36A, as with the photodetector 30 (FIG. 30) according to the second embodiment.

FIG. 34 illustrates a configuration example of the flip-flop section 32A. The flip-flop section 32A includes a plurality of OR circuits 37A.

Each of the plurality of OR circuits 37A is configured to find logical OR of four pulse signal PLS. Each of the plurality of flip-flops 38 samples an output signal of a corresponding OR circuit 37A on the basis of the clock signal CLK to thereby generate the pulse signal PLSB.

The diagnosis section 36A is configured to perform diagnosis processing on the plurality of light-receiving sections P in the pixel array 21 on the basis of data of the generation timing of the pulse of the pulse signal PLS based on the control signal XACT supplied from the histogram generator 33. This diagnosis section 36A performs diagnosis processing on the plurality of light-receiving sections P by collectively diagnosing four light-receiving sections P.

In the self-diagnosis operation, the diagnosis section 36A is able to diagnose faults such as the cases C2, C4, and C5 described above.

In a case where a current to be applied by the constant current source CUR is small (case C2), as illustrated in FIG. 15A, the pulse width of the pulse signal PLS1 becomes longer, as compared with a case where no fault is present ((D) of FIG. 15A).

FIG. 35 illustrates an operation example of the histogram generator 33A, where (A) indicates a case where no fault is present in all of the four light-receiving sections P, and (B) indicates a case where a fault associated with the case C2 is present in at least one of the four light-receiving sections P. In a case where a fault associated with the case C2 is present in at least one of the four light-receiving sections P, in the light-receiving section P having the fault, as illustrated in FIG. 15A, the end timing of the pulse of the pulse signal PLS1 becomes later, which makes the pulse width longer ((D) of FIG. 15A). The OR circuit 37A of the flip-flop section 32A finds logical OR of the pulse signals PLS supplied from the four light-receiving sections P. Accordingly, an output signal of the OR circuit 37A becomes a signal having a long pulse width similarly to the pulse signal PLS1 generated by the light-receiving section P having the fault. As a result, as illustrated in (B) of FIG. 35, a right end of the histogram moves to the right, as compared with a case where no fault is present ((A) of FIG. 35), which widens the width of the distribution of the histogram.

In a case where the right end of the histogram moves to the right to thereby widen the width of the distribution of the histogram, the diagnosis section 36A diagnoses at least one of the four light-receiving sections P as having such a fault that a current to be applied by the constant current source CUR is decreased.

In a case where the voltage VN1 at the node N1 is stuck at the low level (case C4), as illustrated in FIG. 17A, the light-receiving section P maintains the pulse signal PLS1 at the high level ((D) of FIG. 17A).

FIG. 36 illustrates an operation example of the histogram generator 33A, where (A) indicates a case where no fault is present in all of the four light-receiving sections P, and (B) indicates a case where a fault associated with the case C4 is present in at least one of the four light-receiving sections P.

In a case where a fault associated with the case C4 is present in at least one of the four light-receiving sections P, in the light-receiving section P having the fault, as illustrated in FIG. 17A, the pulse signal PLS1 is maintained at the high level ((D) of FIG. 17A). The OR circuit 37A of the flip-flop section 32A finds logical OR of the pulse signals PLS supplied from the four light-receiving sections P. Accordingly, an output signal of the OR circuit 37A is maintained at the high level. As a result, as illustrated in (B) of FIG. 36, in the histogram, frequency in all bins is "1".

In a case where frequency in all bins is "1" in such a manner, the diagnosis section 36A diagnoses at least one of the four light-receiving sections P as having such a fault that the voltage VN1 at the node N1 is stuck at the low level.

In a case where the cathode of the photodiode PD is stuck at the low level or the anode and the cathode are mutually short-circuited (case C5), as illustrated in FIG. 19, the light-receiving section P maintains the pulse signal PLS1 at the high level ((D) of FIG. 19A). It is to be noted that in a case where self-diagnosis associated with the case C5 is performed, as described above, the control signal ENBIST is changed to the low level, and the power supply voltage VNEG to be applied to the anode of the photodiode PD is changed to "0 V". Accordingly, in a case where a fault associated with the case C5 is present in at least one of the four light-receiving sections P, as in the case C4 (FIG. 36), in the histogram, frequency in all bins is "1".

In a case where frequency in all bins is "1" under condition that the control signal ENBIST is changed to the low level and the power supply voltage VNEG is changed to "0 V", the diagnosis section 36A diagnoses at least one of the four light-receiving sections P as having such a fault that the cathode of the photodiode PD is stuck at the low level or the cathode and the anode of the photodiode PD are mutually short-circuited.

[Modification Example 2-2]

In the embodiment described above, the flip-flops 29 and 38 are provided, but this is not limitative. Instead of this, for example, as illustrated in FIG. 37, a TDC may be provided as with the modification example 1-1. A TDC section 32B includes a plurality of TDCs 29B, a plurality of AND circuits 37, and a plurality of TDCs 38B. Each of the plurality of TDCs 29B is configured to perform a counting operation on the basis of the clock signal CLK and latch a count value on the basis of a rising edge of the pulse signal PLS, thereby generating the timing code TCODE. Each of the plurality of TDCs 38B is configured to perform a counting operation on the basis of the clock signal CLK and latch a count value on the basis of a rising edge of an output signal of the AND circuit 37, thereby generating the timing code TCODE.

[Modification Example 2-3]

In the embodiment described above, the light-receiving sections P are coupled by daisy chain coupling, but this is not limitative. Instead of this, as with the modification example 1-4, for example, a plurality of flip-flops 29 corresponding one-to-one to the plurality of light-receiving sections P in the pixel array 21 may be provided, and the light-receiving sections P may be coupled one-to-one to the flip-flops 29. A photodetection system 2C according to the present modification example includes a photodetector 30C, as with the photodetection system 2 according to the second embodiment. The photodetector 30C includes a pixel array 21C and a flip-flop section 32C, as with the photodetector 30 (FIG. 30) according to the second embodiment. The pixel array 21C includes a plurality of light-receiving sections P disposed in a matrix. The flip-flop section 32C includes a plurality of flip-flops 29 corresponding to the plurality of light-receiving sections P, a plurality of AND circuits 37, and a plurality of flip-flops 38.

Figure 38:
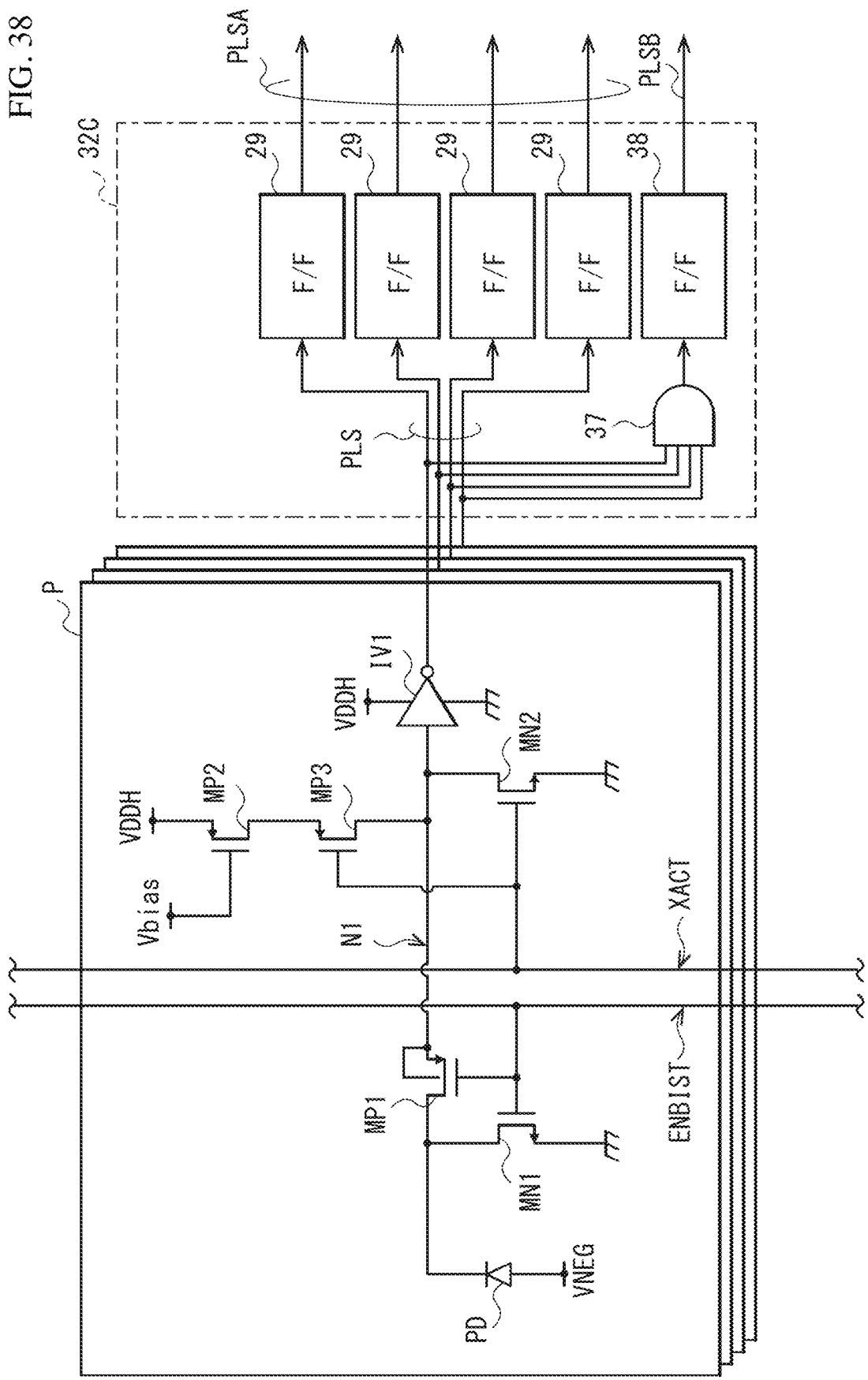
FIG. 38 is a circuit diagram illustrating a configuration example of a light-receiving section and a flip-flop section according to another modification example of the second embodiment.
Figure 39:
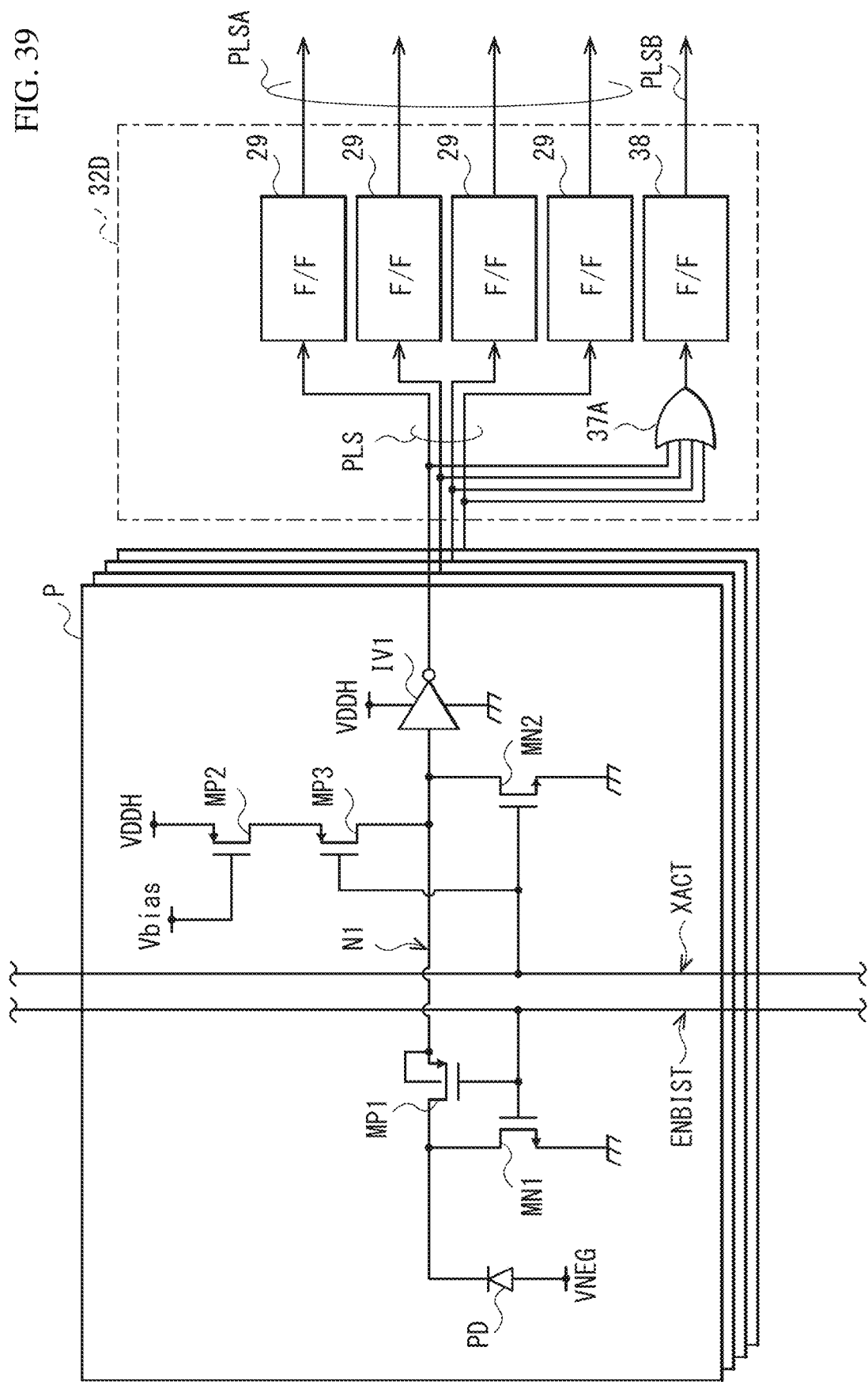
FIG. 39 is a circuit diagram illustrating a configuration example of a light-receiving section and a flip-flop section according to another modification example of the second embodiment.

FIG. 38 illustrates a configuration example of four light-receiving sections P, four flip-flops 29, the AND circuit 37, and the flip-flop 38 according to the present modification example. The light-receiving sections P each include the photodiode PD, the transistors MN1, MP1, MP2, MP3, and MN2, and the inverter IV1. The light-receiving sections P according to the present modification example each correspond to the light-receiving section P (FIG. 3) according to the embodiment described above from which the AND circuit AND1 and the OR circuit OR1 are omitted. In each of the light-receiving sections P according to the present modification example, the inverter IV1 is configured to generate an inverted voltage of the voltage VN1 at the node N1 to thereby generate the pulse signal PLS. Each of the four flip-flops 29 operates on the basis of the pulse signal PLS outputted from the inverter IV1 of a corresponding light-receiving section P. The AND circuit 37 finds logical AND of four pulse signals PLS. The flip-flop 38 operates on the basis of an output signal of the AND circuit 37. It is to be noted that, in this example, the flip-flop section 32C including the plurality of AND circuits 37 is used, but this is not limitative. As illustrated in FIG. 39, a flip-flop section 32D including a plurality of OR circuits 37A may be used.

Figure 40:
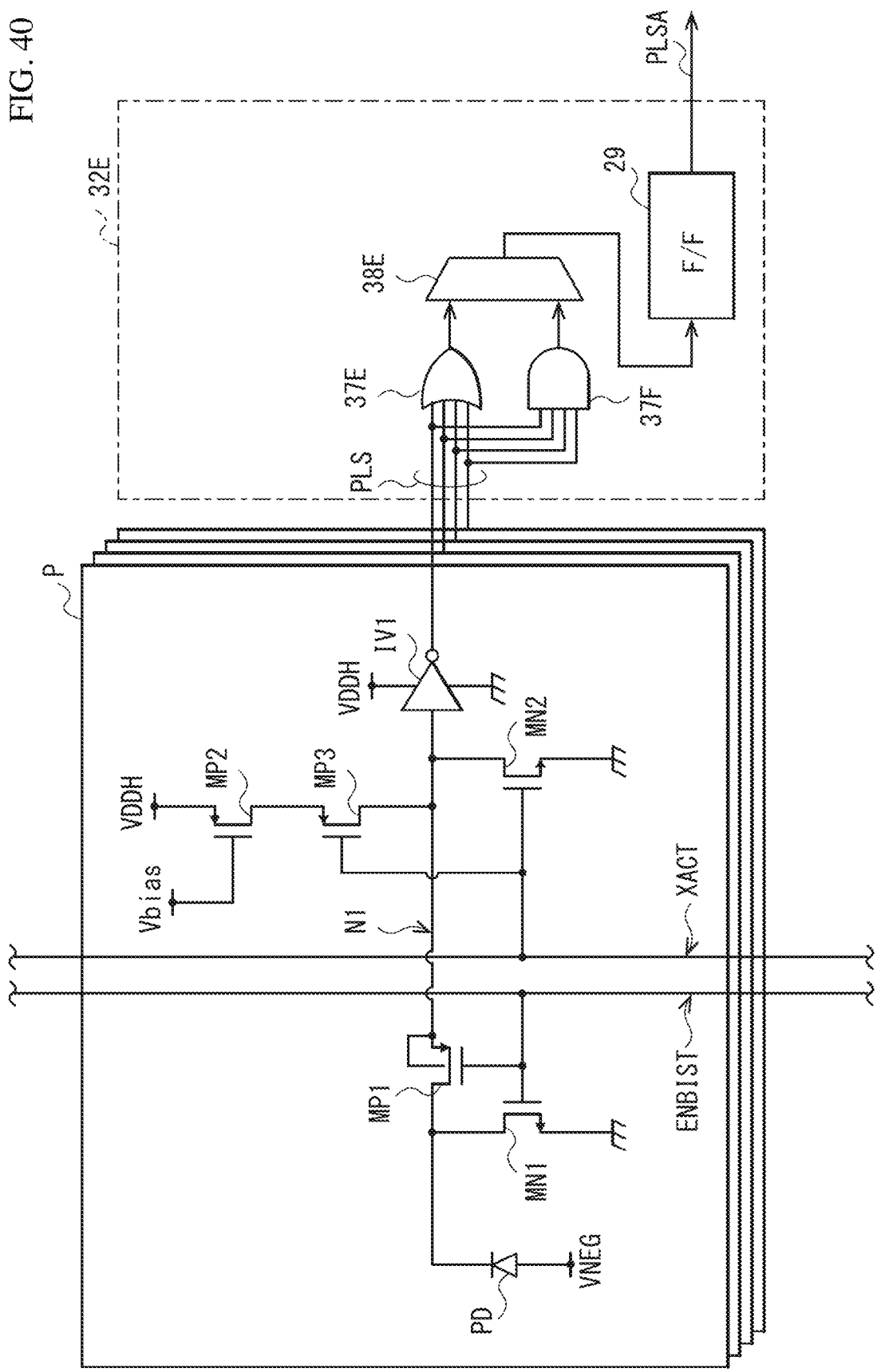
FIG. 40 is a circuit diagram illustrating a configuration example of a light-receiving section and a flip-flop section according to another modification example of the second embodiment.

In addition, in the example in FIG. 38, the four flip-flops 29 are provided corresponding one-to-one to the four light-receiving sections P, but this is not limitative. For example, like a flip-flop section 32E illustrated in FIG. 40, one flip-flop 29 corresponding to four light-receiving sections P may be provided. This flip-flop section 32E includes an OR circuit 37E, an AND circuit 37F, a selector 38E, and the flip-flop 29. The OR circuit 37E is configured to find logical OR of four pulse signals PLS. The AND circuit 37F is configured to find logical AND of four pulse signals PLS. The selector 38E is configured to select an output signal of the OR circuit 37E in the distance measuring operation and select an output signal of the AND circuit 37F in the self-diagnosis operation. The flip-flop 29 is configured to sample an output signal of the selector 38E on the basis of a rising edge of the clock signal CLK to thereby generate the pulse signal PLSA. In the distance measuring operation, the OR circuit 37E finds logical OR of four pulse signal PLS, and the flip-flop 29 generates the pulse signal PLSA on the basis of the output signal of this OR circuit 37E. Accordingly, it is possible to reduce the number of flip-flops 29, as compared with the example in FIG. 38, which makes it possible to reduce a circuit area and reduce electric power consumption.

Likewise, in the example in FIG. 39, the four flip-flops 29 are provided corresponding one-to-one to the four light-receiving sections P, but this is not limitative. For example, like a flip-flop section 32F illustrated in FIG. 41, one flip-flop 29 corresponding to the four light-receiving sections P may be provided. This flip-flop section 32F includes an OR circuit 37E and the flip-flop 29. The OR circuit 37E is configured to find logical OR of four pulse signals PLS. The flip-flop 29 is configured to sample an output signal of the OR circuit 37E on the basis of a rising edge of the clock signal CLK to thereby generate the pulse signal PLSA. In this example, the OR circuit 37E is used in both the distance measuring operation and the self-diagnosis operation. Accordingly, it is possible to reduce the number of flip-flops 29, as compared with the example in FIG. 39, which makes it possible to reduce a circuit area and reduce electric power consumption.

The photodetector according to the present modification example may be formed, for example, on two semiconductor substrates, as with the photodetector 20D (FIG. 29) according to the modification example 1-4.

3. Third Embodiment

Next, description is given of a photodetection system 3 according to a third embodiment. The present embodiment is configured to collectively perform self-diagnosis on a plurality of light-receiving sections P with use of an adder. It is to be noted that components substantially the same as those of the photodetection system 1 according to the first embodiment described above are denoted by the same reference numerals, and description thereof is omitted as appropriate.

The photodetection system 3 according to the present embodiment includes a photodetector 40, as with the photodetection system 1 (FIG. 1) according to the first embodiment.

FIG. 42 illustrates a configuration example of the photodetector 40. The photodetector 40 includes a flip-flop section 42, a histogram generator 43, and a diagnosis section 46.

FIG. 43 illustrates a configuration example of the flip-flop section 42. The flip-flop section 42 includes a plurality of flip-flops 29 and a plurality of adders 47.

Each of the plurality of adders 47 is configured to perform addition processing on the basis of four pulse signals PLSA to thereby generate a code CODE. Specifically, the adders 47 each generates the conde CODE indicating the number of signals that are at the high level of the four pulse signals PLSA. The number of signals that are at the high level may take a value of 0 or more and 4 or less. Accordingly, the adder 47 generates a 3-bit code CODE.

FIG. 44 illustrates a configuration example of the adder 47. The adder 47 includes half adders 51 and 52 and full adders 53 and 54. The half adder 51 has input terminals A and B to which two of four pulse signals PLSA are inputted, an output terminal S coupled to an input terminal A of the full adder 54, and a carry output terminal Cout coupled to an input terminal A of the full adder 53. The half adder 52 has input terminals A and B to which the remaining two of the four pulse signals PLSA are inputted, an output terminal S coupled to an input terminal B of the full adder 54, and a carry output terminal Cout coupled to an input terminal B of the full adder 53. The full adder 53 has the input terminal A coupled to the carry output terminal Cout of the half adder 51, the input terminal B coupled to the carry output terminal Cout of the half adder 52, and a carry input terminal Cin coupled to a carry output terminal Cout of the full adder 54. The full adder 53 outputs a signal indicating a bit B2 of the code CODE from the carry output terminal Cout, and outputs a signal indicating a bit B1 of the code CODE from an output terminal S. The full adder 54 has the input terminal A coupled to the output terminal S of the half adder 51, the input terminal B coupled to the output terminal S of the half adder 52, a carry input terminal Cin grounded, and the carry output terminal Cout coupled to the carry input terminal Cin of the full adder 53. The full adder 54 outputs a signal indicating a bit B0 of the code CODE from an output terminal S. The bit B2 is the most significant bit of the code CODE, and the bit B0 is the least significant bit of the code CODE.

The histogram generator 43 (FIG. 42) generates a histogram indicating the light reception timing in each of the plurality of light-receiving sections P on the basis of a plurality of pulse signals PLSA in the distance measuring operation. In addition, the histogram generator 43 generates a histogram indicating the generation timing of the pulse of the pulse signal PLS based on the control signal XACT in each of the plurality of light-receiving sections P on the basis of the code CODE in the self-diagnosis operation.

The diagnosis section 46 is configured to perform diagnosis processing on the plurality of light-receiving sections P in the pixel array 21 on the basis of data of the generation timing of the pulse of the pulse signal PLS based on the control signal XACT supplied from the histogram generator 43. This diagnosis section 46 performs diagnosis processing on the plurality of light-receiving sections P by collectively diagnosing four light-receiving sections P.

Here, the flip-flop section 42 and the histogram generator 43 correspond to specific examples of a "detector" in the present disclosure.

The photodetection system 3 performs the distance measuring operation in the distance measurement period T1, and performs self-diagnosis on the plurality of light-receiving sections P in the pixel array 21 in the blanking period T2, as with the photodetection system 1 (FIG. 6) according to the first embodiment. The distance measuring operation of the photodetection system 3 is similar to that in the photodetection system 1 (FIGS. 7 to 10) according to the first embodiment.

In the self-diagnosis operation, the diagnosis section 36 is able to diagnose faults such as the cases C1 to C5 described above.

(Case C1)

In a case where a current to be applied by the constant current source CUR is large (case C1), as illustrated in FIG. 14A, the pulse width of the pulse signal PLS1 becomes shorter, as compared with a case where no fault is present ((D) of FIG. 14A).

FIG. 45 illustrates an operation example of the histogram generator 43, where (A) indicates a case where no fault is present in all of the four light-receiving sections P, and (B) indicates a case where a fault associated with the case C1 is present in one of the four light-receiving sections P. In a case where no fault is present in all of the four light-receiving sections P, the pulse widths of four pulse signals PLS are the same; therefore, a value indicated by the code CODE is changed to "0", "4", "4", "4", "4", and "0", for example, around a pulse of the pulse signal PLS. Accordingly, as illustrated in (A) of FIG. 45, a flat histogram in which frequency is "4" is obtained. A left end of this histogram corresponds to a generation timing of a pulse of the pulse signal PLS, and the width of the distribution of the histogram corresponds to the pulse width of the pulse of the pulse signal PLS.

In a case where a fault associated with the case C1 is present in one of the four light-receiving sections P, in the light-receiving section P having the fault, as illustrated in FIG. 14A, the end timing of the pulse of the pulse signal PLS1 becomes earlier, which shortens the pulse width ((D) of FIG. 14A). Accordingly, the value indicated by the code CODE is changed to "0", "4", "4", "4", "3", and "0", for example, around the pulse of the pulse signal PLS. As a result, as illustrated in (B) of FIG. 45, a portion of a right end of the histogram is missing, as compared with a case where no fault is present ((A) of FIG. 45).

In a case where a portion of the right end of the histogram is missing in such a manner, the diagnosis section 46 diagnoses at least one of the four light-receiving sections P as having such a fault that a current to be applied by the constant current source CUR is increased.

(Case C2)

In a case where a current to be applied by the constant current source CUR is small (Case C2), as illustrated in FIG. 15A, the pulse width of the pulse signal PLS1 becomes longer, as compared with a case where no fault is present ((D) of FIG. 15A).

FIG. 46 illustrates an operation example of the histogram generator 43, where (A) indicates a case where no fault is present in all of the four light-receiving sections P, and (B) indicates a case where a fault associated with the case C2 is present in one of the four light-receiving sections P. In a case where a fault associated with the case C2 is present in one of the four light-receiving sections P, in the light-receiving section P having the fault, as illustrated in FIG. 15A, the end timing of the pulse of the pulse signal PLS1 becomes later, which makes the pulse width of the pulse signal PLS1 longer ((D) of FIG. 15A). Accordingly, the value indicated by the code CODE is changed to "0", "4", "4", "4", "4", "1", and "0", for example, around the pulse of the pulse signal PLS. As a result, as illustrated in (B) of FIG. 46, a portion of a right end of the histogram extends, as compared with a case where no fault is present ((A) of FIG. 46).

In a case where a portion of a right end of the histogram extends in such a manner, the diagnosis section 46 diagnoses at least one of the four light-receiving sections P as having such a fault such as a current to be applied by the constant current source CUR is decreased.

(Case C3)

In a case where the voltage VN1 at the node N1 is stuck at the high level (case C3), as illustrated in FIG. 16A, the light-receiving section P maintains the pulse signal PLS1 at the low level ((D) of FIG. 16A).

FIG. 47 illustrates an operation example of the histogram generator 43, where (A) indicates a case where no fault is present in all of the four light-receiving sections P, and (B) indicates a case where a fault associated with the case C3 is present in one of the four light-receiving sections P. In a case where a fault associated with the case C3 is present in one of the four light-receiving sections P, in the light-receiving section P having the fault, as illustrated in FIG. 16A, the pulse signal PLS1 is maintained at the low level ((D) of FIG. 16A). Accordingly, the value indicated by the code CODE is changed to "0", "3", "3", "3", "3", and "0", for example, around the pulse of the pulse signal PLS. As a result, as illustrated in (B) of FIG. 47, a height of the histogram becomes lower, as compared with a case where no fault is present ((A) of FIG. 47).

In a case where the height of the histogram becomes lower, the diagnosis section 46 diagnoses at least one of the four light-receiving sections P as having such a fault that the voltage VN1 at the node N1 is stuck at the high level.

(Case C4)

In a case where the voltage VN1 at the node N1 is stuck at the low level (case C4), as illustrated in FIG. 17A, the light-receiving section P maintains the pulse signal PLS1 at the high level ((D) of FIG. 17A).

FIG. 48 illustrates an operation example of the histogram generator 43, where (A) indicates a case where no fault is present in all of the four light-receiving sections P, and (B) indicates a case where a fault associated with the case C4 is present in one of four light-receiving sections P. In a case where a fault associated with the case C4 is present in one of the four light-receiving sections P, in the light-receiving section P having the fault, as illustrated in FIG. 17A, the pulse signal PLS1 is maintained at the high level ((D) of FIG. 17A). Accordingly, the value indicated by the code CODE is changed to "1", "1", "4", "4", "4", "4", "1", and . . . , for example. As a result, as illustrated in (B) of FIG. 48, in the histogram, frequency in all bins is "1" or greater.

In a case where frequency in all bins is "1" or greater in such a manner, the diagnosis section 46 diagnoses at least one of the four light-receiving sections P as having such a fault that the voltage VN1 at the node N1 is stuck at the low level.

(Case C5)

In a case where the cathode of the photodiode PD is stuck at the low level or the anode and the cathode of the photodiode PD are mutually short-circuited (case C5), as illustrated in FIG. 19A, the light-receiving section P maintains the pulse signal PLS1 at the high level ((D) of FIG. 19A). It is to be noted that, in a case where self-diagnosis associated with the case C5 are performed, as described above, the control signal ENBIST is changed to the low level, and the power supply voltage VNEG to be applied to the anode of the photodiode PD is changed to "0 V", for example. Accordingly, in a case where a fault associated with the case C5 is present in one of the four light-receiving sections P, in the histogram, frequency in all bins is "1" or greater, as with the case C4 (FIG. 48).

In a case where frequency in all bins is "1" or greater under condition that the control signal ENBIST is changed to the low level and the power supply voltage VNEG is changed to "0 V", the diagnosis section 46 diagnoses at least one of the four light-receiving sections P as having such a fault that the cathode of the photodiode PD is stuck at the low level or the cathode and the anode of the photodiode PD are mutually short-circuited.

Thus, in the photodetection system 3, addition processing is performed on the basis of the pulse signal PLS generated by each of a plurality (four in this example) of light-receiving section P to generate the code CODE, and a timing of changing the code CODE is detected, which makes it possible to perform diagnosis processing.

As described above, in the present embodiment, addition processing is performed on the basis of a pulse signal generated by each of a plurality of light-receiving sections to generate a code, and a timing of changing the code is detected, which makes it possible to perform diagnosis processing.

[Modification Example 3-1]

In the embodiment described above, the flip-flops 29 is provided, but this is not limitative. Instead of this, a TDC may be provided, as with the modification example 2-2.

[Modification Example 3-2]

In the embodiment described above, the light-receiving sections P are coupled by daisy chain coupling, but this is not limitative. Instead of this, for example, as with the modification example 2-3, the light-receiving sections P may be coupled one-to-one to the flip-flops 29.

4. Fourth Embodiment

Next, description is given of a photodetection system 4 according to a fourth embodiment. In the present embodiment, the configuration of the light-receiving section P differs from that of the light-receiving section P (FIG. 3) according to the first embodiment. It is to be noted that components substantially the same as those of the photodetection system 1 according to the first embodiment described above are denoted by the same reference numerals, and description thereof is omitted as appropriate.

The photodetection system 4 according to the present embodiment includes a photodetector 60, as with the photodetection system 1 (FIG. 1) according to the first embodiment.

FIG. 49 illustrates a configuration example of the photodetector 60. The photodetector 60 includes a pixel array 61 and a diagnosis section 66.

The pixel array 61 includes a plurality of light-receiving sections P disposed in a matrix. The light-receiving sections P are each configured to detect light to thereby generate a pulse signal having a pulse corresponding to the detected light. In addition, in a case where the photodetection system 1 performs a self-diagnosis operation, the light-receiving sections P are each able to generate a pulse signal on the basis of supplied control signals (control signals ENBIST, XACT, and XENAR to be described later).

Figure 50:
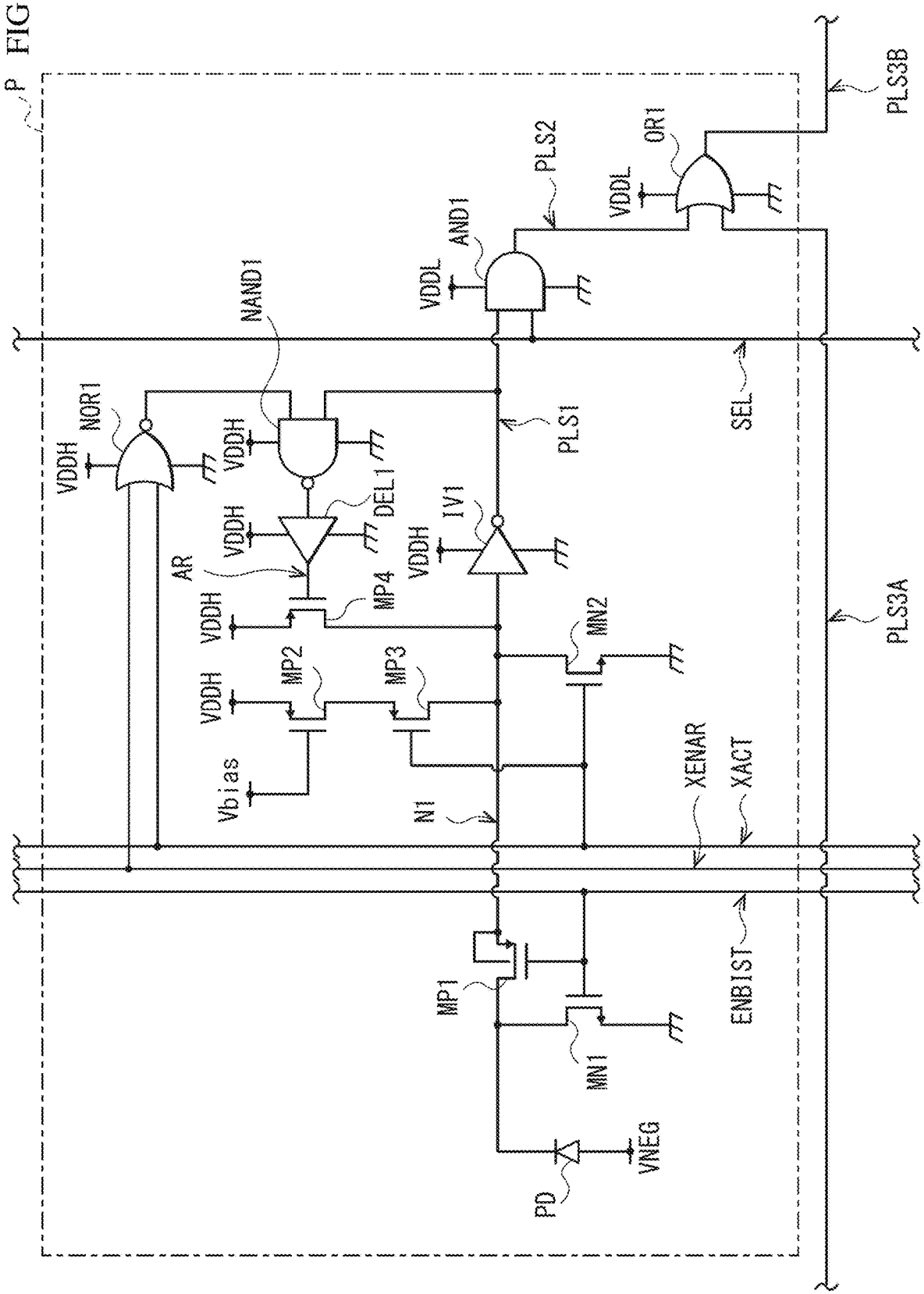
FIG. 50 is a circuit diagram illustrating a configuration example of a light-receiving section illustrated in FIG. 49.

FIG. 50 illustrates a configuration example of the light-receiving section P. The light-receiving section P includes the photodiode PD, the transistors MN1, MP1, MP2, MP3, and MN2, the inverter IV1, a negative OR circuit NOR1, a negative AND circuit NAND1, a delay circuit DEL1, a transistor MP4, the AND circuit AND1, and the OR circuit OR1. The transistor MP4 is a P-type MOS transistor.

The negative OR circuit NOR1 is configured to find negative OR of the control signal XACT and the control signal XENAR. This negative OR circuit NOR1 is supplied with the power supply voltage VDDH.

The negative AND circuit NAND1 is configured to find negative AND of an output signal of the negative OR circuit NOR1 and the pulse signal PLS1. This negative AND circuit NAND1 is supplied with the power supply voltage VDDH.

The delay circuit DEL1 is configured to delay an output signal of the negative AND circuit NAND1. This delay circuit DEL1 is supplied with the power supply voltage VDDH.

The transistor MP4 has a gate supplied with an output signal of the delay circuit DEL1, a source supplied with the power supply voltage VDDH, and a drain coupled to the node N1.

The diagnosis section 66 (FIG. 49) is configured to perform diagnosis processing on the plurality of light-receiving sections P in the pixel array 61 on the basis of data of the generation timing of the pulse of the pulse signal PLS based on the control signal XACT. The data is supplied from the histogram generator 23.

The distance measurement controller 68 is configured to control operations of the pixel array 61, the flip-flop section 22, the histogram generator 23, the distance calculator 24, and the diagnosis section 66 on the basis of an instruction from the controller 14 to thereby control an operation of the photodetector 60.

FIG. 51 illustrates an operation example of the light-receiving section P in the distance measuring operation, where (A) indicates a waveform of the control signal ENBIST, (B) indicates a waveform of the control signal XACT, (C) indicates a waveform of the control signal XENAR, (D) indicates a waveform of light emitted from the light-emitting section 11, (E) indicates a waveform of light incident on the photodetector 60, (F) indicates a waveform of a voltage AR at the gate of the transistor MP4, (G) indicates a waveform of the voltage VN1 at the node N1, and (H) indicates a waveform of the pulse signal PLS1 (pulse signal PLS). In FIG. 51, waveforms of the clock signal CLK and the pulse signal PLSA are not illustrated, but are similar to those in the first embodiment described above (FIG. 9).

In the distance measuring operation, the distance measurement controller 68 changes the control signals ENBIST and XACT to the low level ((A) and (B) of FIG. 51). Accordingly, in the light-receiving section P, the transistors MP1 and MP3 are turned on, and the transistors MN1 and MN2 are turned off. As a result, the cathode of the photodiode PD is coupled to the node N1, and the constant current source CUR (transistor MP2) is coupled to the node N1. In addition, the distance measurement controller 68 changes the control signal XENAR to the low level ((C) of FIG. 51). Accordingly, the output signal of the negative OR circuit NOR1 is at the high level.

At a timing t91, the light-emitting section 11 emits the light pulse L0 on the basis of an instruction from the controller 14 ((D) of FIG. 51). This light pulse L0 is reflected by the measurement object OBJ. The light pulse (reflected light pulse L1) reflected by the measurement object OBJ enters the light-receiving section P of the photodetector 20 at a timing t92. A time from the timing t91 at which the light pulse L0 is emitted to the timing t92 at which the reflected light pulse L1 enters the light-receiving section P is a time-of-flight Ttof of the light pulse detected by the light-receiving section P.

In the light-receiving section P, the photodiode PD causes avalanche amplification by detecting light, which decreases the voltage VN1 at the node N1 ((G) of FIG. 51). Then, at a timing t93, in a case where the voltage VN1 at the node N1 becomes lower than the logical threshold TH of the inverter IV1, the inverter IV1 changes the pulse signal PLS1 from the low level to the high level ((H) of FIG. 51).

The negative AND circuit NAND1 changes an output signal from the high level to the low level in accordance with the change in this pulse signal PLS1. At a timing t94 delayed for a delay time of the delay circuit DEL1 from the timing t93, the delay circuit DEL1 changes the voltage AR at the gate of the transistor MP4 from the high level to the low level ((F) of FIG. 51). Accordingly, the transistor MP4 is turned on, and the voltage VN1 at the node N1 is increased ((G) of FIG. 51). Then, at a timing t95, in a case where the voltage VN1 at the node N1 becomes higher than the logical threshold TH of the inverter IV1, the inverter IV1 changes the pulse signal PLS1 from the high level to the low level ((H) of FIG. 51).

Then, the negative AND circuit NAND1 changes an output signal from the low level to the high level in accordance with the change in this pulse signal PLS1. At a timing t96 delayed for the delay time of the delay circuit DEL1 from the timing t95, the delay circuit DEL1 changes the voltage AR at the gate of the transistor MP4 from the low level to the high level ((F) of FIG. 51).

FIG. 52 illustrates an operation example of the light-receiving section P in the self-diagnosis operation, where (A) indicates a waveform of the control signal ENBIST, (B) indicates a waveform of the control signal XACT, (C) indicates a waveform of the control signal XENAR, (D) indicates a waveform of the voltage AR at the gate of the transistor MP4, (E) indicates a waveform of the voltage VN1 at the node N1, and (F) indicates a waveform of the pulse signal PLS1 (pulse signal PLS). In FIG. 52, waveforms of the clock signal CLK and the pulse signal PLSA are not illustrated, but are similar to those in the first embodiment described above (FIG. 12 and the like).

In the self-diagnosis operation, the distance measurement controller 68 changes the control signal ENBIST to the high level ((A) of FIG. 52). Accordingly, in the light-receiving section P, the transistor MP1 is turned off, and the transistor MN1 is turned on. As a result, the cathode of the photodiode PD is separated from the node N1, and grounded. In addition, the distance measurement controller 68 changes the control signal XACT to the high level in a period before a timing t101 ((B) of FIG. 52). Accordingly, in the light-receiving section P, the transistor MN2 is turned on, and the transistor MP3 is turned off. As a result, the constant current source CUR is separated from the node N1, and the node N1 is grounded. Furthermore, the distance measurement controller 68 changes the control signal XENAR to the low level ((C) of FIG. 52). The control signal XACT is at the high level in the period before the timing t101; therefore, the negative OR circuit NOR1 changes the output signal to the low level. Accordingly, the delay circuit DEL1 changes the voltage AR to the high level ((D) of FIG. 52).

At the timing t101, the distance measurement controller 68 changes the control signal XACT from the high level to the low level ((B) of FIG. 52). Accordingly, in the light-receiving section P, the transistor MP3 is turned on, and the transistor MN2 is turned off. As a result, the node N1 is separated from the ground node, and is coupled to the constant current source CUR. Accordingly, although not illustrated, a current flows into the node N1 through the constant current source CUR, which gradually increases the voltage VN1 at the node N1.

Next, at a timing t102 at which the delay time of the delay circuit DEL1 has elapsed from the timing t101, the delay circuit DEL1 changes the voltage AR at the gate of the transistor MP4 from the high level to the low level ((D) of FIG. 52). Accordingly, the transistor MP4 is turned on, and the voltage VN1 at the node N1 is increased ((E) of FIG. 52).

Then, at a timing t103, in a case where the voltage VN1 at the node N1 becomes higher than the logical threshold TH of the inverter IV1, the inverter IV1 changes the pulse signal PLS1 from the high level to the low level ((F) of FIG. 52). Then, at a timing at which the delay time of the delay circuit DEL1 has elapsed from this timing t103, the delay circuit DEL1 changes the voltage AR from the low level to the high level ((D) of FIG. 52). Thus, preparation is completed.

Then, at a timing t104, the distance measurement controller 68 changes the control signal XACT from the low level to the high level ((B) of FIG. 52). Accordingly, in the light-receiving section P, the transistor MN2 is turned on, and the transistor MP3 is turned off. As a result, the node N1 is separated from the constant current source CUR, and grounded, which changes the voltage VN1 at the node N1 from the high level to the low level ((E) of FIG. 52). The voltage VN1 at the node N1 becomes lower than the logical threshold TH of the inverter IV1, which causes the inverter IV1 to change the pulse signal PLS1 from the low level to the high level ((F) of FIG. 52).

Next, at a timing t105, the distance measurement controller 68 changes the control signal XACT from the high level to the low level ((B) of FIG. 52). Accordingly, in the light-receiving section P, the transistor MP3 is turned on, and the transistor MN2 is turned off. As a result, the node N1 is separated from the ground node, and is coupled to the constant current source CUR. Accordingly, although not illustrated, a current flows into the node N1 through the constant current source CUR, which gradually increases the voltage VN1 at the node N1.

Next, at a timing t106 at which the delay time of the delay circuit DEL1 has elapsed from the timing t105, the delay circuit DEL1 changes the voltage AR from the high level to the low level ((D) of FIG. 52). Accordingly, the transistor MP4 is turned on, and the voltage VN1 at the node N1 is increased ((E) of FIG. 52). Then, at a timing t107, in a case where the voltage VN1 at the node N1 becomes higher than the logical threshold TH of the inverter IV1, the inverter IV1 changes the pulse signal PLS1 from the high level to the low level ((F) of FIG. 52). Then, at a timing at which the delay time of the delay circuit DEL1 has elapsed from the timing t107, the delay circuit DEL1 changes the voltage AR from the low level to the high level ((D) of FIG. 52).

Next, the self-diagnosis operation is described in detail with reference to some examples of faults. In the light-receiving section P, various faults may occur due to an initial failure, deterioration over time, and the like. Examples of the faults may include a case where the transistor MP4 is not able to change the voltage at the node N1 (case C11) and a case where the transistors MP2 and MP3 are not able to supply a current to the node N1. The examples of the faults may further include a case where the case C11 and the case C12 simultaneously occur (case C13). The diagnosis section 66 is able to diagnose these various faults in the light-receiving section P.

(Case C11)

First, description is given of a case where the transistor MP4 is not able to change the voltage at the node N1 (case C11). It is to be noted that, in this example, description is given of an example in which a fault is present in the transistor MP4, but the same applies to a case where a fault is present in any location in a path of the negative AND circuit NAND1, the delay circuit DEL1, and the transistor MP4.

FIG. 53 illustrates an operation example of the light-receiving section P in the case C11, where (A) indicates a waveform of the control signal ENBIST, (B) indicates a waveform of the control signal XACT, (C) indicates a waveform of the control signal XENAR, (D) indicates a waveform of the voltage AR sat the gate of the transistor MP4, (E) indicates a waveform of the voltage VN1 at the node N1, and (F) indicates a waveform of the pulse signal PLS1 (pulse signal PLS). In (E) and (F) of FIG. 53, a broken line indicates a waveform in a case where no fault is present, and a solid line indicate a waveform in a case where a fault is present. (A) to (F) of FIG. 53 respectively correspond to (A) to (F) of FIG. 52.

At a timing t111, the distance measurement controller 68 changes the control signal XACT from the high level to the low level ((B) of FIG. 53). Accordingly, in the light-receiving section P, the transistor MP3 is turned on, and the transistor MN2 is turned off. As a result, the node N1 is separated from the ground node, and is coupled to the constant current source CUR. Accordingly, a current flows into the node N1 through the constant current source CUR, which gradually increases the voltage VN1 at the node N1 ((E) of FIG. 53).

Next, at a timing t112 at which the delay time of the delay circuit DEL1 has elapsed from the timing t111, the delay circuit DEL1 changes the voltage AR at the gate of the transistor MP4 from the high level to the low level ((D) of FIG. 53). In the case C11, the transistor MP4 is not able to change the voltage VN1 at the node N1, which increases the voltage VN1 as it is on the basis of a current supplied from the constant current source CUR ((E) of FIG. 53). Thereafter, the delay circuit DEL1 changes the voltage AR from the low level to the high level ((D) of FIG. 53). At a timing t113, in a case where the voltage VN1 at the node N1 becomes higher than the logical threshold TH of the inverter IV1, the inverter IV1 changes the pulse signal PLS1 from the high level to the low level ((F) of FIG. 53).

Then, at a timing t114, the distance measurement controller 68 changes the control signal XACT from the low level to the high level ((B) of FIG. 53). Accordingly, in the light-receiving section P, the transistor MN2 is turned on, and the transistor MP3 is turned off. As a result, the node N1 is separated from the constant current source CUR, and grounded, which changes the voltage VN1 at the node N1 from the high level to the low level ((E) of FIG. 53). The voltage VN1 at the node N1 becomes lower than the logical threshold TH of the inverter IV1, which causes the inverter IV1 to change the pulse signal PLS1 from the low level to the high level ((F) of FIG. 53).

Next, at a timing t115, the distance measurement controller 68 changes the control signal XACT from the high level to the low level ((B) of FIG. 53). Accordingly, in the light-receiving section P, the transistor MP3 is turned on, and the transistor MN2 is turned off. As a result, the node N1 is separated from the ground node, and is coupled to the constant current source CUR. Accordingly, a current flows into the node N1 through the constant current source CUR, which gradually increases the voltage VN1 at the node N1 ((E) of FIG. 53).

Next, at a timing t116 at which the delay time of the delay circuit DEL1 has elapsed from the timing t115, the delay circuit DEL1 changes the voltage AR from the high level to the low level ((D) of FIG. 53). In the case C11, the transistor MP4 is not able to change the voltage VN1 at the node N1, which increases the voltage VN1 as it is on the basis of a current supplied from the constant current source CUR ((E) of FIG. 53). Thereafter, the delay circuit DEL1 changes the voltage AR from the low level to the high level ((D) of FIG. 53). At a timing t117, in a case where the voltage VN1 at the node N1 becomes higher than the logical threshold TH of the inverter IV1, the inverter IV1 changes the pulse signal PLS1 from the high level to the low level ((F) of FIG. 53).

Thus, in the case C11, the transistor MP4 is not able to change the voltage VN1 at the node N1, which causes a current to flow into the node N1 through a path of the transistors MP2 and MP3, and increases the voltage VN1 at the node N1. Accordingly, as compared with a case where no fault is present, the end timing of the pulse of the pulse signal PLS1 becomes later, and the pulse width of the pulse signal PLS1 becomes longer. Accordingly, in a histogram generated by the histogram generator 23, a right end of the histogram moves to the right, which widens the width of the distribution of the histogram.

In a case where the right end of the histogram moves to the right to thereby widen the width of the distribution of the histogram in such a manner, the diagnosis section 66 diagnoses the light-receiving section P as having such a fault that the transistor MP4 is not able to change the voltage at the node N1.

(Case C13)

Next, description is given of a case where the transistor MP4 is not able to change the voltage VN1 at the node N1 and the transistors MP2 and MP3 are not able to supply a current to the node N1 (case C13).

FIG. 54 illustrates an operation example of the light-receiving section P in the case C13.

At a timing t121, the distance measurement controller 68 changes the control signal XACT from the high level to the low level ((B) of FIG. 54). Accordingly, in the light-receiving section P, the transistor MP3 is turned on, and the transistor MN2 is turned off. In the case C13, the transistors MP2 and MP3 are notable to supply a current to the node N1, which causes the voltage VN1 at the node N1 to be maintained at the low level ((E) of FIG. 54).

Next, at a timing t122 at which the delay time of the delay circuit DEL1 has elapsed from the timing t121, the delay circuit DEL1 changes the voltage AR at the gate of the transistor MP4 from the high level to the low level ((D) of FIG. 54). In the case C13, the transistor MP4 is not able to change the voltage VN1 at the node N1, which causes the voltage VN1 to be maintained at the low level ((E) of FIG. 54). Thereafter, the delay circuit DEL1 changes the voltage AR from the low level to the high level ((D) of FIG. 54).

Then, at a timing t123, the distance measurement controller 68 changes the control signal XACT from the low level to the high level ((B) of FIG. 54). Accordingly, in the light-receiving section P, the transistor MN2 is turned on, and the transistor MP3 is turned off. As a result, the node N1 is grounded, which causes the voltage VN1 at the node N1 to be maintained at the low level ((E) of FIG. 54).

Next, at a timing t124, the distance measurement controller 68 changes the control signal XACT from the high level to the low level ((B) of FIG. 54). Accordingly, in the light-receiving section P, the transistor MP3 is turned on, and the transistor MN2 is turned off. In the case C13, the transistors MP2 and MP3 are not able to supply a current to the node N1, which causes the voltage VN1 at the node N1 to be maintained at the low level ((E) of FIG. 54).

Next, at a timing t125 at which the delay time of the delay circuit DEL1 has elapsed from the timing t124, the delay circuit DEL1 changes the voltage AR from the high level to the low level ((D) of FIG. 54). In the case C13, the transistor MP4 is not able to change the voltage VN1 at the node N1, which causes the voltage VN1 to be maintained at the low level ((E) of FIG. 54). Thereafter, the delay circuit DEL1 changes the voltage AR from the low level to the high level ((D) of FIG. 54).

Thus, the transistor MP4 is not able to change the voltage VN1 at the node N1, and the transistors MP2 and MP3 are not able to supply a current to the node N1, which causes the voltage VN1 at the node N1 to be maintained at the low level. Accordingly, the inverter IV1 maintains the pulse signal PLS1 at the high level. Accordingly, in a histogram generated by the histogram generator 23, frequency in all bins is "1".

In a case where frequency in all bins is "1" in such a manner, the diagnosis section 66 diagnoses the light-receiving section P as having such a fault that the transistor MP4 is not able to change the voltage VN1 at the node N1 and the transistors MP2 and MP3 are not able to supply a current to the node N1.

(Case C12)

Next, description is given of a case where the transistors MP2 and MP3 are not able to supply a current to the node N1 (case C12). A self-diagnosis operation in the case C12 is performed by setting the transistor MP4 not to be able to change the voltage VN1 at the node N1. First, description is given of a case where no fault of the case C12 occurs. Then, description is given of a case where a fault of the case C12 occurs.

FIG. 55 illustrates an operation example of the light-receiving section P in the self-diagnosis operation in a case where no fault of the case C12 occurs. In this self-diagnosis operation, the distance measurement controller 68 changes the control signal XENAR to the high level ((C) of FIG. 55). Accordingly, the negative OR circuit NOR1 maintains the output signal at the low level, and the delay circuit DEL1 maintains the voltage AR at the gate of the transistor MP4 at the high level. In this self-diagnosis operation, the transistor MP4 is maintained off in such a manner.

At a timing t131, the distance measurement controller 68 changes the control signal XACT from the high level to the low level ((B) of FIG. 55). Accordingly, in the light-receiving section P, the transistor MP3 is turned on, and the transistor MN2 is turned off. As a result, the node N1 is separated from the ground node, and is coupled to the constant current source CUR. Accordingly, a current flows into the node N1 through the constant current source CUR, which gradually increases the voltage VN1 at the node N1 ((E) of FIG. 55). Then, at a timing t132, in a case where the voltage VN1 at the node N1 becomes higher than the logical threshold TH of the inverter IV1, the inverter IV1 changes the pulse signal PLS1 from the high level to the low level ((F) of FIG. 55). Thus, preparation is completed.

Then, at a timing t133, the distance measurement controller 68 changes the control signal XACT from the low level to the high level ((B) of FIG. 55). Accordingly, in the light-receiving section P, the transistor MN2 is turned on, and the transistor MP3 is turned off. As a result, the node N1 is separated from the constant current source CUR, and grounded, which changes the voltage VN1 at the node N1 from the high level to the low level ((E) of FIG. 55). The voltage VN1 at the node N1 becomes lower than the logical threshold TH of the inverter IV1, which causes the inverter IV1 to change the pulse signal PLS1 from the low level to the high level ((F) of FIG. 55).

Next, at a timing t134, the distance measurement controller 68 changes the control signal XACT from the high level to the low level ((B) of FIG. 55). Accordingly, in the light-receiving section P, the transistor MP3 is turned on, and the transistor MN2 is turned off. As a result, the node N1 is separated from the ground node, and is coupled to the constant current source CUR. Accordingly, a current flows into the node N1 through the constant current source CUR, which gradually increases the voltage VN1 at the node N1. Then, at a timing t135, in a case where the voltage VN1 at the node N1 becomes higher than the logical threshold TH of the inverter IV1, the inverter IV1 changes the pulse signal PLS1 from the high level to the low level ((F) of FIG. 55).

FIG. 56 illustrates an operation example of the light-receiving section P in a self-diagnosis operation in a case where a fault of the case C12 occurs. In (E) and (F) of FIG. 56, a broken line indicates a waveform in a case where no fault is present, and a solid line indicates a waveform in a case where a fault is present. (A) to (F) of FIG. 56 respectively correspond to (A) to (F) of FIG. 55.

At a timing t141, the distance measurement controller 68 changes the control signal XACT from the high level to the low level ((B) of FIG. 56). Accordingly, in the light-receiving section P, the transistor MP3 is turned on, and the transistor MN2 is turned off. In the case C12, the transistors MP2 and MP3 are not able to supply a current to the node N1, which causes the voltage VN1 at the node N1 to be maintained at the low level ((E) of FIG. 56).

Then, at a timing t142, the distance measurement controller 68 changes the control signal XACT from the low level to the high level ((B) of FIG. 56). Accordingly, in the light-receiving section P, the transistor MN2 is turned on, and the transistor MP3 is turned off. As a result, the node N1 is grounded, which causes the voltage VN1 at the node N1 to be maintained at the low level ((E) of FIG. 56).

Next, at a timing t143, the distance measurement controller 68 changes the control signal XACT from the high level to the low level ((B) of FIG. 56). Accordingly, in the light-receiving section P, the transistor MP3 is turned on, and the transistor MN2 is turned off. In the case C12, the transistors MP2 and MP3 are notable to supply a current to the node N1, which causes the voltage VN1 at the node N1 to be maintained at the low level ((E) of FIG. 56).

The transistors MP2 and MP3 are not able to supply a current to the node N1 in such a manner, which causes the voltage VN1 at the node N1 to be maintained at the low level. Accordingly, the inverter IV1 maintains the pulse signal PLS1 at the high level. Accordingly, in a histogram generated by the histogram generator 23, frequency in all bins is "1".

In a case where frequency in all bins is "1" under condition that the control signal XENAR is changed to the high level in such a manner, the diagnosis section 66 diagnoses the light-receiving section P as having such a fault that the transistors MP2 and MP3 are not able to supply a current to the node N1.

FIG. 57 illustrates an example of the self-diagnosis operation in the photodetection system 4.

First, the photodetection system 4 changes the control signal XENAR to the low level, and performs the self-diagnosis operation (step S101). This operation corresponds to FIGS. 52 to 54.

Next, the diagnosis section 66 confirms whether or not the pulse signal PLS is maintained at the high level (step S102). Specifically, the diagnosis section 66 confirms whether or not the pulse signal PLS is maintained at the high level as illustrated in (F) of FIG. 54. In a case where the pulse signal PLS is maintained at the high level ("Y" in step S102), the diagnosis section 66 diagnoses a fault as corresponding to the case C13 (step S103). In other words, the diagnosis section 66 diagnoses the light-receiving section P as having such a fault that the transistor MP4 is not able to change the voltage VN1 at the node N1 and the transistors MP2 and MP3 are not able to supply a current to the node N1. Then, this processing ends.

In a case where the pulse signal PLS is not maintained at the high level ("N" in step S102), the diagnosis section 66 confirms whether or not the pulse width of the pulse signal PLS is wide (step S104). Specifically, the diagnosis section 66 confirms whether or not the pulse width of the pulse signal PLS is wide, as illustrated in (F) of FIG. 53. In a case where the pulse width of the pulse signal PLS is wide ("Y" in step S104), the diagnosis section 66 diagnoses a fault as corresponding to the case C11 (step S105). In other words, the diagnosis section 66 diagnoses the light-receiving section P as having such a fault that the transistor MP4 is not able to change the voltage VN1 at the node N1. Then, this processing ends.

In a case where the pulse width of the pulse signal PLS is not wide ("N" in step S104), the photodetection system 4 changes the control signal XENAR to the high level, and performs the self-diagnosis operation (step S106). This operation corresponds to FIGS. 55 and 56.

Next, the diagnosis section 66 confirms whether or not the pulse signal PLS is maintained at the high level (step S107). Specifically, the diagnosis section 66 confirms whether or not the pulse signal PLS is maintained at the high level, as illustrated in (F) of FIG. 56. In a case where the pulse signal PLS is maintained at the high level ("Y" in step S107), the diagnosis section 66 diagnoses a fault as corresponding to the case C12 (step S108). In other words, the diagnosis section 66 diagnoses the light-receiving section P as having such a fault that the transistors MP2 and MP3 are not able to supply a current to the node N1. Then, this processing ends.

In a case where the pulse signal PLS is not maintained at the high level ("N" in step S107), the diagnosis section 66 diagnoses the light-receiving section P as having no fault and being normal (step S109). Thus, this processing ends.

As described above, in the photodetection system 4, it is possible to perform diagnosis processing on the light-receiving section P illustrated in FIG. 50. [Modification Example 4]

Any of the modification examples of the first to third embodiments described above may be applied to the photodetection system 4 according to the fourth embodiment described above.

5. Example of Application to Mobile Body

The technology (the present technology) according to the present disclosure is applicable to a variety of products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, or a robot.

Figure 58:
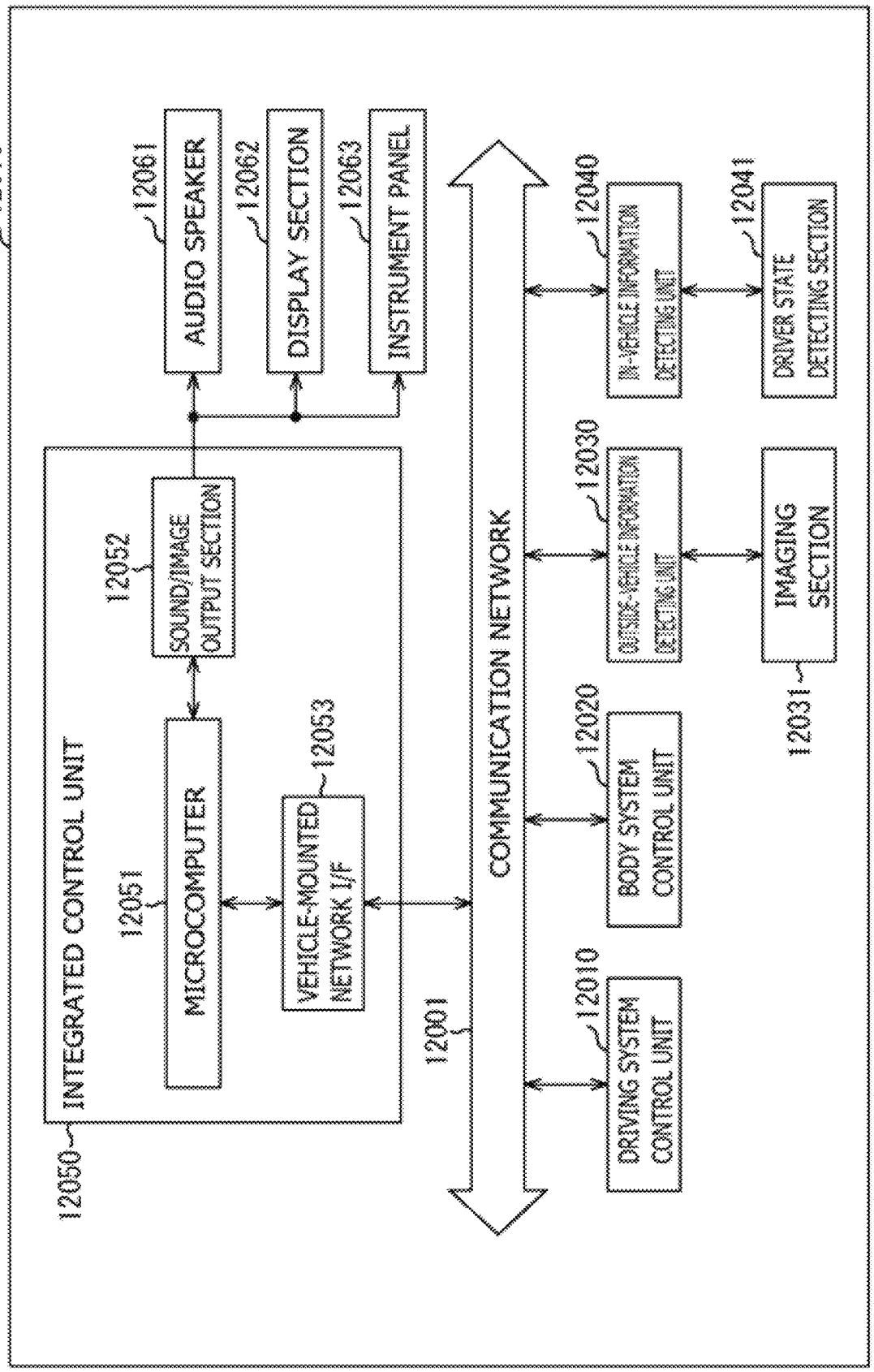
FIG. 58 is a block diagram depicting an example of schematic configuration of a vehicle control system.

FIG. 58 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 58, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 58, an audio speaker 12061, a display section 12062, and an instrument panel 12063 are illustrated as the output device. The display section 12062 may, for example, include at least one of an on-board display and a head-up display.

FIG. 59 is a diagram depicting an example of the installation position of the imaging section 12031.

In FIG. 59, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 59 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

One example of the vehicle control system to which the technology according to the present disclosure may be applied has been described above. The technology according to the present disclosure may be applied to the imaging section 12031 among the components described above. This allows the vehicle control system 12000 to diagnose whether or not the imaging section 12031 operates normally by performing self-diagnosis. Accordingly, in the vehicle control system 12000, for example, in a case where a fault occurs, it is possible to perform, for example, appropriate processing such as alerting a driver, which makes it possible to enhance reliability.

6. Specific Example of Application to Vehicle

Next, detailed description is given of a specific example of application of a photodetection system according to the present disclosure to a vehicle.

FIGS. 60 and 61 illustrate a configuration example of a vehicle 200 to which the present technology is applied. In FIG. 61, the vehicle 200 includes an ECU (Electronic Control Unit) 208, a front camera module 201, a steering 202, a headlamp 203, an engine 204, a motor 205, a brake 206, and a display operation section 207. The ECU 208, the front camera module 201, the steering 202, the headlamp 203, the engine 204, the motor 205, the brake 206, and the display operation section 207 are coupled through a bus 209, as illustrated in FIG. 61.

The ECU 208 is configured to perform control of the vehicle 200 by performing communication with respective blocks in the vehicle 200 through the bus 209. In a driving assistance mode, the ECU 208 performs control of the vehicle 200 on the basis of information supplied from the front camera module 201. The ECU 208 includes one or more ECUs.

The front camera module 201 is configured to detect a lane where the vehicle 200 is traveling, a vehicle traveling in front of the vehicle 200, a pedestrian walking in front of the vehicle 200, and the like. The front camera module 201 includes an image sensor 211, a distance measurement sensor 212, and a front camera ECU 213, as illustrated in FIG. 61.

The image sensor 211 includes, for example, a CMOS (Complementary MOS) image sensor, and is configured to capture an image of a region in front of the vehicle 200 by performing an imaging operation. In this example, the image sensor 211 also has a function of performing a self-diagnosis operation. It is to be noted that this is not limitative, and the image sensor 211 may not have the function of performing the self-diagnosis operation.

The distance measurement sensor 212 includes the photodetection system according to any of the embodiments described above, and is configured to measure a distance to a subject in front of the vehicle 200 by performing a distance measuring operation. The distance measurement sensor 212 also has a function of performing a self-diagnosis operation.

The front camera ECU 213 is configured to perform, for example, various kinds of detection processing such as lane detection, vehicle detection, pedestrian detection, and headlamp detection on the basis of a captured image generated by the image sensor 211, and a distance image generated by the distance measurement sensor 212. The front camera ECU 213 then notifies the ECU 208 about a result of the detection processing. In addition, in a case where a fault is detected in the image sensor 211 or in a case where a fault is detected in the distance measurement sensor 212, the front camera ECU 213 also has a function of notifying the ECU 208 about these pieces of information.

The steering 202 is configured to control a traveling direction of the vehicle 200. The steering 202 is operated by, for example, a driver. In addition, the steering 202 is controlled by, for example, the ECU 208 in the driving assistance mode. Specifically, for example, in the driving assistance mode, the ECU 208 controls the steering 202 on the basis of information supplied from the front camera module 201 to avoid collision with a vehicle or a pedestrian in front of the vehicle 200 along a lane.

The headlamp 203 is configured to irradiate a region in front of the vehicle 200 with light. The headlamp 203 is operated by, for example, a driver. In addition, the headlamp 203 is controlled by, for example, ECU 208 in the driving assistance mode. Specifically, for example, in the driving assistance mode, the ECU 208 performs control, on the basis of information supplied from the front camera module 201 to change from a high beam to a low beam in a case where an oncoming vehicle is traveling, and change from a low beam to a high beam in a case where no oncoming vehicle is traveling.

The engine 204 and the motor 205 are power sources for allowing the vehicle 200 to travel. The engine 204 and the motor 205 are controlled by the ECU 208. For example, the ECU 208 operates the motor 205 in a situation in which efficiency of the engine 204 is low, such as when starting the vehicle 200. In addition, the ECU 208 operates the engine 204 in a situation in which efficiency of the engine 204 is high. In addition, for example, in the driving assistance mode, the ECU 208 controls operations of the engine 204 and the motor 205 on the basis of information supplied from the front camera module 201.

The brake 206 is configured to brake the vehicle 200. The brake 206 is operated by, for example, a driver. In addition, the brake 206 is controlled by, for example, ECU 208 in the driving assistance mode. Specifically, for example, in the driving assistance mode, the ECU 208 controls the brake 206 on the basis of information supplied from the front camera module 201 to avoid collision with a vehicle or a pedestrian in front of the vehicle 200.

The display operation section 207 includes, for example, a liquid crystal display, a touch panel, or the like, and is configured to display the traveling state of the vehicle 200. In addition, the display operation section 207 has a function of performing route navigation to a destination on the basis of, for example, information from an unillustrated GPS (Global Positioning System) device. For example, in a case where a fault occurs in the front camera module 201 and the ECU 208 ends the driving assistance mode, the display operation section 207 displays that matter.

FIG. 62 illustrates an example of driving assistance processing of the vehicle 200.

The ECU 208 confirms whether or not the driving assistance mode is set by operating the display operation section 207 (step S201). In a case where the driving assistance mode is not set ("N" in step S201), the step S201 is repeated until the driving assistance mode is set.

In a case where the driving assistance mode is set ("Y" in step S201), the ECU 208 obtains a result of the self-diagnosis operation in the front camera module 201 (step S202). The ECU 208 then confirms whether or not a fault is present in the front camera module 201 (step S203).

In step S203, in a case where no fault is present in the front camera module 201 ("N" in step S203), the front camera module 201 performs the imaging operation and the distance measuring operation (step S204). Specifically, the image sensor 211 generates a captured image by capturing an image of a region in front of the vehicle 200. In addition, the distance measurement sensor 212 generates a distance image by measuring a distance to a subject in front of the vehicle 200.

Next, the front camera ECU 213 analyzes the captured image and the distance image (step S205). Specifically, the front camera ECU 213 performs, for example, various kinds of detection processing such as lane detection, vehicle detection, pedestrians detection, and headlamp detection on the basis of the captured image generated by the image sensor 211 and the distance image generated by the distance measurement sensor 212.

Next, the ECU 208 performs driving assistance processing on the basis of an analysis result by the front camera ECU 213 (step S206). Specifically, the ECU 208 performs driving assistance processing by controlling operations of the steering 202, the headlamp 203, the engine 204, the motor 205, the brake 206, and the display operation section 207.

Then, the ECU 208 confirms whether or not driving is finished (step S207). In a case where driving is not finished ("N" in step S207), the processing returns to step S202. In a case where driving is finished ("Y" in step S207), this processing ends.

In step S203, in a case where a fault is present in the front camera module 201 ("Y" in step S203), the ECU 208 ends the driving assistance mode (step S208). Then, the display operation section 207 displays a notification that the driving assistance mode has ended (step S209).

Thus, this processing ends.

Although the present technology has been described above with reference to some embodiments, the modification examples, and specific application examples thereof, the present technology is not limited to these embodiments and the like, and may be modified in a variety of ways.

For example, in the embodiments described above, the light-receiving section P as illustrated in, for example, FIG. 3 is provided. However, the circuit configuration of the light-receiving section P is not limited thereto, and any of various circuit configurations is applicable.

It is to be noted that the effects described herein are merely illustrative and non-limiting, and other effects may be included.

It is to be noted that the present technology may have the following configurations. According to the present technology having the following configurations, it is possible to perform self-diagnosis.

A photodetection device including:
a light-receiving section including a light-receiving element, a first switch, a second switch, and a signal generator, the first switch that couples the light-receiving element to a first node by being turned on, the second switch that applies a predetermined voltage to the first node by being turned on, and the signal generator that generates a pulse signal on the basis of a voltage at the first node;
a controller that controls operations of the first switch and the second switch;
a detector that detects a timing at which the pulse signal is changed, on the basis of the pulse signal; and
an output section that outputs a detection signal corresponding to a detection result by the detector when the second switch is turned on.

(2)
The photodetection device according to (1), further including a diagnosis section that performs diagnosis processing on the basis of the detection result by the detector when the second switch is turned on, in which
the detection signal includes a signal corresponding to a diagnosis result by the diagnosis section.

(3)
The photodetection device according to (2), in which the detection signal includes a signal indicating whether or not a fault is present in the light-receiving section.

(4)
The photodetection device according to (2) or (3), in which the detection signal includes a signal indicating details of a fault in the light-receiving section.

(5)
The photodetection device according to any one of (2) to (4), in which
in a plurality of first periods, the controller turns on the first switch,
in a second period between two first periods adjacent to each other of the plurality of first periods, the controller turns off the first switch, and turns on or off the second switch, and
the diagnosis section performs the diagnosis processing on the basis of a detection result by the detector in the second period.

(6)
The photodetection device according to any one of (2) to (4), in which
in a plurality of first periods, the controller turns on the first switch,
in a second period between two first periods adjacent to each other of the plurality of first periods, the controller turns on the first switch, and turns on or off the second switch, and
the diagnosis section performs the diagnosis processing on the basis of a detection result by the detector in the second period.

(7)
The photodetection device according to (5) or (6), in which
in the second period, the signal generator generates the pulse signal corresponding to on/off of the second switch, and
the detector detects a timing at which the pulse signal is changed in the second period (8)
The photodetection device according to (7), in which the diagnosis section performs the diagnosis processing on the basis of a timing at which the pulse signal is changed.

(9)
The photodetection device according to (7) or (8), in which the diagnosis section performs the diagnosis processing on the basis of presence or absence of change in the pulse signal.

(10)
The photodetection device according to (5) or (6), in which
in the first period, the signal generator generates the pulse signal corresponding to a light reception result by the light-receiving element, and
the detector detects a timing at which the pulse signal is changed in the first period to detect a light reception timing in the light-receiving element.

(11)

The photodetection device according to any one of (1) to (10), in which the photodetection device includes a plurality of the light-receiving sections, the controller controls operations of the first switch and the second switch of each of the plurality of the light-receiving sections, and the detector generates a composite pulse signal on the basis of a plurality of the pulse signals generated by the plurality of the light-receiving sections, and detects a timing at which the composite pulse signal is changed.

(12)

The photodetection device according to any one of (1) to (10), in which the photodetection device includes a plurality of the light-receiving sections, the controller controls operations of the first switch and the second switch of each of the plurality of the light-receiving sections, and the detector generates a code by performing addition processing on the basis of a plurality of the pulse signals generated by the plurality of the light-receiving sections, and detects a timing at which the code is changed.

(13)

The photodetection device according to any one of (1) to (12), in which the photodetection device is mounted on a vehicle.

(14)

A photodetection system including:

a light-emitting section that emits light, and a photodetector that detects light reflected by a measurement object of the light emitted from the light-emitting section, in which the photodetector includes a light-receiving section including a light-receiving element, a first switch, a second switch, and a signal generator, the first switch that couples the light-receiving element to a first node by being turned on, the second switch that applies a predetermined voltage to the first node by being turned on, and the signal generator that generates a pulse signal on the basis of a voltage at the first node, a controller that controls operations of the first switch and the second switch, a detector that detects a timing at which the pulse signal is changed, on the basis of the pulse signal, and an output section that outputs a detection signal corresponding to a detection result by the detector when the second switch is turned on.

This application claims the priority on the basis of Japanese Patent Application No. 2021-029082 filed on Feb. 25, 2021 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A photodetection device comprising:

a light-receiving section including a light-receiving element, a first switch, a second switch, and a signal generator, the first switch that couples the light-receiving element to a first node by being turned on, the second switch that applies a predetermined voltage to the first node by being turned on, and the signal generator that generates a pulse signal on a basis of a voltage at the first node;

a controller that controls operations of the first switch and the second switch;

a detector that detects a timing at which the pulse signal is changed, on a basis of the pulse signal;

an output section that outputs a detection signal corresponding to a detection result by the detector when the second switch is turned on; and a diagnosis section that performs diagnosis processing on a basis of the detection result by the detector when the second switch is turned on, wherein the detection signal comprises a signal corresponding to a diagnosis result by the diagnosis section, in a plurality of first periods, the controller turns on the first switch, in a second period between two first periods adjacent to each other of the plurality of first periods, the controller turns off the first switch, and turns on or off the second switch, and the diagnosis section performs the diagnosis processing on a basis of a detection result by the detector in the second period.

2. The photodetection device according to claim 1, wherein the detection signal includes a signal indicating whether or not a fault is present in the light-receiving section.

3. The photodetection device according to claim 1, wherein the detection signal includes a signal indicating details of a fault in the light-receiving section.

4. A photodetection device comprising:

a light-receiving section including a light-receiving element, a first switch, a second switch, and a signal generator, the first switch that couples the light-receiving element to a first node by being turned on, the second switch that applies a predetermined voltage to the first node by being turned on, and the signal generator that generates a pulse signal on a basis of a voltage at the first node;

a controller that controls operations of the first switch and the second switch;

a detector that detects a timing at which the pulse signal is changed, on a basis of the pulse signal; and an output section that outputs a detection signal corresponding to a detection result by the detector when the second switch is turned on; and a diagnosis section that performs diagnosis processing on a basis of the detection result by the detector when the second switch is turned on, wherein the detection signal comprises a signal corresponding to a diagnosis result by the diagnosis section, in a plurality of first periods, the controller turns on the first switch, in a second period between two first periods adjacent to each other of the plurality of first periods, the controller turns on the first switch, and turns on or off the second switch, and the diagnosis section performs the diagnosis processing on a basis of a detection result by the detector in the second period.

5. The photodetection device according to claim 1, wherein in the second period, the signal generator generates the pulse signal corresponding to on/off of the second switch, and the detector detects a timing at which the pulse signal is changed in the second period.

6. The photodetection device according to claim 5, wherein
the diagnosis section performs the diagnosis processing on a basis of a timing at which the pulse signal is changed.

7. The photodetection device according to claim 5, wherein
the diagnosis section performs the diagnosis processing on a basis of presence or absence of change in the pulse signal.

8. The photodetection device according to claim 1, wherein
in the first period, the signal generator generates the pulse signal corresponding to a light reception result by the light-receiving element, and
the detector detects a timing at which the pulse signal is changed in the first period to detect a light reception timing in the light-receiving element.

9. The photodetection device according to claim 1, wherein
the photodetection device includes a plurality of the light-receiving sections,
the controller controls operations of the first switch and the second switch of each of the plurality of the light-receiving sections, and
the detector generates a composite pulse signal on a basis of a plurality of the pulse signals generated by the plurality of the light-receiving sections, and detects a timing at which the composite pulse signal is changed.

10. The photodetection device according to claim 1, wherein
the photodetection device includes a plurality of the light-receiving sections,
the controller controls operations of the first switch and the second switch of each of the plurality of the light-receiving sections, and
the detector generates a code by performing addition processing on a basis of a plurality of the pulse signals generated by the plurality of the light-receiving sections, and detects a timing at which the code is changed.

11. The photodetection device according to claim 1, wherein
the photodetection device is mounted on a vehicle.

12. A photodetection system comprising:
a light-emitting section that emits light; and
a photodetector that detects light reflected by a measurement object of the light emitted from the light-emitting section, wherein
the photodetector includes
a light-receiving section including a light-receiving element, a first switch, a second switch, and a signal generator, the first switch that couples the light-receiving element to a first node by being turned on, the second switch that applies a predetermined voltage to the first node by being turned on, and the signal generator that generates a pulse signal on a basis of a voltage at the first node,
a controller that controls operations of the first switch and the second switch,
a detector that detects a timing at which the pulse signal is changed, on a basis of the pulse signal,
an output section that outputs a detection signal corresponding to a detection result by the detector when the second switch is turned on; and
a diagnosis section that performs diagnosis processing on a basis of the detection result by the detector when the second switch is turned on, wherein
the detection signal comprises a signal corresponding to a diagnosis result by the diagnosis section,
in a plurality of first periods, the controller turns on the first switch,
in a second period between two first periods adjacent to each other of the plurality of first periods, the controller turns off the first switch, and turns on or off the second switch, and
the diagnosis section performs the diagnosis processing on a basis of a detection result by the detector in the second period.

\* \* \* \* \*